(12) United States Patent
Yamaguchi et al.

(10) Patent No.: US 6,480,767 B2
(45) Date of Patent: Nov. 12, 2002

(54) CONTROL SYSTEM FOR HYBRID VEHICLE

(75) Inventors: Musashi Yamaguchi, Kanagawa-ken (JP); Itsuro Muramoto, Kanagawa-ken (JP); Nobutaka Takahashi, Kanagawa-ken (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 09/957,649

(22) Filed: Sep. 21, 2001

(65) Prior Publication Data

US 2002/0062183 A1 May 23, 2002

(30) Foreign Application Priority Data

Sep. 22, 2000 (JP) .......................... 2000-289355
Dec. 20, 2000 (JP) .......................... 2000-387832

(51) Int. Cl.[7] ................................................ G06F 7/00
(52) U.S. Cl. ..................... 701/22; 701/101; 180/65.2; 180/65.3; 180/65.4; 180/165; 318/139
(58) Field of Search ................ 701/22, 101; 180/65.1, 180/65.2, 65.3, 65.4, 65.6, 65.7, 65.8, 165; 318/139, 140; 477/2, 3, 6

(56) References Cited

U.S. PATENT DOCUMENTS 4,547,678 A * 10/1985 Metzner et al. ........... 290/40 C
5,722,502 A * 3/1998 Kubo ......................... 180/65.4
5,927,416 A * 7/1999 del Re et al. .............. 180/65.2
6,019,183 A * 2/2000 Shimasaki et al. .......... 180/165

FOREIGN PATENT DOCUMENTS

JP          9-98516          4/1997

* cited by examiner

Primary Examiner—Gertrude Arthur
(74) Attorney, Agent, or Firm—McDermott, Will & Emery

(57) ABSTRACT

A control system for a hybrid vehicle has a consumed electric power calculator (20), which calculates electric power consumption, and a battery state calculator (21), which calculates battery state SOC of a battery (5). Based on this battery state, a physical quantity per effective electric power calculator (25) calculates a physical quantity per effective power when electric power equal to or greater than consumed electric power is generated for various electric power consumption and electric power generation, and a threshold value calculator (22) obtains a threshold value having the same unit as that of the physical quantity per effective power using predetermined calculation for selecting operating modes of a generator and the battery. An operating mode selector (23) selects operating modes for an engine (1) and the battery (5) based on comparison between the above threshold value and the physical quantity per effective power corresponding to the consumed electric power, and a target generated electric power calculator (24) calculates target electric power generation. An electric power distribution controller (6) controls the engine (1) and the motor (3).

13 Claims, 54 Drawing Sheets

SELECT OPERATION MODE

TARGET GENERATED ELECTRIC POWER (REGION I)

FUEL CONSUMPTION RATE CHARACTERISTIC

TARGET DRIVING FORCE MAP

MOTOR EFFICIENCY MAP

EFFECTIVE FUEL CONSUMPTION RATE MAP

OPERATING POINT MAP

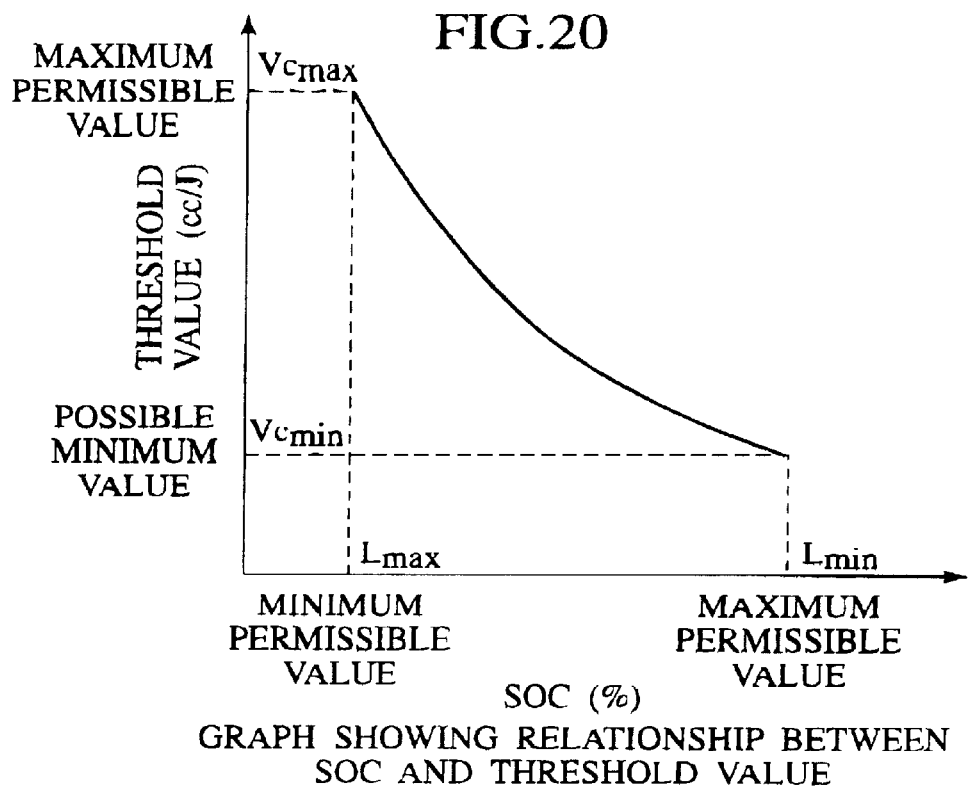
GRAPH SHOWING RELATIONSHIP BETWEEN
SOC AND THRESHOLD VALUE
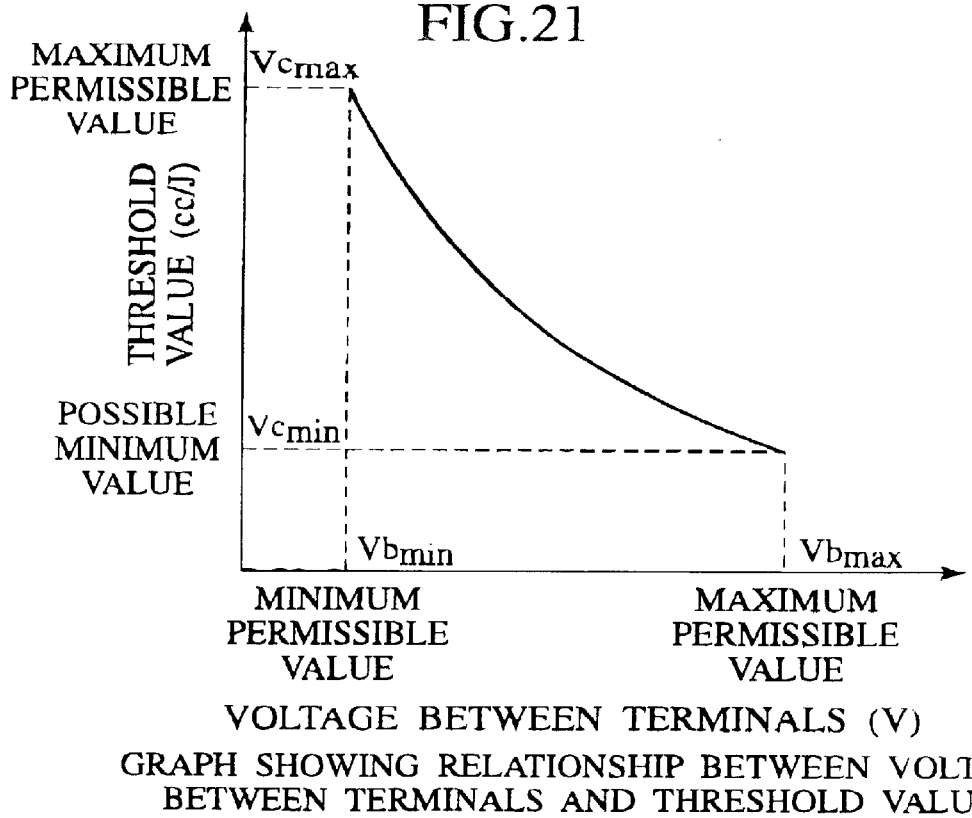
GRAPH SHOWING RELATIONSHIP BETWEEN VOLTAGE
BETWEEN TERMINALS AND THRESHOLD VALUE

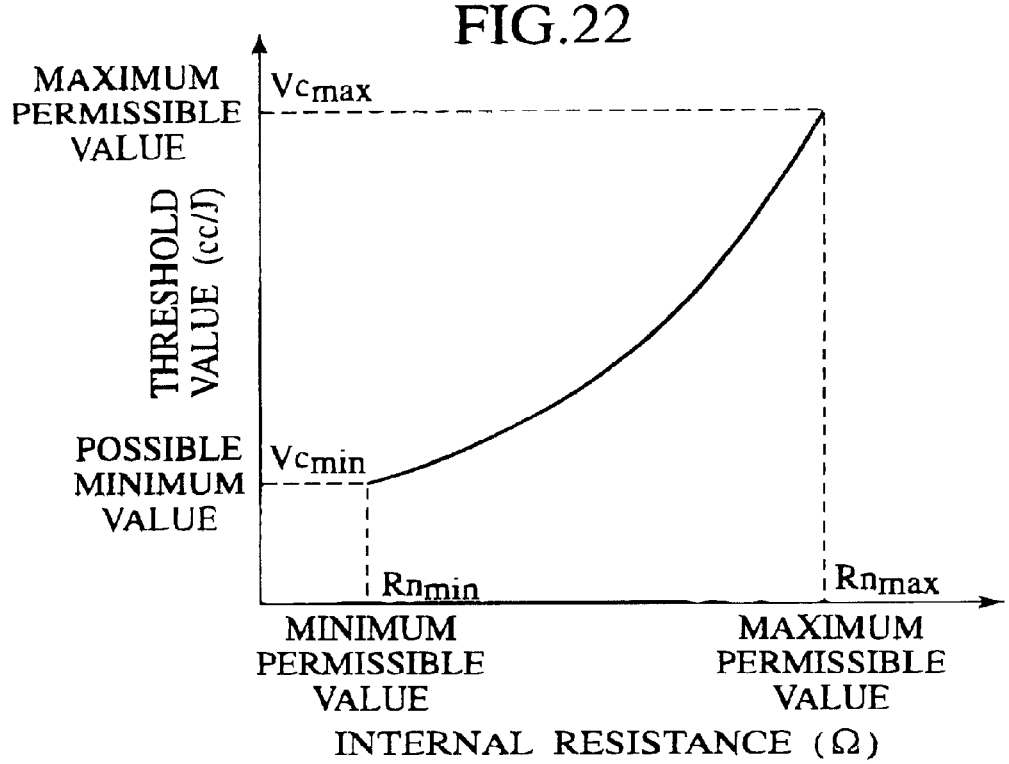
GRAPH SHOWING RELATIONSHIP BETWEEN INTERNAL RESISTANCE AND THRESHOLD VALUE
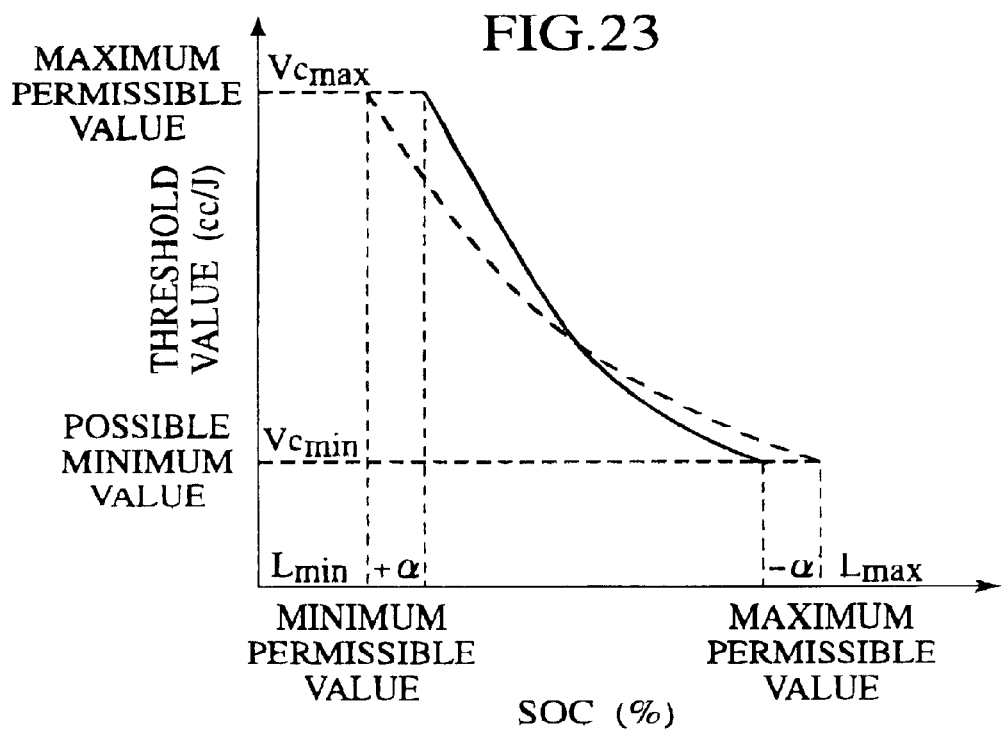
GRAPH SHOWING RELATIONSHIP BETWEEN SOC AND THRESHOLD VALUE

GRAPH SHOWING RELATIONSHIP BETWEEN
SOC AND THRESHOLD VALUE

TARGET UNIT OPERATING POINT CALCULATION (REGION I)

TARGET UNIT OPERATING POINT CALCULATION (REGION II)

TARGET UNIT OPERATING POINT CALCULATION (REGION III)

FUEL CONSUMPTION RATE CHARACTERISTIC

TARGET DRIVING FORCE MAP

POSSIBLE RANGE OF RPM SPEED OF
ENGINE BY LIMITATION OF CONTINUOUSLY
VARIABLE TRANSMISSION

OPERATING MODE

TARGET UNIT OPERATING POINT CALCULATION (REGION I)

TARGET UNIT OPERATING POINT CALCULATION (REGION II)

TARGET UNIT OPERATING POINT CALCULATION (REGION III)

EXAMPLE OF TARGET DRIVING FORCE MAP

EXAMPLE OF MOTOR EFFICIENCY MAP

EXAMPLE OF OPERATING POINT OF ENGINE

FUEL CONSUMPTION RATE CHARACTERISTIC [cc/sec]

MINIMUM FUEL CONSUMPTION RATE CHARACTERISTIC [g/kwh]

EXAMPLE OF CHARGING EFFICIENCY CHARACTERISTIC [%]

POSSIBLE RANGE OF ENGINE RPM SPEED BY LIMITATION OF CONTINUOUSLY VARIABLE TRANSMISSION

CONTROL SYSTEM FOR HYBRID VEHICLE

BACKGROUND OF THE INVENTION

The present invention relates to a control system for a hybrid vehicle.

There is disclosed a control system for a hybrid vehicle in Japanese Patent Application Laid-open Publication No. 9-98516. This control system is adapted for application to a parallel hybrid vehicle (P-HEV), and an object of the control system is to reduce the consumption rate or amount of exhaust gas. A feature of this control system is that a physical quantity (fuel consumption rate, exhaust gas ratio, or the like) related to an engine when the vehicle runs using the engine as a power source, electric power generating efficiency when a generator is driven by the engine when the vehicle runs using a motor as the power source is converted into electric power, and a physical quantity (fuel consumption rate, exhaust gas ratio and the like) related to the engine while taking the charging efficiency when the electric power is stored in a battery is taken into consideration are compared with each other, and one of them having higher physical quantity (lower one if the fuel consumption rate or exhaust gas ratio is determined as the physical quantity) is selected as the power source.

SUMMARY OF THE INVENTION

In the above related art, in a region (low load driving) where consumption output required for running is relatively small, the engine generates output greater than the consumption output, the charging is carried out by surplus output exceeding the consumption output, and in a region (high load driving) where the consumption output required for running is relatively great, the engine generates only the consumption output.

When an instantaneous electric charging efficiency is considered, if the above electric charging is carried out, the charging efficiency is enhanced. However, if the entire driving region is taken into consideration, the charging efficiency when the engine generates an output greater than the consumed output in the high load driving region and the charging is carried out by the surplus output exceeding the consumed electrical power is better than the charging efficiency when the engine generates output greater than the consumed output in the low load driving region and the charging is carried out by the surplus output exceeding the consumed output in some cases. The charging efficiency, i.e., fuel consumption rate is not always optimized.

Accordingly, in view of the above-described problems, it is an object of the present invention to provide a control system for a hybrid vehicle in which the efficiency over the entire driving region is taken into consideration, and in which the vehicle can run while selecting a condition having more suitable predetermined physical quantity such as the fuel consumption rate or amount of exhaust gas.

To achieve the object, in accordance with an aspect of the present invention, there is provided a control system for a hybrid vehicle for controlling the hybrid vehicle comprising a power apparatus consuming fuel and generating power, a battery storing electrical power, and a motor converting electrical power to mechanical power transmitted to a drive wheel of the vehicle, the control system including a detector detecting an operating condition of the vehicle, and programmed to: calculate a required power indicating a power required to drive the vehicle, based on the operating condition of the vehicle; calculate a first parameter indicating a ratio between a fuel consumption rate and the required power for running the power apparatus so as to generate a power equal to the required power; set a threshold value with respect to the first parameter, based on a charging state of the battery; run the power apparatus so as to generate a power larger than the required power when the first parameter is smaller than the threshold value, and transmit part of the power generated to the drive wheel, and store a remainder of the power generated in the battery; and run the power apparatus so as to generate a power smaller than the required power when the first parameter is larger than the threshold value, and transmit all of the power generated to the drive wheel, and transmit part of a power stored in the battery to the drive wheel.

BRIEF DESCRIPTION OF THE DRAWINGS

The above and further objects and novel features of the present invention will more fully appear from the following detailed description when the same is read in conjunction with the accompanying drawings, in which:

FIG. 20 is a graph showing a relationship between SOC and threshold value used in a second embodiment;

FIG. 21 is a graph showing a relationship between voltage between terminals and threshold value used in a third embodiment;

FIG. 22 is a graph showing a relationship between internal resistance and threshold value used in a third embodiment;

FIG. 23 is a graph showing a relationship between SOC and threshold value used in a fourth embodiment;

DESCRIPTION OF THE PREFERRED EMBODIMENTS

Figure 1:
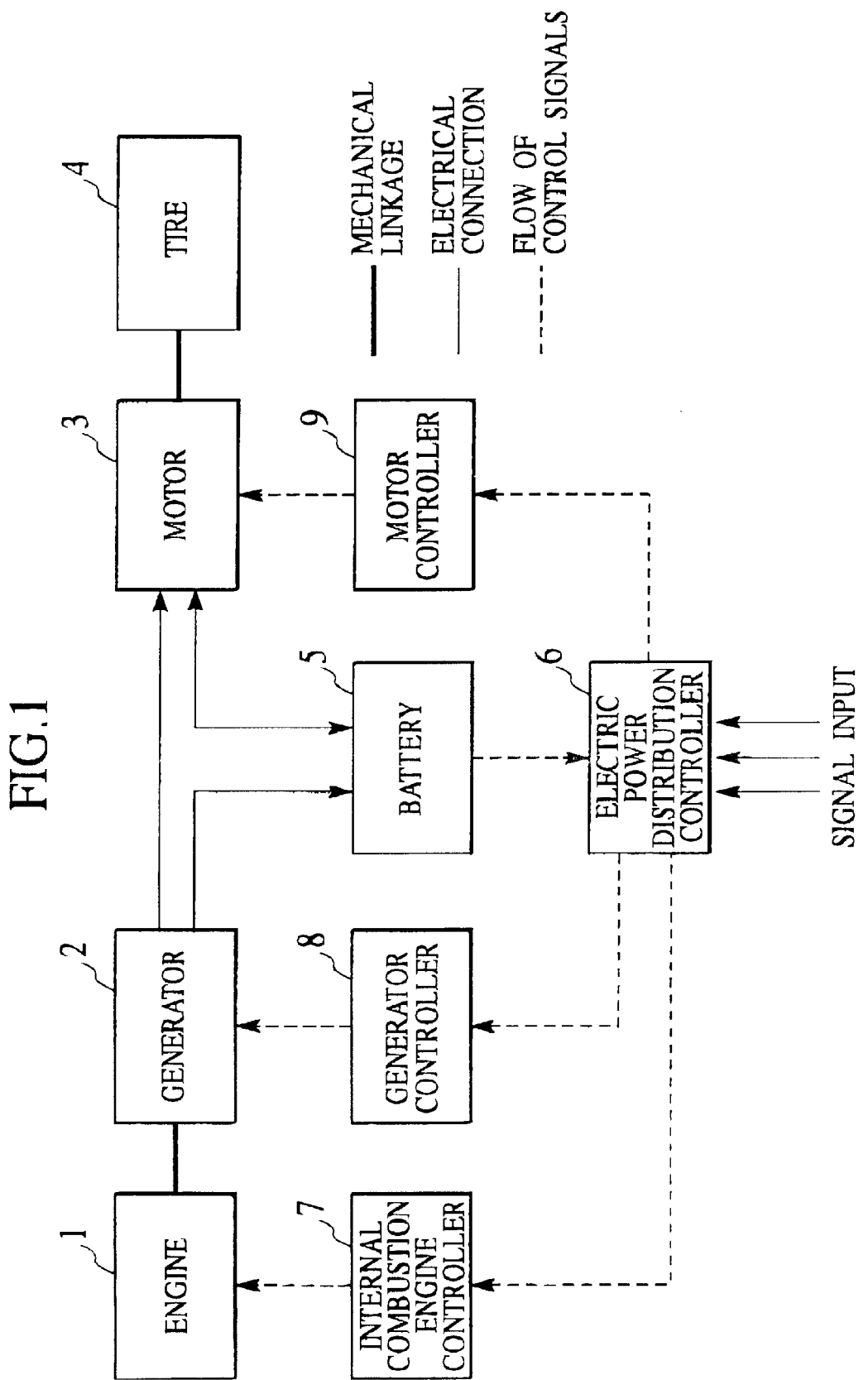
FIG. 1 is a block diagram showing a system structure of a control system for a hybrid vehicle according to a first embodiment of the present invention.

Embodiments of the present invention are described in detail below, making reference to relevant accompanying drawings. Like members or elements are designated by like reference characters.

FIG. 1 shows a first embodiment of the invention. An internal combustion engine 1 (hereinafter sometimes referred to simply as an engine) drives a generator 2 to generate electricity. A fuel cell (see FIG. 76) is employed as the generator in some cases, but in this case, the engine 1 and the generator 2 are employed as an electric power generating apparatus.

Electric power generated by the generator 2 drives a motor 3, a driving force of which is transmitted to a road surface through tires 4, thereby allowing a vehicle to run. When the electric power generated by the generator 2 is greater than electric power consumed by the motor 3, electric power is stored in a battery 5 as surplus electric power. When the electric power generated by the generator 2 is smaller than that consumed by the motor 3, insufficient electric power is discharged from the battery 5 and supplied to the motor 3.

An electric power distribution controller 6 establishes the method of setting the driving states of the engine 1, the generator 2 and the motor 3, and generates command values for the engine 1, the generator 2 and the motor 3 so as to achieve that state and satisfy a driver's requirements.

An engine controller 7 (hereinafter sometimes referred to simply as an engine controller) controls the engine 1 to achieve the command value (e.g., required output) from the electric power distribution controller 6. A generator controller 8 controls the generator 2 to achieve the command value (e.g., required amount of generated electric power) from the electric power distribution controller 6. A motor controller 9 controls the motor 3 to achieve the command value (e.g., the required driving force) from the electric power distribution controller 6.

Figure 2:
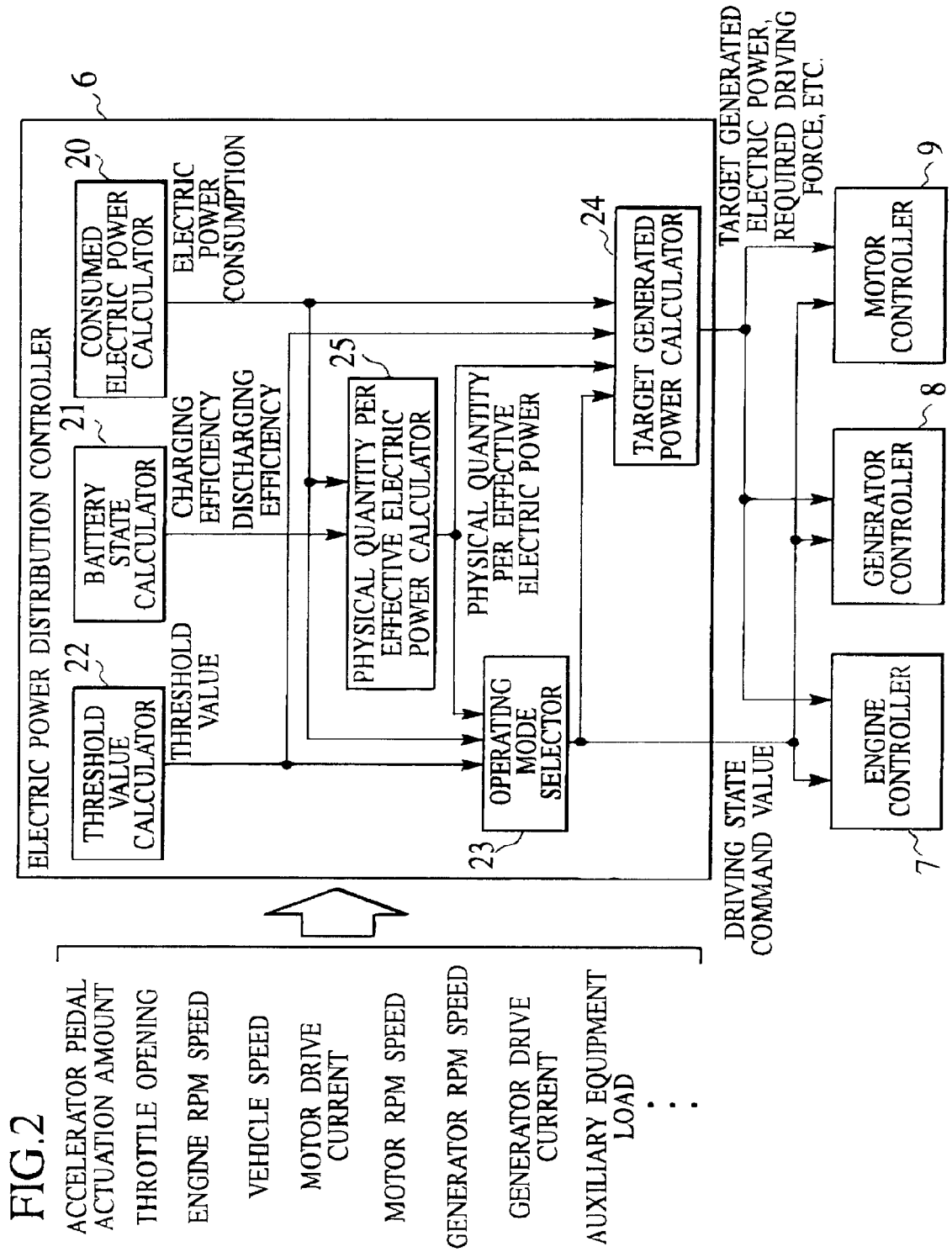
FIG. 2 is a block diagram showing a functional structure of an electric power distribution controller in the embodiment.

Referring to FIG. 2, the structure and operation of the electric power distribution controller 6 are as follows. Input from various vehicle-mounted sensors (not shown) to the electric power distribution controller 6 are physical quantity and conversion quantity corresponding to the physical quantity representing the vehicle states, such as accelerator pedal actuation amount, throttle opening, rpm speed of the engine, vehicle speed, motor drive current, motor rpm speed, generator drive current, generator rpm speed and auxiliary equipment load.

A consumed electric power calculator 20 of the electric power distribution controller 6 obtains required driving force of the driver from the vehicle speed and the acceleration pedal actuation amount at that time, and calculates currently required consumption electric power while taking the driving state of the auxiliary equipment (air conditioner, radiator fan, rear defogger and the like), motor efficiency and inverter efficiency into consideration.

A battery state calculator 21 of the electric power distribution controller 6 obtains electric power coming in or out from the battery 5 from current coming in or out from the battery 5 and voltage between terminals at that time, estimates state of charge (SOC) of the battery 5, detects a temperature of the battery from a temperature sensor (not shown) disposed in the battery 5, and calculates energy conversion efficiency (charging efficiency) when electric energy is charged from the battery 5 and energy conversion efficiency (discharging efficiency) when the electric energy is drawn from the battery 5 based on the SOC and the temperature of the battery.

A threshold value calculator 22 of the electric power distribution controller 6 calculates the physical quantity serving as a criteria for evaluating the engine. For example, if energy utilizing efficiency is to be enhanced, the threshold value calculator 22 calculates fuel consumption amount or value corresponding thereto per unit energy as the physical quantity, and if the exhaust gas should be reduced to minimum value, the exhaust gas amount per unit energy is selected. When the electric power generating apparatus is a fuel cell, physical quantity concerning the fuel cell is selected based on the same idea.

For simplifying the explanation, the control for minimizing the fuel consumption amount will be explained. In this case, the threshold value obtained by the threshold value calculator 22 is indicated with fuel amount ([cc/J]:, "effective fuel consumption rate", hereinafter) which is consumed for generating the unit output which can be utilized effectively. There, the output which can be utilized effectively means net energy given to the motor 3, and generated electric power for driving the motor 3 is obtained from the fuel consumption characteristic of the engine 1 and the electric power generating efficiency of the generator 2. Electric power to be stored in the battery 5 is obtained while taking fuel consumption rate characteristic of the engine 1, electric power generating efficiency of the generator 2, charging efficiency to the battery 5 and discharging efficiency from the battery 5 into consideration. To be strict, the charging efficiency and the discharging efficiency are different, and precise efficiency at the time of discharging is varied depending upon the current value at that time, but the precise efficiency is replaced by average discharging efficiency, or charging and discharging efficiencies are combined as one, and the average fixed value is used as the precise discharging efficiency.

A physical quantity per effective electric power calculator 25 calculates physical quantity per effective electric power when electric power is generated in the electric power generating apparatus based on electric power consumption obtained by the consumed electrical power calculator 20, the charging efficiency and discharging efficiency calculated by the battery state calculator 21 (in this embodiment, effective fuel consumption rate is calculated). For calculating the physical quantity per effective electric power, map data may be previously obtained and utilized.

An operating mode selector 23 in the electric power distribution controller 6 decides whether the engine 1, the generator 2 and the motor 3 should be driven or stopped based on the threshold value obtained by the threshold value calculator 22 and the effective fuel consumption rate calculated by the physical quantity per effective electric power calculator 25, and based on a result of the decision, the operating mode selector 23 outputs driving state command to the engine controller 7, the generator controller 8 and the motor controller 9.

A target generated electric power calculator 24 in the electric power distribution controller 6 calculates a target operating point of each of the engine 1, the generator 2 and the motor 3 based on the threshold value obtained by the threshold value calculator 22, electric power consumption obtained by the consumed electrical power calculator 20, decision results of driving/stopping of the engine 1, the generator 2 and the motor 3 obtained by the operating mode selector 23. The target generated electric power calculator 24 outputs a result of the calculation to the engine controller 7, the generator controller 8 and the motor controller 9.

Figure 3:
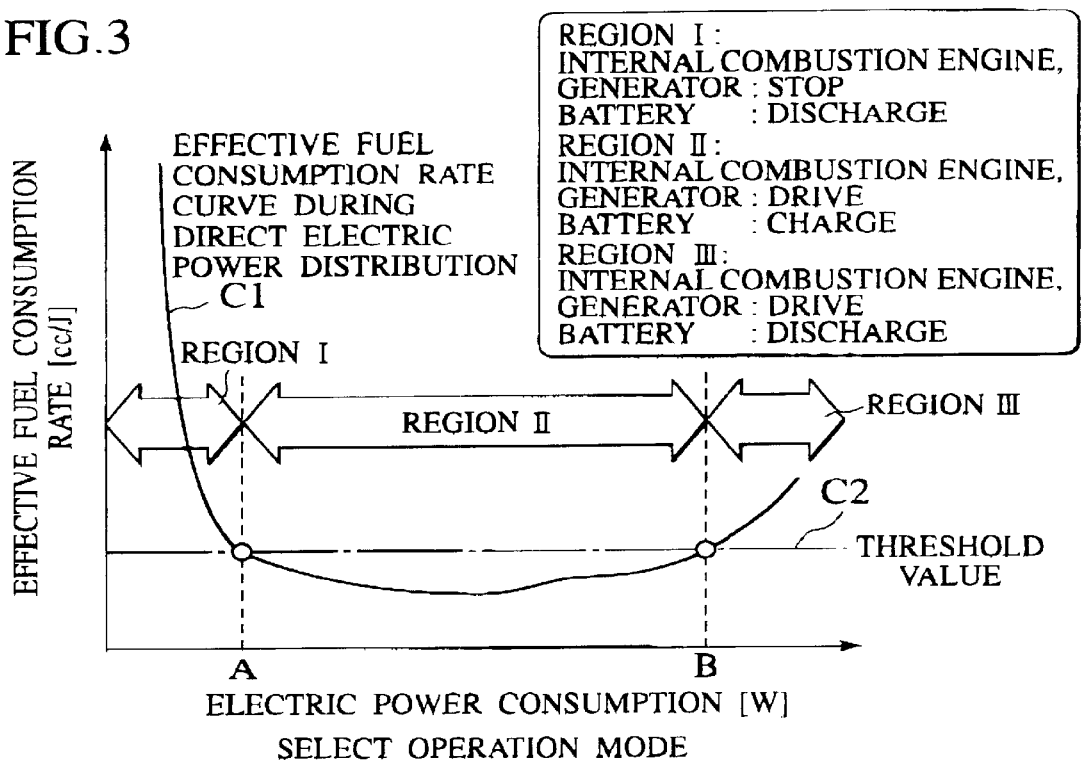
FIG. 3 is a graph showing criteria for selecting operating mode in the embodiment.

Next, detailed function of the operating mode selector 23 will be explained with reference to FIG. 3. FIG. 3 shows a curve C1 showing effective fuel consumption rate and chain line C2 showing the threshold value when electricity which is equal to consumed electrical power is generated using the electric power generating apparatus. A and B are points of intersection of these curves C1 and C2. The threshold value C2 is calculated by the threshold value calculator 22. In this control system, the operating mode of the electric power generating apparatus (engine 1 and the generator 2) and the battery 5, and a target generated electric power in the electric power generating apparatus are set so that electric power is generated such that effective fuel consumption rate becomes equal to or lower than the threshold value C2.

<region I>: When the electric power consumption is lower than A[kW] (region I), since the curve C1 showing the effective fuel consumption rate is greater than the threshold value C2, electric power is not generated, and electric power stored in the battery 5 is discharged to drive the motor 3, thereby allowing the vehicle to run. In this case, a mode is controlled such that the engine 1 is stopped, the generator 2 is stopped and the battery 5 discharges.

<region II>: When the electric power consumption is equal to or greater than A[kW] and equal to or lower than B[kW], since the curve C1 showing the effective fuel consumption rate is equal to or lower than the threshold value C2, the battery 5 is charged with electricity. In this region, since the effective fuel consumption rate is sufficiently higher than the threshold value, the output of the engine 1 is increased, the electric power is generated by surplus output greater than the electric power required for driving the vehicle, and the battery 5 is charged with the surplus electric power.

The reason why the output of the engine 1 is excessively increased and the battery 5 is charged with electric power is that the vehicle runs using electric power which is efficiently charged with the threshold value or lower in a region where the effective fuel consumption rate is greater than the threshold value, and the fuel consumption is enhanced entirely as a result. Therefore, in this case, the mode is controlled such that the engine 1 is driven, the generator 2 is driven and the battery 5 is charged with electric power.

<region III>: When the electric power consumption exceeds the B[kW], since the curve C1 showing the effective fuel consumption rate is greater than the threshold value C2, B[kW] capable of generating the maximum electric power at threshold value C2 or lower is generated by the engine 1, insufficient electric power with respect to the electric power consumption is discharged from the battery 5, and the motor 3 is driven by the total electric power. In this case, the mode is controlled such that the engine 1 is driven, the generator 2 is driven and the battery 5 discharges. As in the case in which the electric power consumption is lower than the A[kW], it seems that all the electric power can be obtained by the discharging of the battery 5. However, since electric power coming in or out from the battery 5 is increased, the loss of electric power is also increased and thus, such a method is not practical. However, when it is expected that a large quantity of electric power can be collected by regenerative braking at later stage, this method may be used. Such examples will be described later.

When the electric power consumption is equal to the A[kW] or B[kW], since the curve C1 and the threshold value C2 coincide with each other, direct electric power distribution is carried out.

Figure 4:
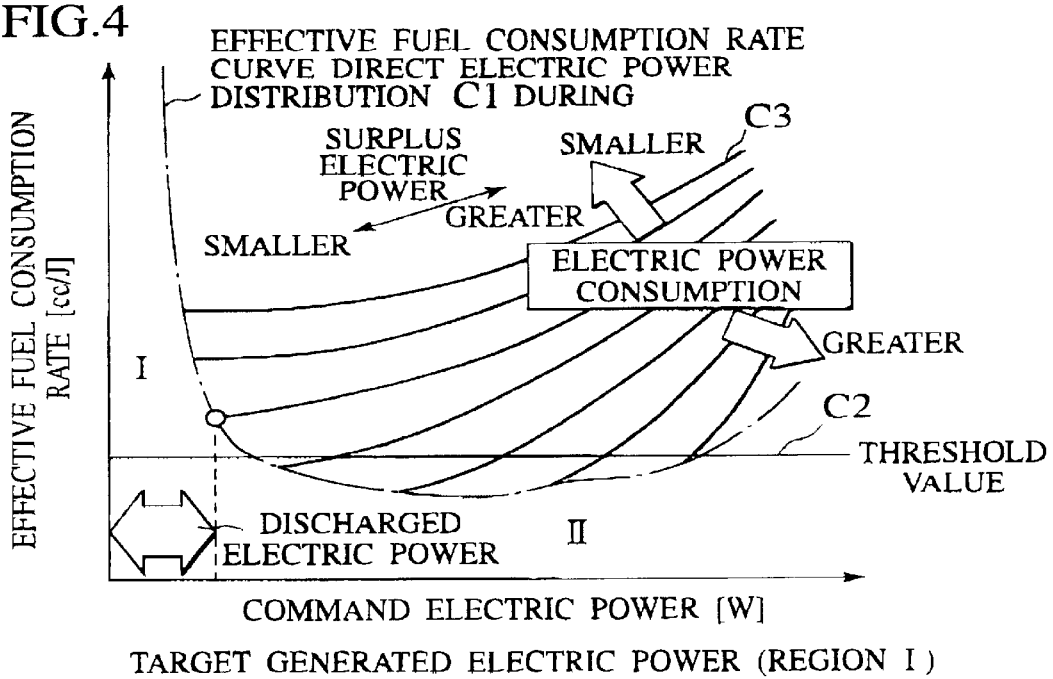
FIG. 4 is a graph illustrating a target generated power calculation processing in a region I of the embodiment.
Figure 5:
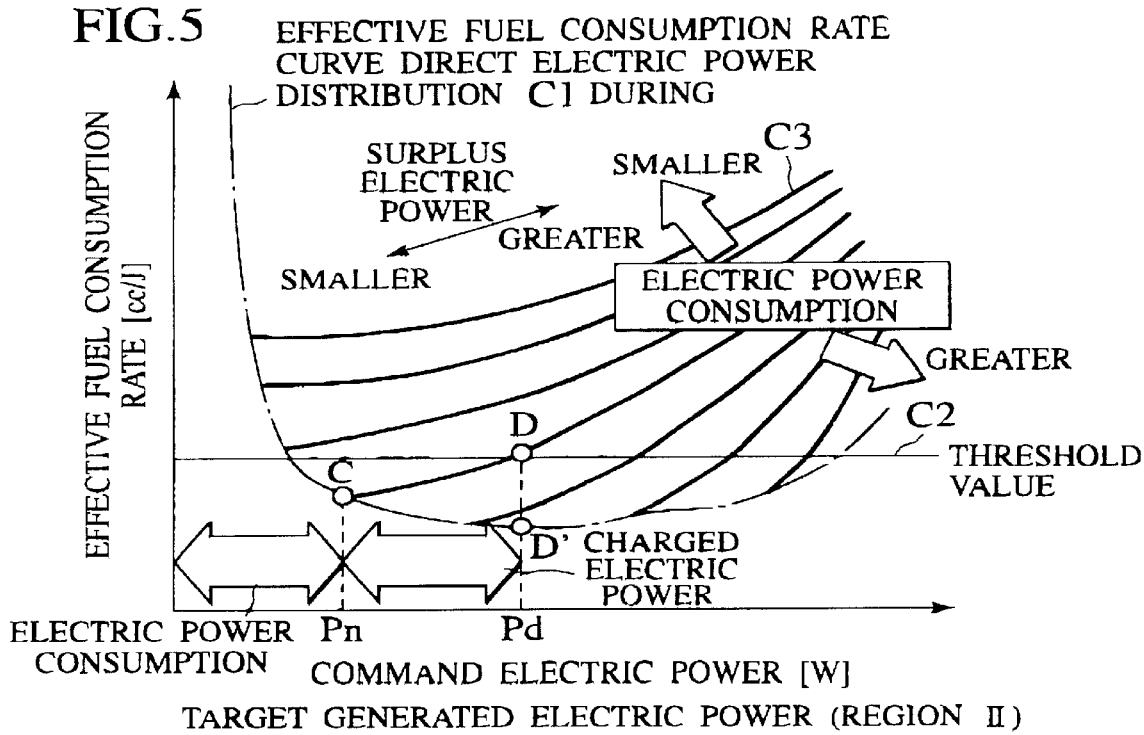
FIG. 5 is a graph illustrating a target generated power calculation processing in a region II of the embodiment.
Figure 6:
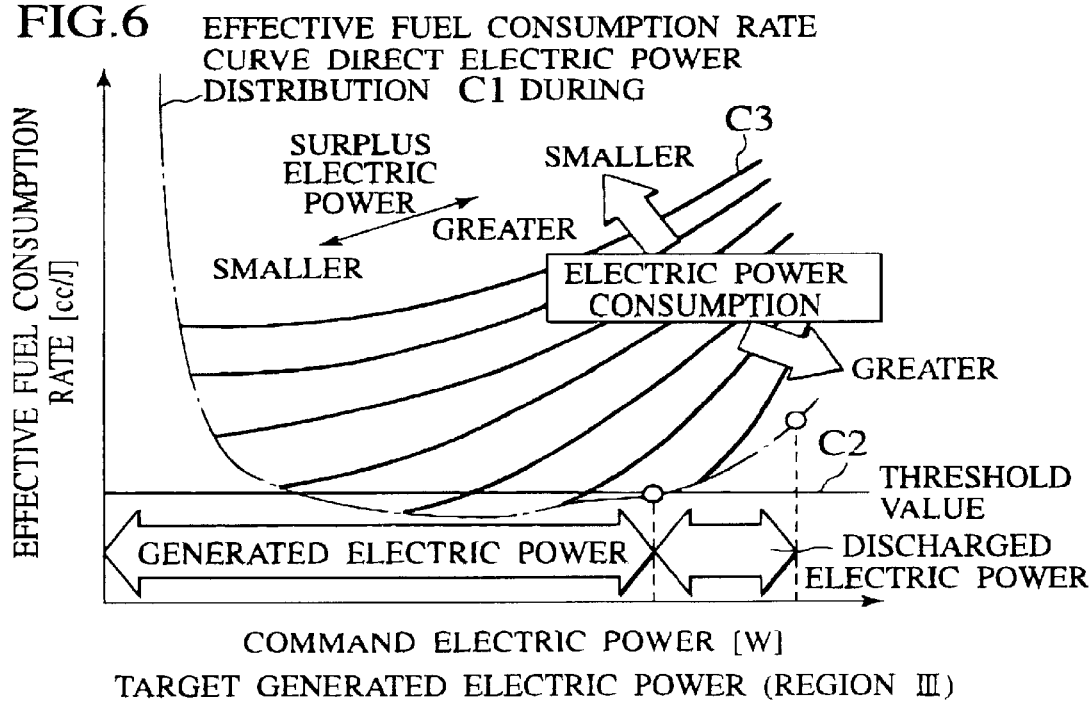
FIG. 6 is a graph illustrating a target generated power calculation processing in a region III of the embodiment.

Next, functions of the target generated electric power calculator 24 will be explained with reference to FIGS. 4 to 6. FIGS. 4 to 6 show an effective fuel consumption rate curve C1 and the threshold value C2 at the time of direct electric power distribution, and curves C3 showing the effective fuel consumption rate when electric power consumption required for running of the vehicle of auxiliary equipment is equal to a predetermined value and surplus electric power with respect to the electric power consumption is generated and the surplus electric power is increased. Each of the curves C3 is obtained for each electric power consumption, and a solid line closer to right side shows greater electric power consumption.

As shown in FIG. 4, when the electric power consumption is in the region I, the electric power consumption calculated by the consumed electrical power calculator 20 is discharged from the battery 5, and the discharged electric power drives the motor 3 and the auxiliary equipment.

FIG. 5 shows a case in which the electric power consumption is in the region II. In this case, even if the electric power consumption calculated in the consumed electrical power calculator 20 is supplied through direct electric power distribution, the effective fuel consumption rate is smaller than the threshold value. For example, if a certain point in the region II is defined as C, it seems that the electric power can be directly distributed at this point C. However, if the electric power is directly distributed, since electric power consumption is compensated by electric power supplied from the battery 5 to enhance the fuel economy in a region where the effective fuel consumption rate is greater than the threshold value, it is preferable that the battery 5 is charged with electric power as efficiently as possible in a region where the effective fuel consumption rate is equal to or smaller than the threshold value. Thereupon, the electric power is generated in a D point in the drawing so that the output of the engine 1 is increased (=Pd) and the effective fuel consumption rate becomes equal to the threshold value. The surplus electric power (=generated electric power Pd−electric power consumption Pn (electric power consumed by running and auxiliary equipment)) which is a difference between the generated electric power at this point D is input to the battery 5.

Here, if attention is paid to the effective fuel consumption rate of electric power (electric power generated by the engine 1 and the generator 2) before the electric power is collected by the battery 5 when the electric power is generated at the point D, the point becomes a point D'. A difference of effective fuel consumption rate between the points D and D' is generated from loss of electric energy with respect to electric power coming in and out from the battery 5. For example, if a rate of loss of electric energy is assumed to be constant, the loss in electric energy becomes greater as the surplus electric power is greater. That is, the difference between the points D and D' is increased.

The generated electric power at that time can be calculated by previously obtaining map data as shown in FIG. 5. This map data is formed by obtaining effective fuel consumption rate at the time when the electric power consumption is used as a parameter and charging electric power to be added to the parameter, and by forming the obtained effective fuel consumption rate as a map ("effective fuel consumption rate map", hereafter). Therefore, the electric power actually consumed by the motor 3 is surplus electric power× charging efficiency×discharging efficiency. Of course, it is possible to allow a CPU of the control system to calculate based on previously registered predetermined arithmetic equation without forming the data in the form of the map.

FIG. 6 shows a case in which the electric power consumption is in the region III. In this case, if electric power consumption calculated by the consumed electrical power calculator 20 is directly distributed, the effective fuel consumption rate becomes greater than the threshold value. Therefore, the generated electric power is set to the maximum electric power which is lower than the threshold value, the insufficient electric power (=electric power consumption Pn−generated electric power Pd) is discharged from the battery 5, and a total thereof is used for driving the motor 3 and the auxiliary equipment.

Next, the control of the electric power distribution controller 6 will be explained concretely using flowcharts in FIGS. 7 to 13. The processing shown in the flowcharts is repeatedly carried out in a cycle of predetermined time.

Figure 7:
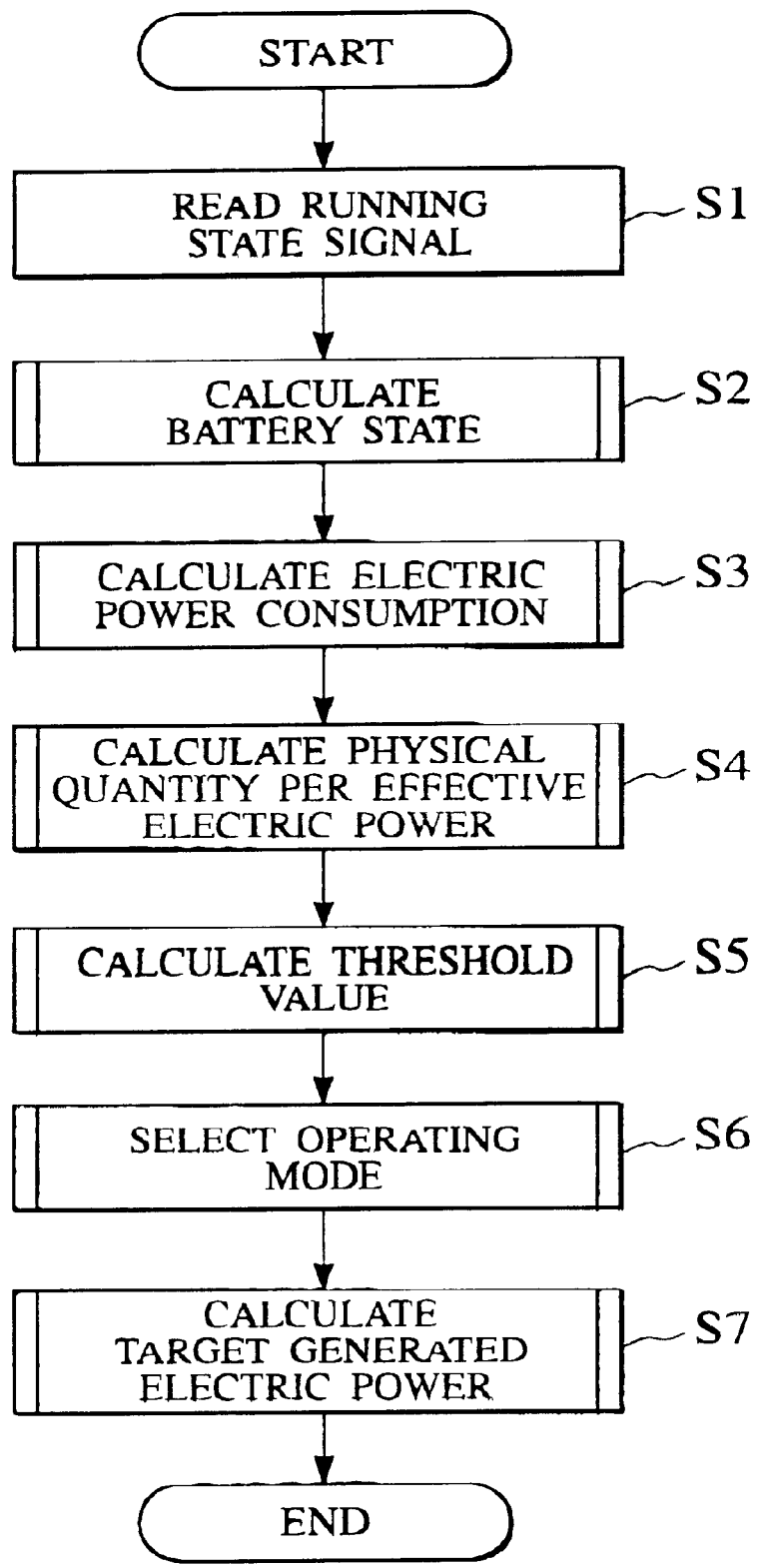
FIG. 7 is a main flowchart of processing operation of the embodiment.

FIG. 7 shows main processing flow. In step S1, signals indicative of vehicle running state such as an accelerator pedal actuation amount θa[deg], a vehicle speed VSP[km/h], a motor electric power consumption, generated electric power by the generator, auxiliary equipment load electric power Po[W] are read in. In step S2, the charging state SOC, the charging efficiency ηc and discharging efficiency ηd are calculated. In step S3, the currently required electric power consumption tPn is calculated from the driving force required by the driver and the driving state of the auxiliary equipment (ON/OFF of air conditioner, instantaneous required driving force).

In step S4, the physical quantity per effective electric power is calculated based on the charging efficiency ηc and discharging efficiency ηd calculated by the battery state calculator 21. In step S5, a threshold value for selecting operation of the engine 1 and the battery 5 is calculated.

In step S6, the operating mode is selected based on the threshold value, the electric power consumption and the physical quantity per effective electric power. In step S7, a target generated electric power is calculated from the threshold value, the electric power consumption, a result of selection of the operating mode and the physical quantity per effective electric power, and an operating point of the engine 1 and the generator 2 at the time of generation of electric power is calculated.

Figure 8:
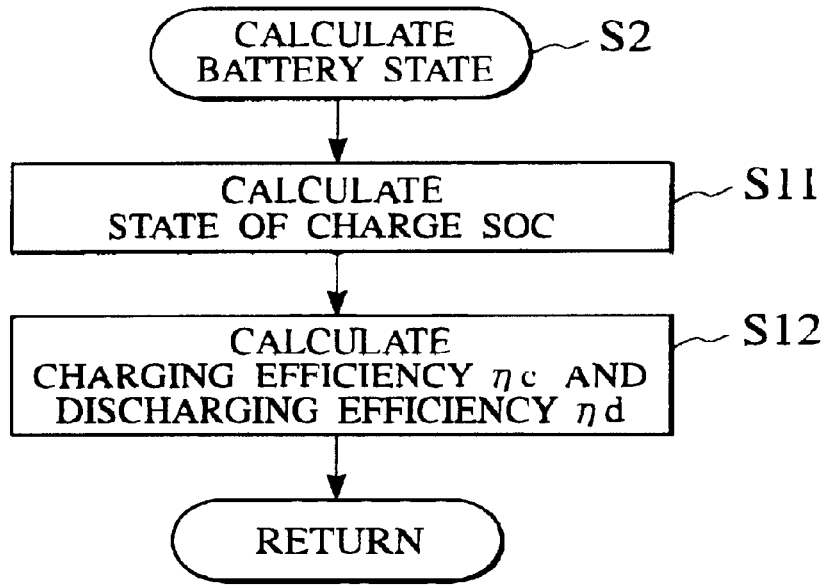
FIG. 8 is a flowchart of a battery state detection processing of the embodiment.

Details of the battery state detecting processing in step S2 of the main flowchart are as shown in the flowchart in FIG. 8. In this processing, the charging state SOC of the battery 5 is calculated from current coming in and out from the battery 5 and voltage between terminals at that time in step S11. In step S12, the charging efficiency ηc and the discharging efficiency ηd are calculated based on the SOC and the temperature of the battery. An average value of the values at the time of past charging and discharging may be calculated alternatively.

Figure 9:
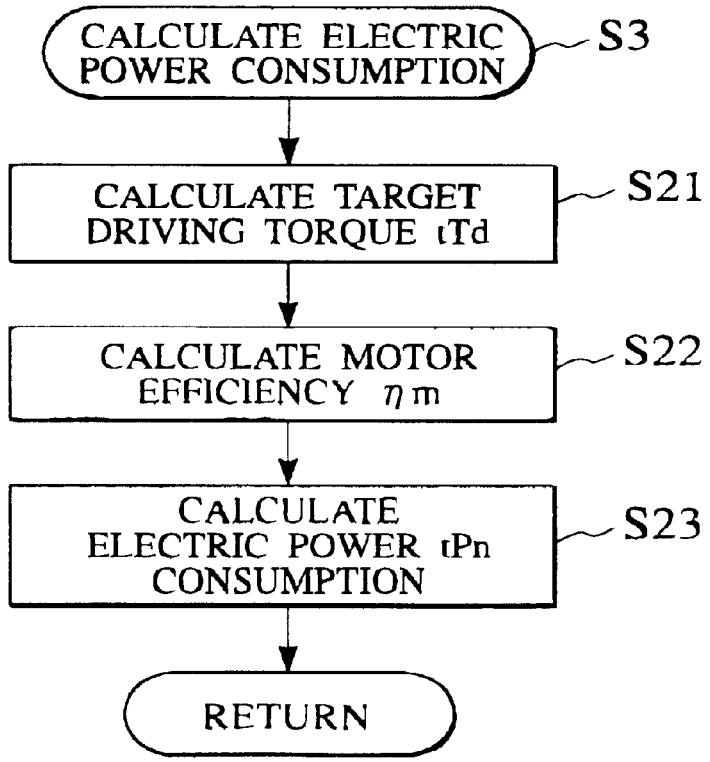
FIG. 9 is a flowchart of a consumption power calculation processing of the embodiment.
Figure 15:
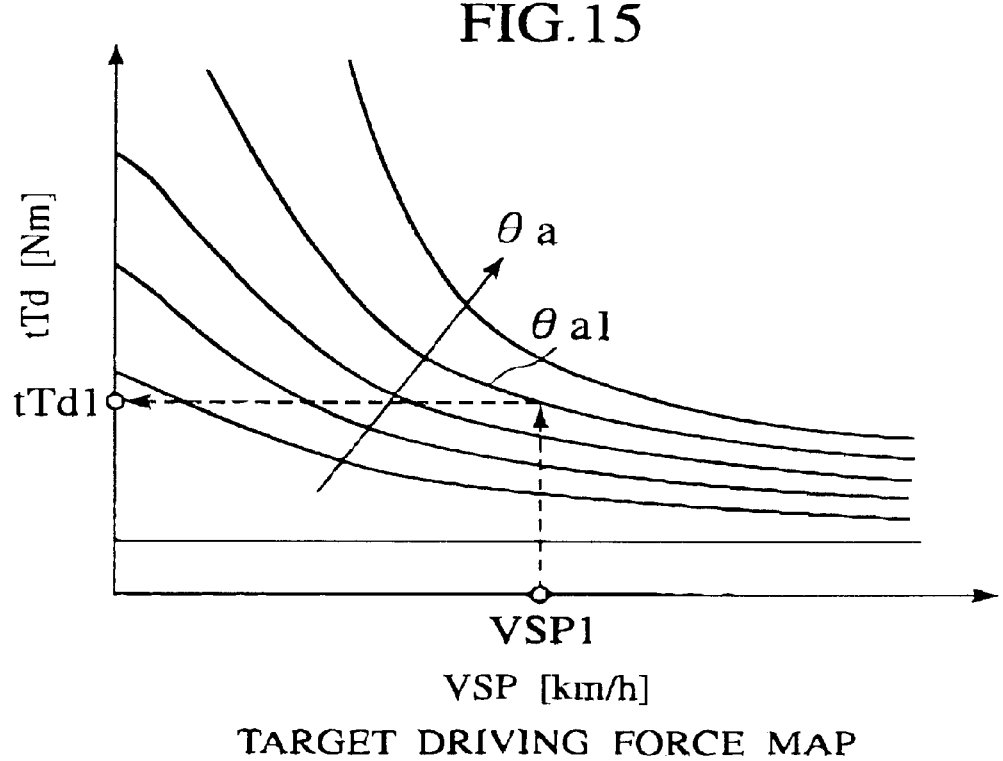
FIG. 15 is a map of target driving force used in the embodiment.

Details of the electric power consumption calculating processing in step S3 of the main flow are as shown in the flowchart in FIG. 9. In step S21, the target driving torque tTd[Nm] is calculated from parameters such as the accelerator pedal actuation amount θa and the vehicle speed VSP. Data (map data and the like) required for calculating the target driving torque is previously obtained by experiment or the like, and is stored in a memory (not shown) of the electric power distribution controller 6. FIG. 15 shows an example of the target driving torque calculating map. A speed-target driving torque curve (e.g., θa1) is selected by accelerator pedal operating amount, and a corresponding target driving torque (e.g., tTd1) is determined from the vehicle speed (e.g., VSP1) on the curve θa1.

Figure 16:
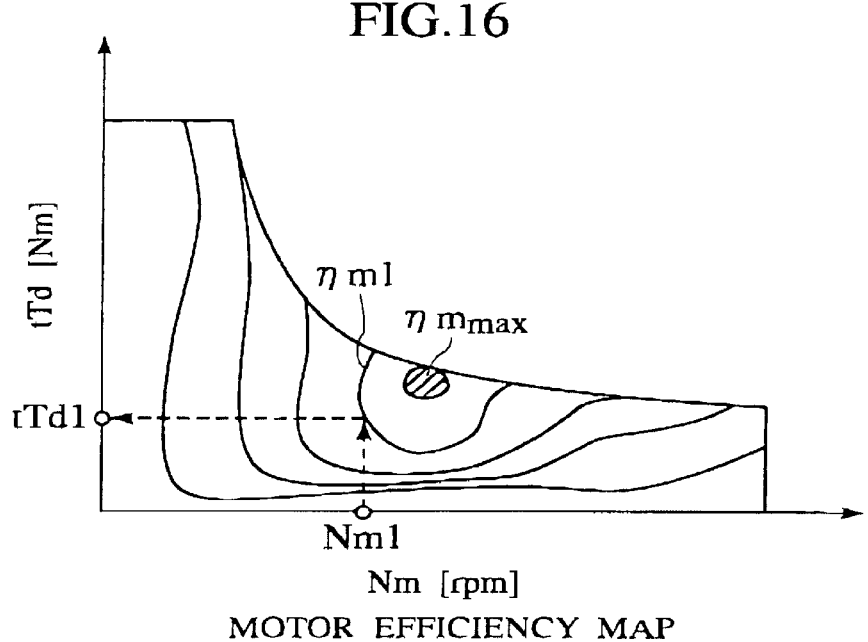
FIG. 16 is a map of motor efficiency used in the embodiment.
Figure 17:
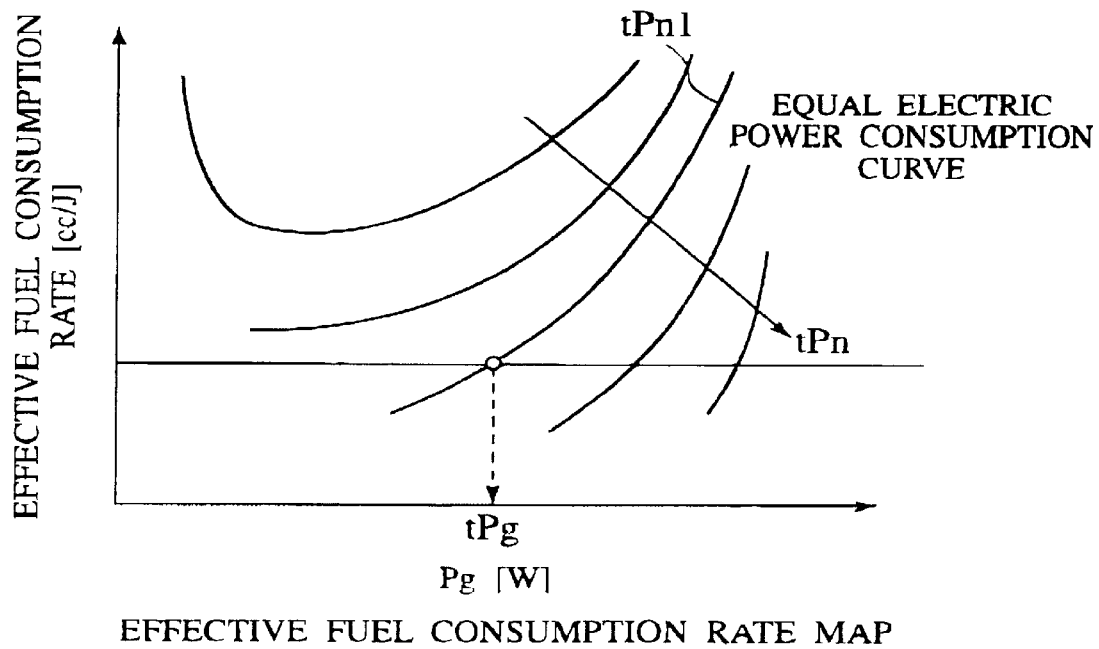
FIG. 17 is a map of effective fuel consumption rate used in the embodiment.

Subsequently, in step S22, a motor efficiency ηm when electric energy is converted into kinetic energy in the motor 3 is calculated. Data (map data or the like) required for calculated this motor efficiency ηm is previously obtained by experiment or the like, and stored in a memory. FIG. 16 shows an example of a motor efficiency calculating map. In FIG. 16, an equal motor efficiency line is shown. A shaded range $Nm_{max}$ has highest motor efficiency, and the motor efficiency is lowered toward the outer side. Referring to this map data, if the motor rpm speed is Nm1 and the target driving torque obtained in step S21 is tTd1, the equal motor efficiency line Nm1 passing both the intersections is obtained. In subsequent step S23, a electric power consumption tPn[W] is calculated using the following equation 1 based on the target driving torque rTd and the motor rpm speed Nm:

$$tPn = tTd \cdot \frac{2\pi}{60} \cdot Nm \cdot \frac{1}{\eta m} + Po \qquad \text{[Equation 1]}$$

Figure 10:
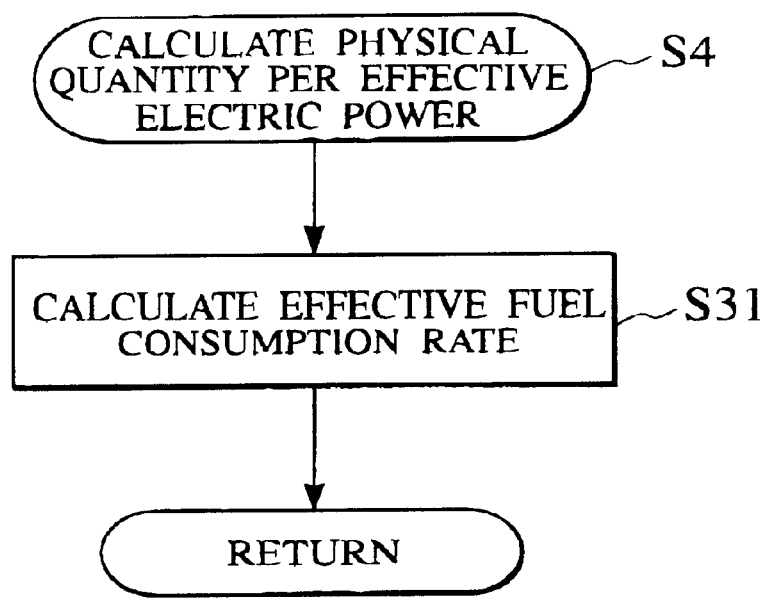
FIG. 10 is a flowchart of a physical quantity calculating processing per effective electric power of the embodiment.
Figure 14:
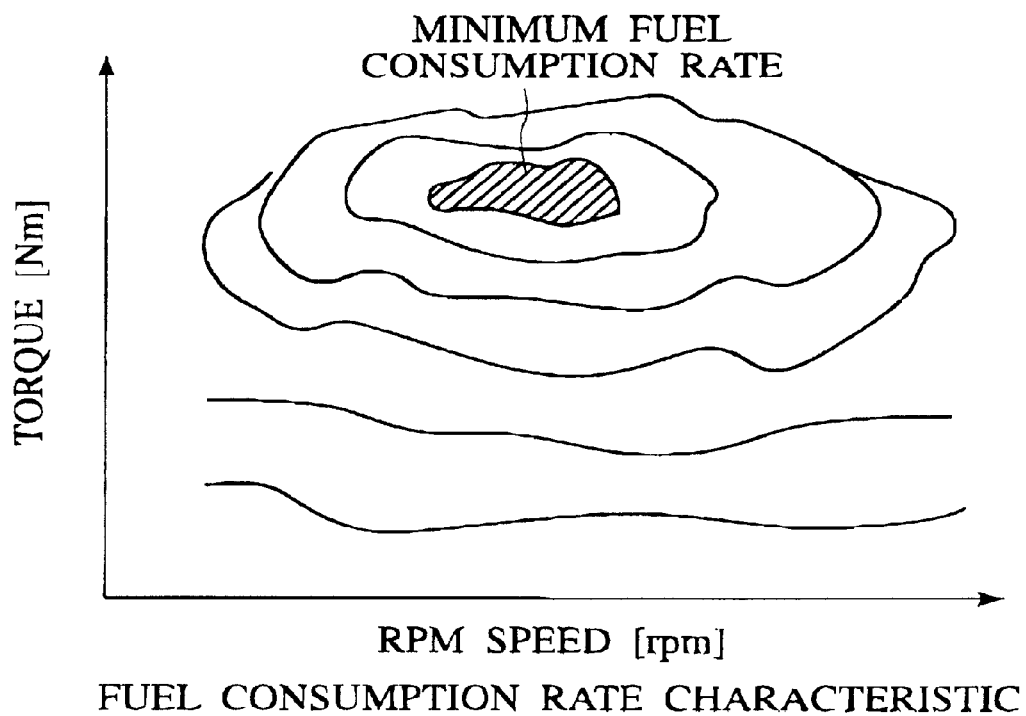
FIG. 14 is a map of fuel consumption rate characteristic used in the embodiment.

Details of calculating processing of the physical quantity per effective electric power in step S4 of the main flow are as shown in the flowchart in FIG. 10. The processing here corresponds to processing for obtaining the curves C1 and C3 in FIGS. 3 to 6. More specifically, surplus electric power is added to the electric power consumption to obtain the gross generated electric power. The gross generated electric power is multiplied by electric power generation efficiency to obtain a target output of the engine 1. A fuel consumption rate capable of achieving this target output with minimum fuel consumption rate is obtained from a fuel consumption rate characteristic map shown in FIG. 14. Next, the surplus electric power is multiplied by the charging efficiency ηc and the discharging efficiency ηd obtained by the battery state calculating processing in step S2 to obtain effective electric power concerning the surplus electric power. The electric power consumption tPn is added to the effective electric power to obtain gross effective electric power. Finally, the fuel consumption rate is divided by the gross effective electric power to obtain the effective fuel consumption rate. Such calculation is carried out with respect to various electric power consumption and surplus electric power to calculate the effective fuel consumption rate corresponding to the curves C1 and C3.

A unit of the fuel consumption rate is [cc/s], and a unit of electric power is [W]=[J/s]. Therefore, a unit of the effective fuel consumption rate obtain by dividing the fuel consumption rate by the effective electric power is [cc/J]. Here, the reason why the value obtained by multiplying the surplus electric power by the charging efficiency ηc and the discharging efficiency ηd is that slight loss is generated during charging and discharging if the battery 5 is once charged with the surplus electric power and this surplus electric power is consumed by the motor 3 or the like in the future and thus, this loss is taken into consideration.

The effective fuel consumption rate curve C1 at the time of direct distribution of electric power during which the surplus electric power is 0 can be calculated without using the charging efficiency ηc and the discharging efficiency ηd of the battery 5. It is therefore possible to priorly calculate the effective fuel consumption rate curve C1, and data of the effective fuel consumption rate curve C1 may be formed in a form of a map and stored in the memory.

Whereas, the effective fuel consumption rate curve C3 at the time of surplus electric power charging during which the surplus electric power is not 0 always need to be calculated by carrying out the above calculation. However, effective fuel consumption rate curve C3 required in step S7 is only one corresponding to the electric power consumption tPn obtained in the electric power consumption calculating processing in step S3 and thus, only this may be calculated (the electric power is fixed to tPn and the above calculation is carried out for various surplus electric power). If degree of variation of the charging efficiency ηc and discharging efficiency ηd is small and there is no problem for using averaged fixed value, it is possible to previously calculate the effective fuel consumption rate curve C3. In this case, all the effective fuel consumption rate data can be formed in the form of a map and stored in the memory. In this case, the processing in step S4 and step S12 is unnecessary.

Figure 11:
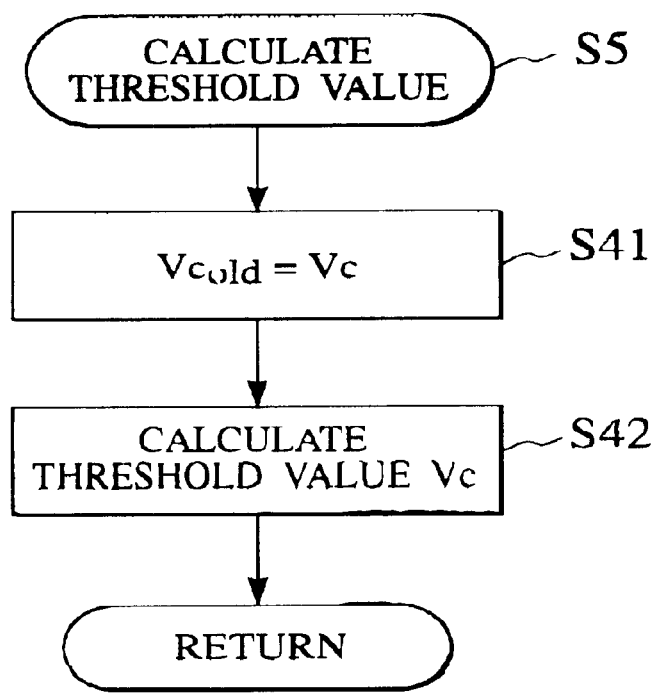
FIG. 11 is a flowchart of a threshold value calculating processing of the embodiment.

Details of the threshold value calculating processing in step S5 of the main flow are as shown in the flowchart in FIG. 11. A threshold value Vc[cc/J] for selecting the operating mode of the engine 1 and the battery 5 is defined as $Vc_{old}$ (step S41). Subsequently, a proportion control is carried out based on deviation of a target SOC value tSOC[%] (e.g., SOC=50%) and SOC value SOC[%] of the battery 5 obtained in the battery state calculating processing in step S2, and the threshold value Vc[cc/J] is calculated (step S42). This threshold value Vc is calculated using equation 2.

$$Vc = K \cdot (tSOC - SOC) + Vc_{old} \qquad \text{[Equation 2]}$$

Figure 12:
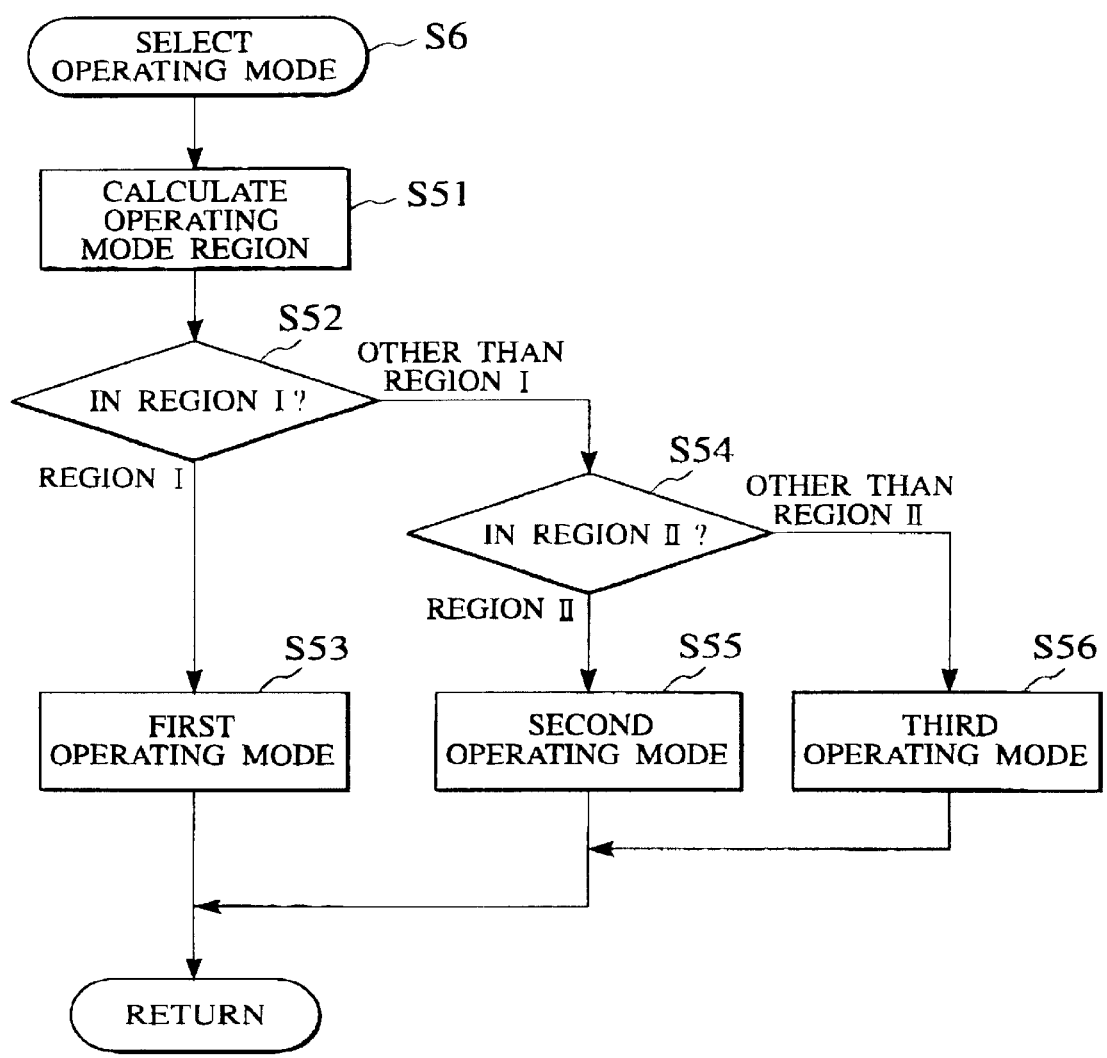
FIG. 12 is a flowchart of an operating mode selecting processing of the embodiment.

Details of the operating mode selecting processing in step S6 of the main flow are as shown in the flowchart in FIG. 12. First, in step S51, a judgment is made as to which one of the regions I to III in FIG. 3 the electric power consumption tPn obtained in the electric power consumption calculating processing in step S3 belongs, based on the effective fuel consumption rate curve C1 obtained in the physical quantity calculating processing per effective electric power in step S4 and the threshold value Vc obtained in the threshold value calculating processing in step S5. More specifically, electric power corresponding to the intersection between the effective fuel consumption rate curve C1 and the threshold value Vc is obtained, and this and the electric power consumption tPn are compared to decide the region.

If it was judged that the electric power consumption tPn belonged to region I in step S51, the operating mode is set to a first operating mode (steps S52 and S53). If it was judged that the electric power consumption tPn belonged to region II in step S51, the operating mode is set to a second operating mode (steps S52, S54 and S55). If it was judged that the electric power consumption tPn belonged to region III in step S51, the operating mode is set to a third operating mode (steps S54 and S56).

Figure 13:
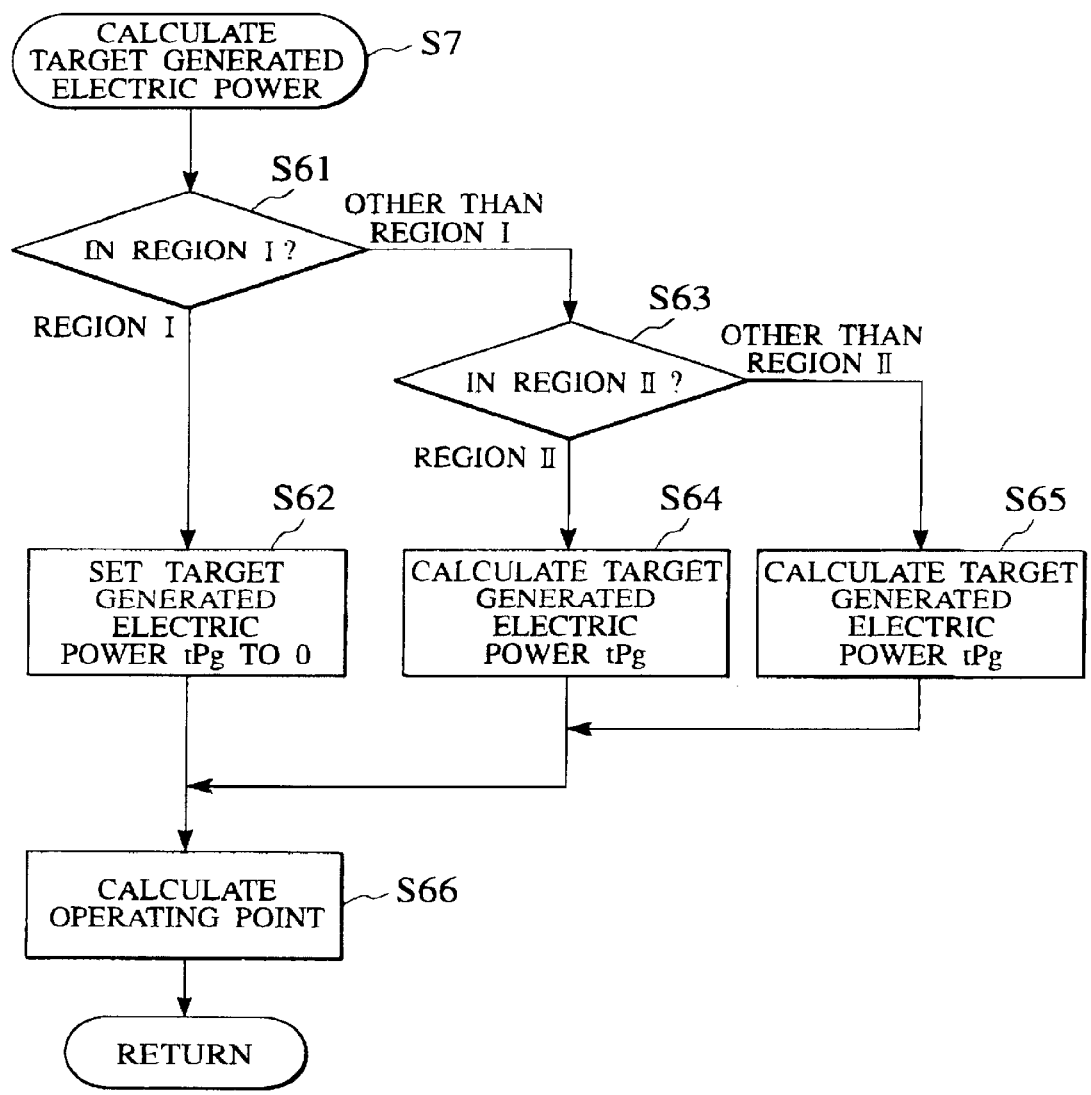
FIG. 13 is a flowchart of a target generated electric power calculating processing of the embodiment.

Details of the target generated electric power calculating processing in step S7 of the main flow are as shown in the flowchart in FIG. 13. If the judgment result is region I in step S6 and the first operating mode is selected, the target generated electric power tPg[W] of the generator 2 is set to 0 as explained with reference to FIG. 4 (steps S61 and S62). In this case, all electric power to be consumed by the motor 3 and the like is sent from the battery 5.

If the judgment result is region II in step S6 and the second operating mode is selected, the target generated electric power tPg is calculated based on the effective fuel consumption rate curve C3 obtained in the physical quantity calculating processing per effective electric power in step S4 and based on the threshold value Vc obtained in the threshold value calculating processing in step S5 as explained with reference to FIG. 5 (steps S61, S63 and S64). More specifically, electric power at an intersection between the threshold value Vc and the curve C3 corresponding to the electric power consumption tPn among the effective fuel consumption rate curves C3 is defined as a target generated electric power tPg. In this case, surplus electric power with respect to the electric power consumption tPn is charged into the battery 5.

If the judgment result is region III in step S6 and the third operating mode is selected, the target generated electric power tPg is calculated based on the effective fuel consumption rate curve C1 obtained in the physical quantity calculating processing per effective electric power in step S4 and the threshold value Vc obtained in the threshold value calculating processing in step S5 explained with reference to FIG. 6 (steps S61, S63 and S65). More specifically, a maximum value of intersections between the effective fuel consumption rate curve C1 and the threshold value Vc is defined as the target generated electric power tPg. In this case, insufficient electric power with respect to the electric power consumption tPn is compensated by discharging from the battery 5.

Figure 18:
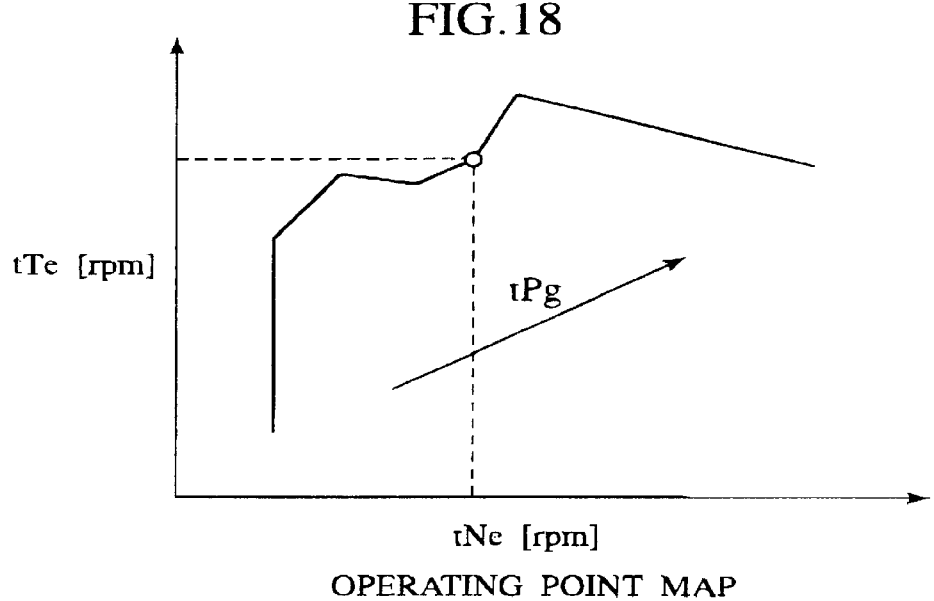
FIG. 18 is a map of operating point used in the embodiment.

In step S65, an operating point of the engine 1 and an operating point of the generator 2 satisfying the target generated electric power tPg are calculated. FIG. 18 shows an example of an operating point map for calculating the operating point of the engine 1. This map is formed while taking the fuel consumption rate of the engine 1 and the electric power generating efficiency into consideration, and the map calculates the operating point such that the fuel consumption amount when the target generated electric power tPg is generated becomes minimum. In this map, a target engine rpm speed Ne[rpm] and a target engine torque tTe[Nm] are calculated based on the following equation 3 from a target generator rpm speed tNg[rpm] and a target generator torque Tg[Nm] by retrieving a value corresponding to a target generated electric power.

$$tNg = tNe$$
$$tTg = -tTe \qquad \text{[Equation 3]}$$

According to the first embodiment of the present invention, electric power from the electric power generating apparatus (engine 1 and generator 2) is once charged into the battery 5, a physical quantity and a threshold value concerning the electric power generating apparatus per effective electric power corresponding to electric power consumption which was calculated while taking energy conversion efficiency of the electric power generating apparatus and the battery 5 at the time of future discharging are compared, thereby determining the operating mode of the electric power generating apparatus and the battery 5 and the target generated electric power of the electric power generating apparatus. Therefore, it is possible to increase or reduce the predetermined physical quantity concerning the electric power generating apparatus as compared with the related art.

Figure 19:
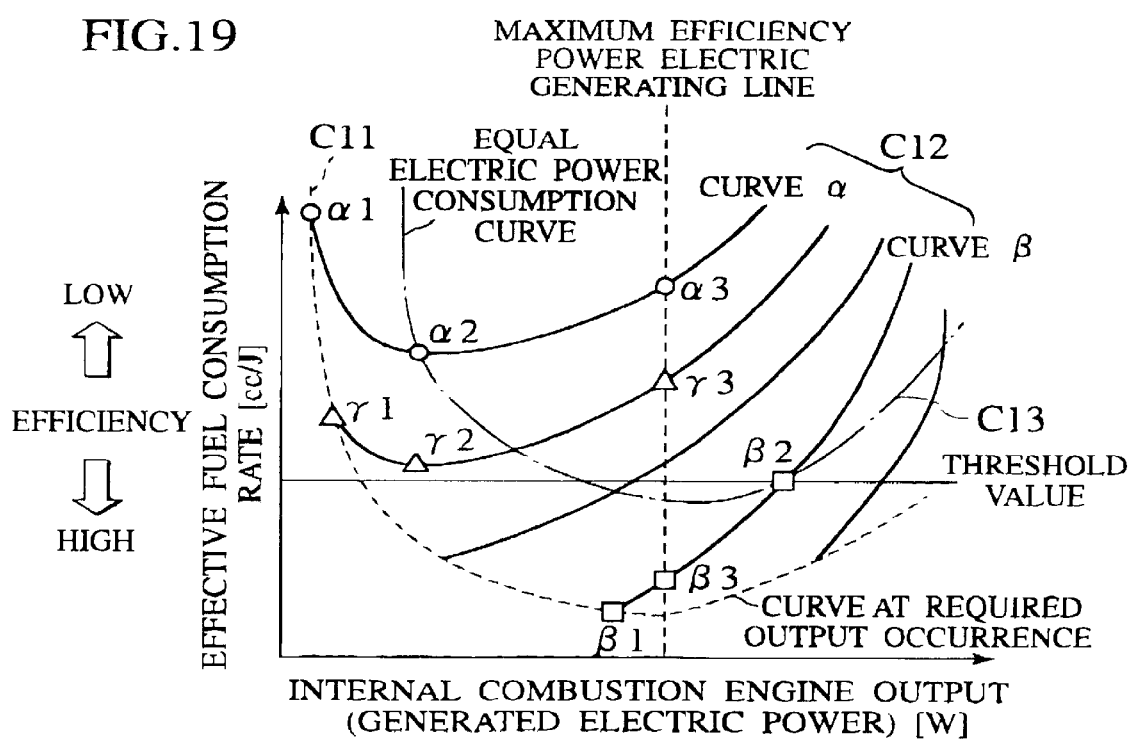
FIG. 19 is a graph showing operation characteristic of the embodiment.

Concerning this point, the present invention is compared with the relevant parallel hybrid electric vehicle using FIG. 19. In FIG. 19, a curve C11 shown with a broken line shows an effective fuel consumption rate which is a fuel consumption amount per effective power (effective electric power amount in the case of the present invention) when required output (electric power consumption in the case of the present invention) to be consumed for running or auxiliary equipment is generated in the engine (generator 2 in the case of the invention). Curves C12 shown with solid lines show effective fuel consumption rate when surplus output with respect to required output is generated, and the surplus output is increased. Each solid line is for each electric power consumption, and a solid line closer to right side shows higher load having greater required output.

In the related art, a power source at the time of running is relatively compared with efficiency concerning fuel consumption amount when the vehicle runs using the engine or the generator, and one of them having higher efficiency is selected. On the other hand, in the present invention, electric power supply source (generator 2 and battery 5) to the running motor 3 is selected using absolute criteria, i.e., threshold values concerning the fuel consumption amount designed by a designer.

For example, if the required output (corresponding to electric power consumption in the present invention) to be consumed for running or auxiliary equipment is α1, effective fuel consumption rate when surplus output which is equal to or greater than the required output is varied is that shown with the curve α. In this related art, the engine is selected as a power source at the time of running of the vehicle, output which is equal to or greater than required output is generated at a point α2 at which efficiency is low in the entire operating points of running is generated, and electric power generated using the surplus output is charged into the battery 5. However, if the same electric power is charged, it is apparently efficient to generate electricity at an intersection β2 of a chain line equal charging electric power curve C13 on a curve β when the required output is β1. In the related art, however, when the required output is β1, only the required output β1 at which the efficiency in the engine becomes maximum is generated, and the battery 5 is not charged. As a result, the electric power is generated in a low efficient state, and electric power is not generated in efficient state. This means that at the time of a predetermined required output, for example, when the required output is α1, α1 and α2 are compared with each other, and the greater α2 is selected, and when the required output is Y1, Y2 is selected, and the required output is Y1, Y1 is selected. This is a cause of selecting a power source having higher efficiency if compared relatively and as a result, electric power generation in low efficient state is selected in view of absolute point. That is, in the related art, it is found that a power source capable of minimizing the fuel consumption amount is not always selected throughout the entire running of the vehicle.

Whereas, in the case of the present invention, a power supply source (electric power generating apparatus and battery 5) to the running motor 3 is selected using absolute criteria which are threshold values concerning the fuel consumption amount set by the designer. Therefore, under a normal condition, when charging is not required in a hurry, the threshold value is set such that the efficiency is enhanced as high as possible to generate electric power in which efficiency is enhanced. When the electric power is charged in a low efficient state, this is limited to a case in which a designer's will to charge even if the efficiency is low is reflected to the threshold value, and its amount is set to be minimum.

Further, according to the present invention, when the efficiency is lowered if electric power is generated, although it depends on the setting of the threshold value, the battery 5 charged with electric power in a high efficient state is defined as an electric power supply source, thereby avoiding the electric power generation with low efficiency. With this method, the fuel consumption amount can be reduced.

In the case of the related art, a power source can not be selected while setting the efficiency at the time of electric power generation to a predetermined value. This is because that in this case also, the power source is selected by relative comparison when it is decided that electric power generation is necessary, and as a result, electric power is generated only when the required output is relatively small and efficiency is low, and electric power can not be generated when the required electric power is relatively great and the efficiency is high. The efficiency of the operating point is largely varied in accordance with the required output, and the efficiency is remarkably lowered when the required output is low.

Whereas, in the case of the present invention, the threshold value is set according to a designer's will to control the efficiency at the time of power generation, and it is possible to select the electric power supply source which allows the vehicle to run at effective fuel consumption rate having a threshold value equal to or lower than the set threshold value. Therefore, it is possible to set the effective fuel consumption rate with minimum threshold value in a range where there is no problem for running, and to reduce the fuel consumption amount more effectively.

Here, the control method of the present invention is compared with a case in which an operating point of an engine which is widely known as a power generation control method on a series hybrid electric vehicle is used as a maximum efficiency power generating point in the engine and the generator, thereby generating electric power. In FIG. 19, a vertical thick broken line is a maximum electric power generation efficiency line, and shows an effective fuel consumption rate when electric power is generated at the maximum efficiency electric power generating point at the time of required output. In this case also, selection is largely varied in operating point efficiency in accordance with the required output as in the related art. Further, since the generation amount of electric power is small in a high efficient state and the generation amount is great in a low efficient state, low efficient electric power generation is increased naturally. Especially when the required output is low, the efficiency is extremely reduced. The efficiency at the time of electric power generation is varied from lower electric power consumption like Y3→Y3→β3. Therefore, in this electric power generation method, the fuel consumption amount through the entire running operation is not always minimum. That is, in this invention, the fuel consumption amount can be reduced more efficiently as described above.

Further, if the physical quantity per effective electric power is defined as an exhaust gas amount per effective electric power in the engine, the exhaust gas amount can be reduced as compared with the related art. The same can be said when the electric power generating apparatus is a fuel cell. Further, a designer who applies the present invention only need to use the calculation method of a threshold value. With this operation, the operating mode or target generated electric power can be determined uniquely in accordance with the running state, and a system can be designed with high visibility.

In addition, according to the present embodiment, since the electric power generating apparatus comprises the engine 1 and the generator 2, a physical quantity concerning the engine 1 can be increased or reduced in a preferred direction as compared with the related art. Further, if a fuel cell is used as the electric power generating apparatus, a physical quantity concerning the fuel cell can be increased or reduced in a preferred direction as compared with the related art. For example, if the physical quantity per effective electric power is defined as an electric power amount of the fuel cell or a fuel consumption amount per electric power, it is possible to reduce the fuel consumption amount with respect to the electric energy as compared with the related art. Further, if the physical quantity per effective electric power is defined as an exhaust gas amount per electric power in the engine or fuel cell, it is possible to reduce the exhaust gas amount with respect to the electric energy as compared with the related art.

Further, according to the present embodiment, by comparing the physical quantity per effective electric power corresponding to the electric power consumption and the threshold value with each other, it is possible to select an operating mode which increases or reduces a predetermined physical quantity concerning the electric power generating apparatus as compared with the related art.

In the first operating mode, since the electric power consumption is compensated by the discharge of the battery 5, it is unnecessary to generate electric power which deteriorate the efficiency with respect to the threshold value in the electric power generating apparatus. In the second operating mode, since electric power is generated with equal or better efficiency with respect to the threshold value in the electric power generating apparatus and surplus electric power with respect to the electric power consumption is charged into the battery 5, the electric power is not generated in a state in which efficiency with respect to the threshold value is deteriorated in the electric power generating apparatus unlike the first and third operating modes, and the vehicle can run using electric power charged into the battery 5 efficiently.

In the third operating mode, the maximum electric power which is equal to or lower than the threshold value is efficiently generated in the electric power generating apparatus, and insufficient electric power with respect to the electric power consumption is discharged from the battery 5, it is unnecessary to generate electric power which lowers the efficiency with respect to the threshold value. Further, as compared with a case in which all the electric power consumption is compensated by the discharge from the battery 5 at the time of a relatively high load, a large quantity of electric power is not discharged from the battery 5. Therefore, it is possible suppress an abrupt temperature rise or performance deterioration of the battery 5, and a volume thereof can be reduced.

In the fourth operating mode, the threshold value and the physical quantity per effective electric power corresponding to the electric power consumption are equal to each other, it is possible generate the electric power with efficiency equal to the threshold value in the electric power generating apparatus.

Next, a control system for a hybrid vehicle according to a second embodiment of the pee will be explained with reference to FIG. 20. A system structure of the second embodiment of the invention is the same as that of the first embodiment shown in FIG. 1, and a functional structure of the electric power distribution controller 6 is also the same as that of the first embodiment shown in FIG. 2. The second embodiment is characterized in a function of a threshold value calculator 22 in the electric power distribution controller 6.

In the second embodiment, the threshold value calculator 22 determines a physical quantity which is an evaluation criterion concerning the engine 1 in accordance with SOC calculated by the battery state calculator 21. When this physical quantity is an effective fuel consumption rate, the physical quantity is determined in a manner shown in FIG. 20. In FIG. 20, a maximum permissible value Lmax and a minimum permissible value Lmin which are respectively upper and lower limit values in a range capable of utilizing the SOC of the battery 5 are respectively associated with a feasible minimum value Vcmin of a fuel consumption rate and a maximum permissible value Vcmax determined by a designer.

By establishing the above relation, it is possible to control the charging and discharging in such a manner that the charging is permitted only when the effective fuel consumption rate is good in a state in which the storing amount of the battery 5 is high, and minimum charging is permitted even through the effective fuel consumption rate is relatively low in a state in which the storing amount of the battery 5 is low.

Next, a third embodiment of the present invention will be explained based on FIG. 21. The third embodiment is also characterized in a function of the threshold value calculator 22 in the electric power distribution controller 6. In the third embodiment, the threshold value calculator 22 determines a physical quantity which is an evaluation criterion concerning the engine 1 in accordance with voltage Vb between terminals detected by the battery state calculator 21. When this physical quantity is effective fuel consumption rate, as shown in FIG. 21, a maximum permissible value Vbmax and a minimum permissible value Vbmin which are respectively upper and lower limit values in a range capable of utilizing the voltage Vb between terminals of the battery 5 are respectively associated with a feasible minimum value Vcmin of a fuel consumption rate and a maximum permissible value Vcmax determined by a designer.

With this relation, it is possible to control the charging and discharging in such a manner that when the voltage Vb between terminals is high, i.e., when the stored electricity amount of the battery 5 is large and charging efficiency is excellent, the charging is permitted only when the effective fuel consumption rate is excellent, and when the stored electricity amount is small, minimum charging is permitted even if the effective fuel consumption rate is somewhat low.

In the third embodiment, an internal resistance can be used instead of the voltage between terminals of the battery 5 can also be used. That is, a physical quantity which is an evaluation criterion concerning the engine 1 obtained by the threshold value calculator 22 is determined in accordance with the internal resistance of the battery 5. As shown in FIG. 22, a minimum permissible value Rnmin and a maximum permissible value Rnmax which are respectively lower and upper limit values in a range capable of utilizing the internal resistance Rn of the battery 5 are respectively associated with a feasible minimum value Vcmin of a fuel consumption rate and a maximum permissible value Vcmax determined by a designer.

With this relation, it is possible to control the charging and discharging in such a manner that when the internal resistance is small, i.e., when the stored electricity amount of the battery 5 is large and charging efficiency is excellent, the charging is permitted only when the effective fuel consumption rare is excellent, and when the internal resistance is large, i.e., when stored electricity amount is small, minimum charging is permitted even if the effective fuel consumption rate is somewhat low.

Figure 24:
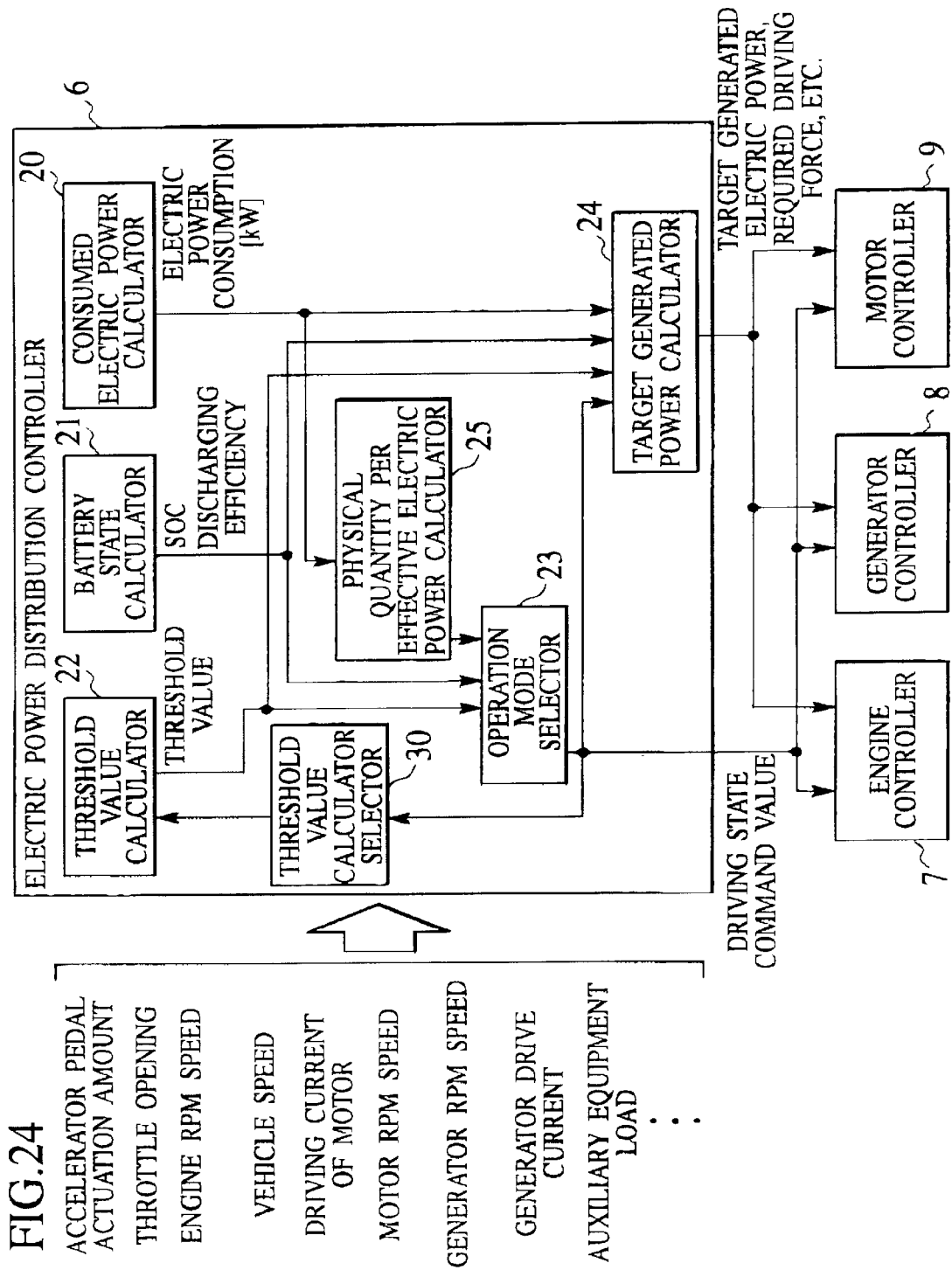
FIG. 24 is a block diagram showing a functional structure of an electric power distribution controller in a fifth embodiment.

Next, a fourth embodiment will be explained based on FIG. 24. The fourth embodiment is the same as the second embodiment shown in FIG. 20, but is characterized in its setting method of the threshold value as follows. That is, when a maximum permissible value Vcmax and a feasible minimum value Vcmin of a threshold value Vc are determined using the charging state SOC of the battery 5 as shown in FIG. 23, a value which is smaller, by α, than the upper limit Lmax in a range where the charging state of the battery 5 can be utilized is defined as a threshold value which corresponds to the feasible minimum Vcmin of the effective fuel consumption rate, and a value which is greater, by α, than the lower limit Lmin in a range where the charging state can be utilized is defined as a threshold value which corresponds to the maximum permissible value Vcmax of the effective fuel consumption rate.

With this arrangement, since the charging state SOC of the battery 5 reached the upper limit Lmax, it is possible to avoid a problem that energy caused by regenerative braking can not be collected, and to avoid a problem that electric power is generated in a state in which the efficiency is extremely bad since the charging state SOC reached the lower limit Lmin. This idea can be applied also to the third embodiment shown in FIGS. 21 and 22.

Figure 25:
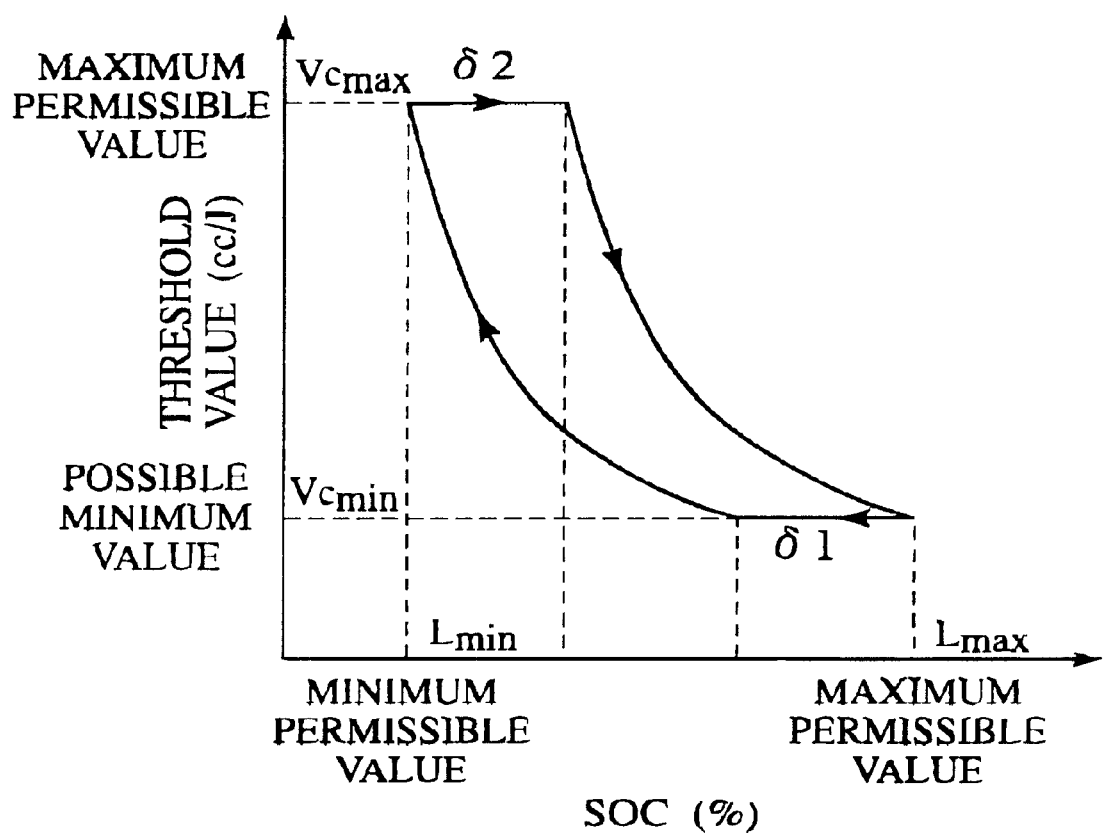
FIG. 25 is a graph showing a relationship between SOC and threshold value used in the embodiment.

Next, a fifth embodiment of the present invention will be explained based on FIGS. 24 and 25. The fifth embodiment is characterized in that the electric power distribution controller 6 additionally includes a threshold value calculator selector 30 in the first embodiment shown in FIG. 2. Other structure is the same as that of the first embodiment shown in FIG. 2.

The threshold value calculator selector 30 decides whether the system is in the charging state or the discharging state based on a result of selection of an operating mode selector 23 so that a variation in a threshold value exhibits hysteresis. That is, when the maximum permissible value Vcmax and the feasible minimum value Vcmin of the threshold value Vc is determined using the charging state SOC of the battery 5, the threshold value is set such that the threshold value corresponds to the feasible minimum value Vcmin of the effective fuel consumption rate until the upper limit Lmax is reduced by δ1 after the charging state of the battery 5 reached the upper limit Lmax in a range that can be utilized, and the threshold value is set such that the threshold value corresponds to the maximum permissible value Vcmax of the effective fuel consumption rate until the charging state is increased by δ2 after the charging state reached the lower limit Lmin that can be utilized. With this arrangement, it is possible to prevent the hunting of switching of the threshold value.

Figure 26:
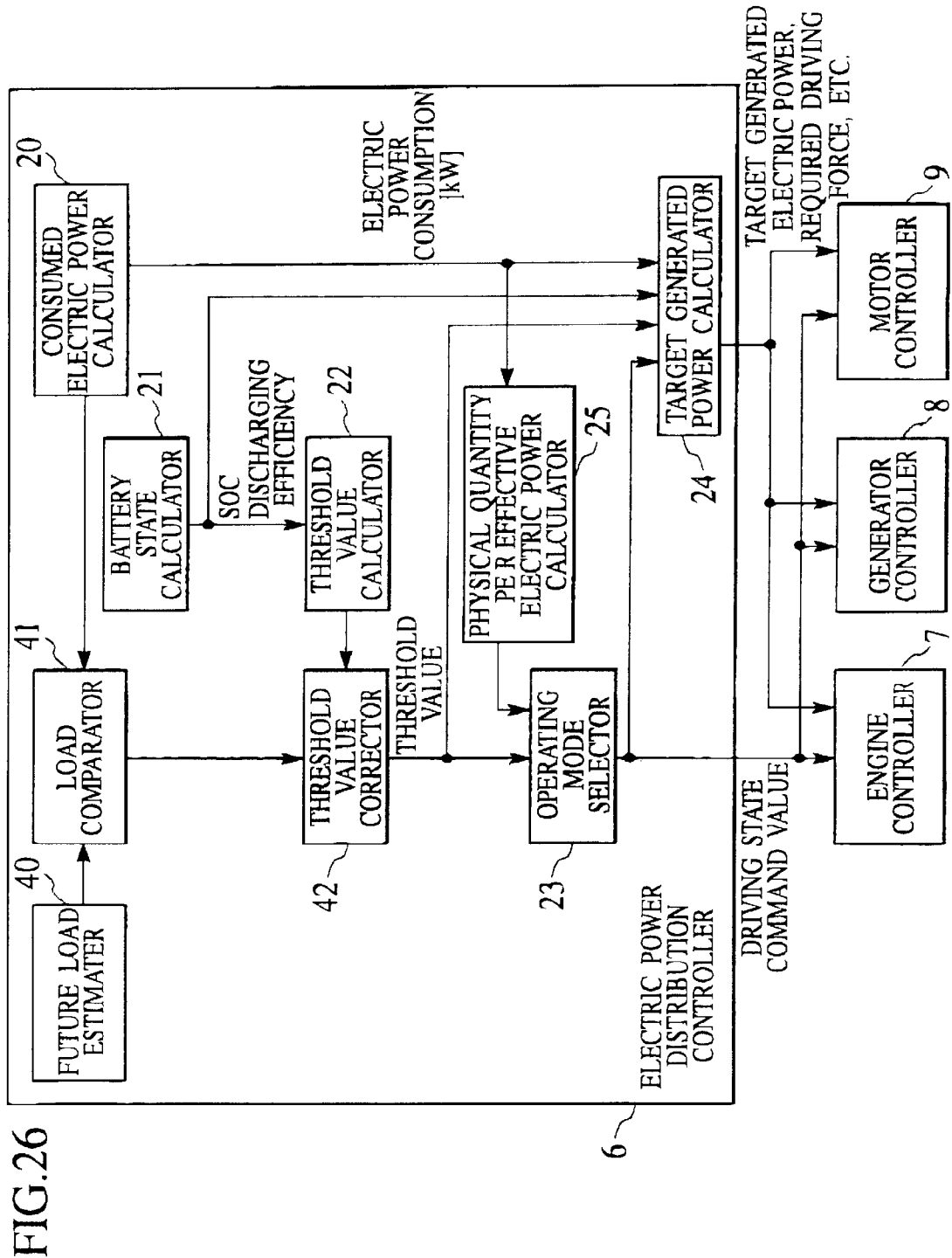
FIG. 26 is a block diagram showing a functional structure of an electric power distribution controller in a sixth embodiment.

Next, a sixth embodiment of the present invention will be explained based on FIG. 26. The sixth embodiment is characterized in that a future load estimator 40, a load comparator 41 and a threshold value corrector 42 are added to the electric power distribution controller 6 in the first embodiment shown in FIG. 2.

That is, the future load estimator 40 estimates future electric power consumption. The load comparator 41 compares the current electric power consumption and the estimated electric power consumption. The threshold value corrector 42 corrects a physical quantity which is an evaluation criteria concerning the engine 1 obtained by the threshold value calculator 22 in accordance with a result of the load comparison. In this correcting operation, if it is decided that the fuel consumption rate when the future electric power consumption is directly distributed is better as compared with a case in which the current electric power consumption is directly distributed, the threshold value is changed to a strict side (i.e., in the case of the effective fuel consumption rate, to a side in which its value is small). On the contrary, if it is decided that the fuel consumption rate when the future electric power consumption is directly distributed is worse as compared with a case in which the current electric power consumption is directly distributed, the threshold value is changed to a loose side (in the case of the effective fuel consumption rate, to a side in which its value is great).

By carrying out such a correction, if the charging of the battery 5 is expected with better efficiency, the charging is not carried out until then, and if there is a possibility to charge with low efficiency in the future, the charging is previously carried out at the current time so that the charging to the battery 5 can be carried out always with high efficiency.

The future load expecting processing carried out by the future load estimator 40 is one of or a combination of any of the following processing. One of them is a future driving state expecting processing which expects how long the acceleration state is continued, and from its result, expects how large the future electric power consumption will be, from the driving pattern or depressing state of the accelerator pedal immediately before driving of the vehicle.

Another processing is an auxiliary equipment driving state estimating processing which estimates how the driving state of an air conditioner varies from outside temperature, and from its result, expects how much electric power consumption will be required. Another processing is a road state estimating processing which estimates how much electric power consumption is required in the near future, from a gradient, a curvature, a variation in speed limit of ahead road obtained a map database provided in a navigation system for example, road information including busy degree of ahead road sent from a base station, a variation in driving state of ahead vehicle sent from a radar sensor and the like.

Figure 27:
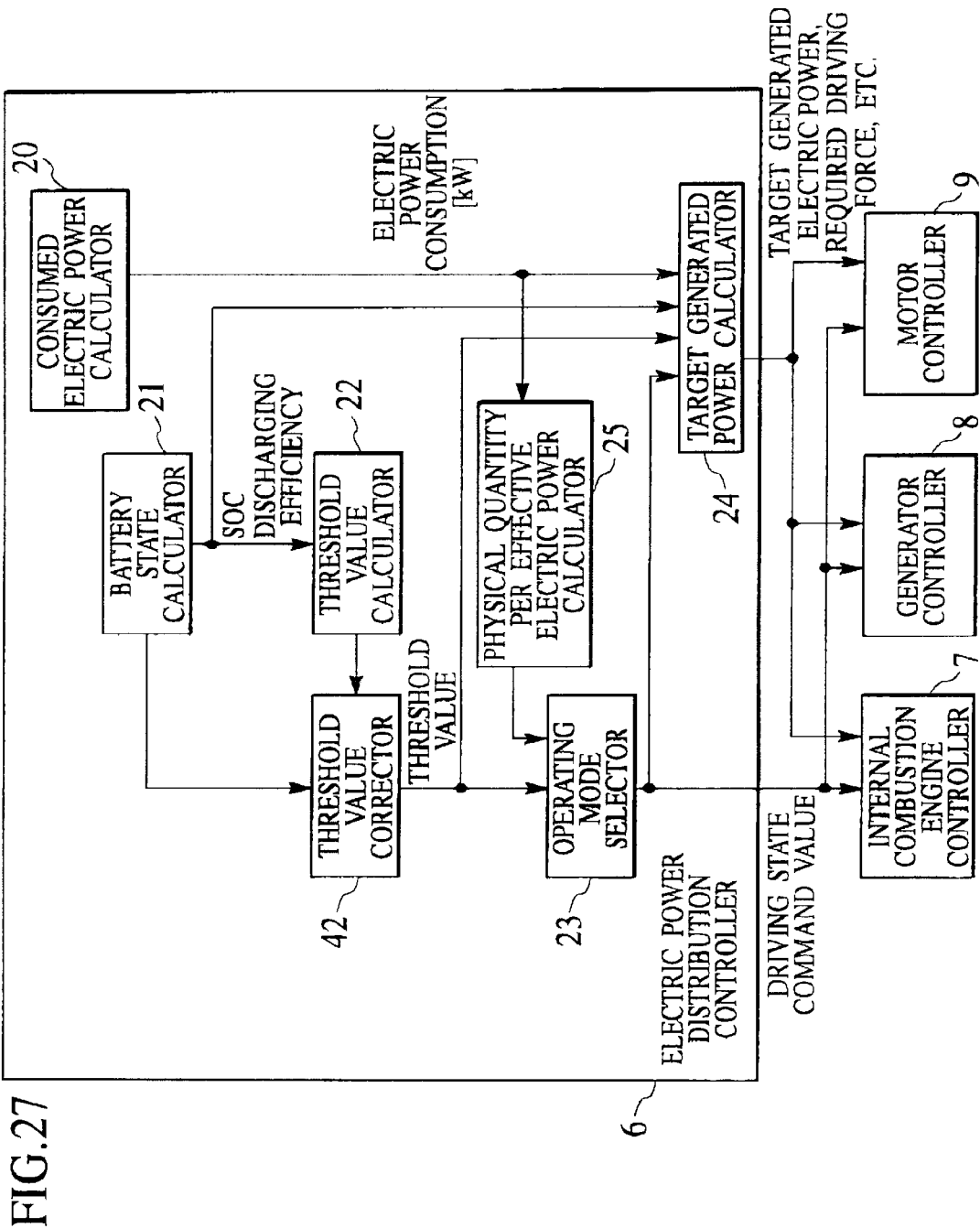
FIG. 27 is a block diagram showing a functional structure of an electric power distribution controller in a seventh embodiment.

Next, a seventh embodiment of the present invention will be explained based on FIG. 27 The seventh embodiment is characterized in that the electric power distribution controller 6 additionally includes a threshold value corrector 42 in the first embodiment shown in FIG. 2.

The battery state calculator 21 calculates the charging state SOC and the discharging efficiencies $\eta c$ and $\eta d$, detects a temperature state, and output the temperature state to the threshold value corrector 42.

The threshold value corrector 42 corrects a physical quantity which is an evaluation criteria concerning the engine 1 obtained by the threshold value calculator 22. In generally, the battery 5 has such a temperature characteristic that the discharging efficiency is lowered when the temperature is extremely low or high. Thereupon, if the temperature of the battery is in a range in which the charging efficiency is lower than a predetermined threshold value, the discharging to the battery 5 is prohibited or the threshold value is corrected such that the discharging amount becomes small. In this manner, the discharging to the battery 5 is prohibited or its amount is reduced in the state in which the charging efficiency is lowered so that electric power loss at the time of charging can be reduced.

Figure 28:
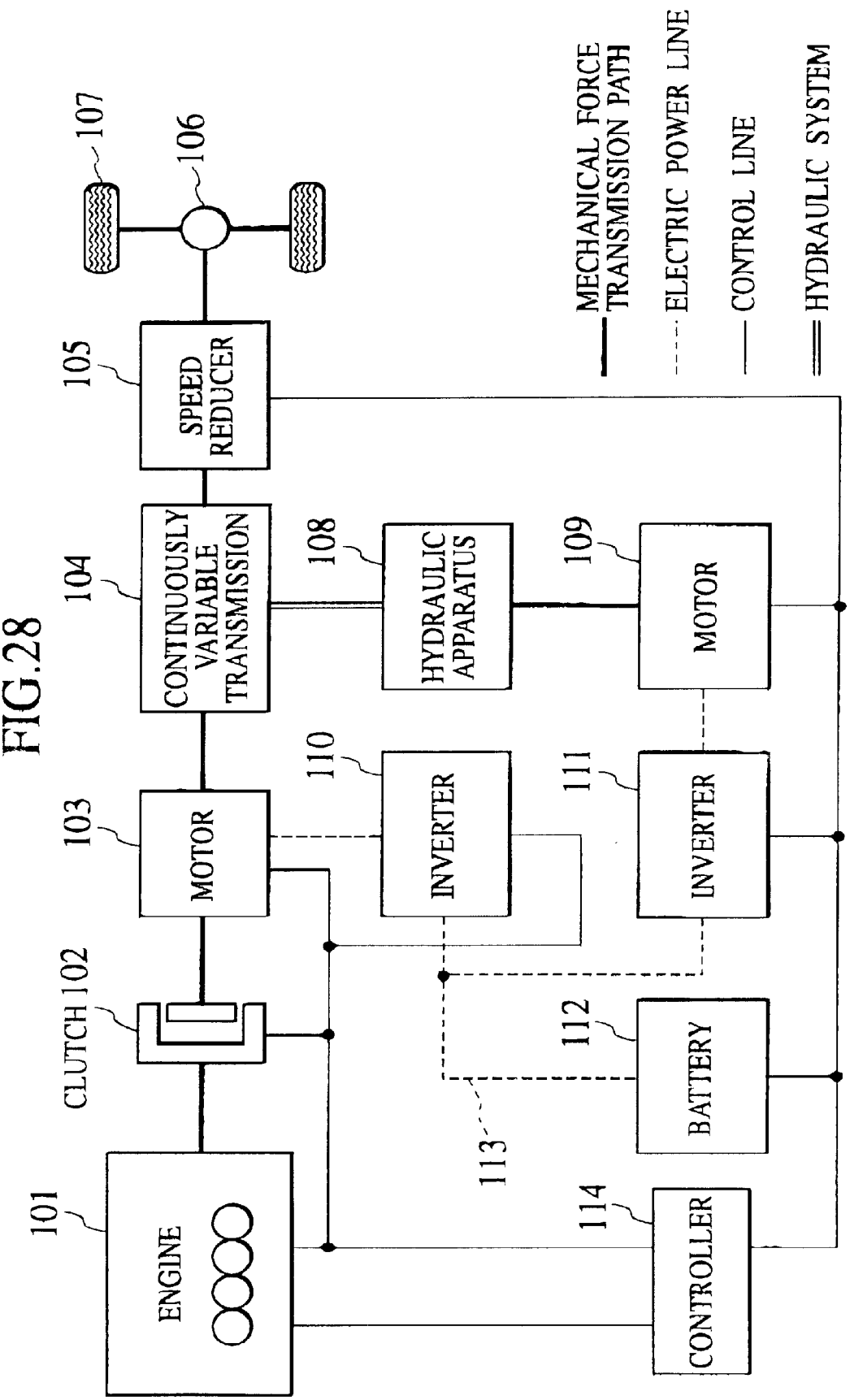
FIG. 28 is a block diagram showing a functional structure of an electric power distribution controller in an eighth embodiment.
Figure 29:
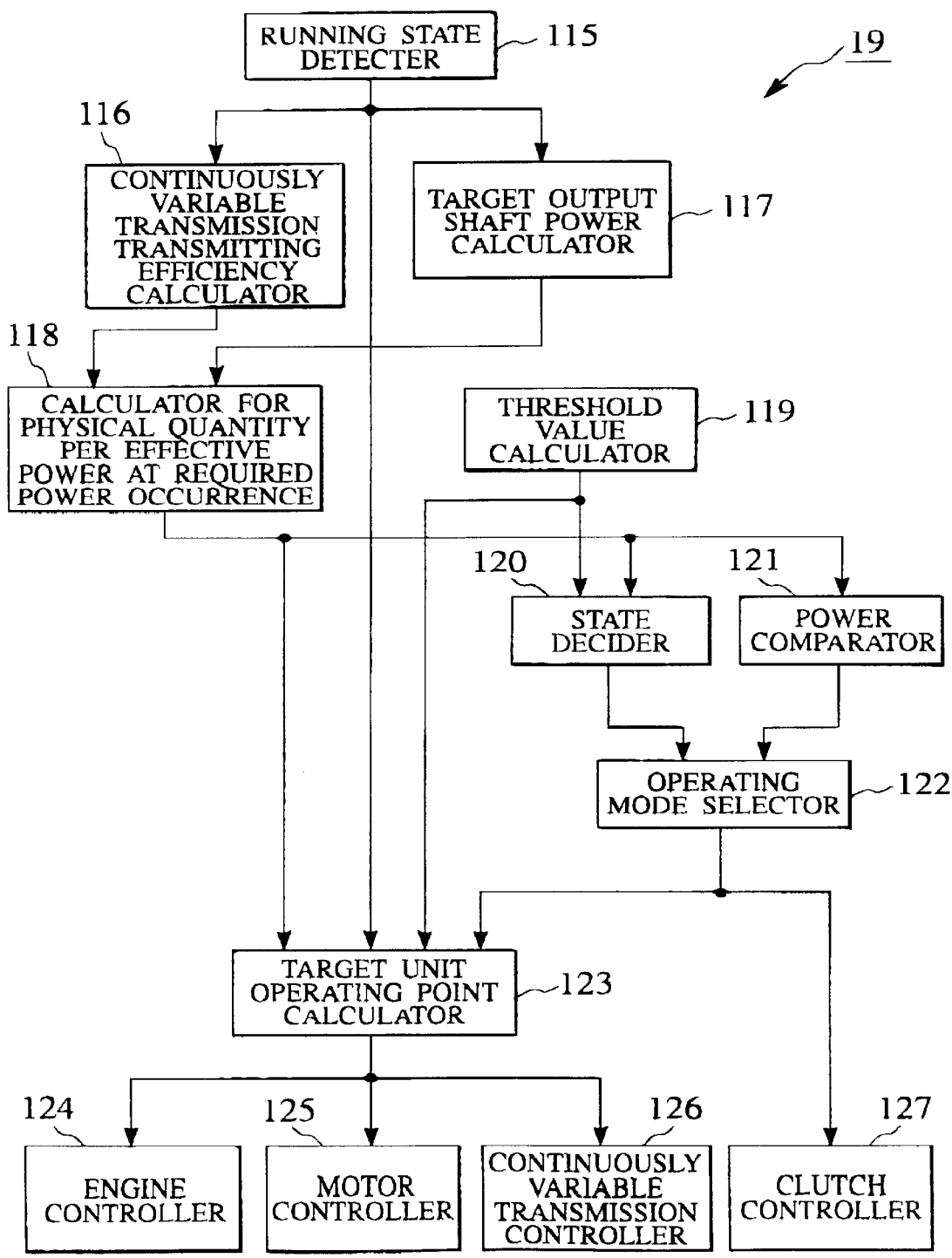
FIG. 29 is a block diagram showing a functional structure of a controller in the embodiment.

A control system for a hybrid vehicle of an eighth embodiment of the present invention will be explained based on FIGS. 28 and 29. In this embodiment, a belt-type continuously variable transmission 104 is used as the continuously variable transmission. In FIG. 28, a thick solid line indicates a control line, and a double line indicates a hydraulic system. A power train of this vehicle comprises an engine 101, a clutch 102, a motor 103, the continuously variable transmission 104, a speed reducer 105, a differential apparatus 106 and driving wheels 107.

An output shaft of the engine 101 and an input shaft of the clutch 102 are connected to each other. An output shaft of the clutch 102, an output shaft of the motor 103 and an input shaft of the continuously variable transmission 104 are connected to each other.

The clutch 102 is a powder clutch, and can adjust transmitted torque. When the clutch 102 is fastened, the engine 101 and the motor 103 becomes driving sources of the vehicle. When the clutch 102 is released, only the motor 103 becomes the driving source of the vehicle. The driving force of the engine 101 and/or the motor 103 is transmitted to the driving wheels 107 through the continuously variable transmission 104, the speed reducer 105, and the differential apparatus 106. It is also possible to use a dry single plate clutch or a wet multi-plate clutch as the clutch 102.

The motors 103 and 109 are driven by inverters 110 and 111, respectively. The inverters 110 and 111 are connected to a battery 112 through a common DC link 113. The inverter 110 converts DC charging electric power to AC electric power and supplies the same tot he motor 103, and converts AC electric power of the motor 103 to DC electric power to charge the battery 112. The inverter 111 converts DC effective electric power of the battery 112 to AC electric power and supplies the same to the motor 9.

These motors 103 and 109 are not limited to the AC mechanisms and may be DC motor. When DC motors are used as the motors 103 and 109, a DC/DC converter is used as the inverter.

Pressure oil is supplied to the continuously variable transmission 104 from a hydraulic apparatus 8, and an oil pump (not shown) of the hydraulic apparatus 8 is driven by a motor 9.

A toroidal type transmission may be used instead of the belt type continuously variable transmission 104, or a multistage transmission which stepwise changes speed may be used. The transmission may use a planetary gear, and one example thereof has a structure in which the engine is connected to a carrier, the motor is connected to a sun gear, and a ring gear is connected to an output, and the rpm speed of each of the carrier and the ring gear is changed in stepless manner by varying the rpm speed of the sun gear. In this case, even if the engine generates a power, it is possible to create a state in which the power is not transmitted to the output shaft by the transmission speed-change ratio. Therefore, a clutch is not required (this case will be described later).

It is possible use various batteries such as lithium-ion battery, nickel, hydrogen battery and lead battery, or electric double layer battery (so-called power battery).

The controller 114 decides how the driving states of the engine 101 and the motor 103 should be based on the accelerator operation of a driver (not shown) and a vehicle speed signal from a vehicle speed sensor, and generates command values with respect to the engine 101, the clutch 102, the motor 103 and the continuously variable transmission 104 to meet a result of the decision and the requirement of the driver who operated the accelerator.

A structure and operation of the controller 114 will be explained using FIG. 29. The controller 114 comprises a portion for selecting operating modes of the engine 101, the motor 103 and the clutch 102, a portion for calculating operating points of the engine 101, the motor 103 and the continuously variable transmission 104 realizing the operating mode, an engine controller 124, a motor controller 125, a continuously variable transmission controller 126 and a clutch controller 127 which control the engine 101, the motor 103, the continuously variable transmission 104 and the clutch 102, respectively.

The engine controller 124 controls the engine 101 for realizing a command value (e g., target torque or target rpm speed) from the portion which calculates the operating point. The motor controller 125 controls the motor 103 for realizing a command value (e.g., target torque or target rpm speed) from the portion which calculates the operating point. The continuously variable transmission controller 126 controls the continuously variable transmission 104 for realizing a command value (e.g., target transmission speed-change ratio) from the portion which calculates the operating point. The clutch controller 127 controls the clutch 102 for realizing an operating mode selected by the portion which selects the operating mode.

Details of the controller 114 will be explained below. A running state detector 115 detects a vehicle speed and an accelerator pedal actuation amount. The running state detector 115 obtains electric power coming in or out from the battery 112 from current coming in or from the battery 112 and voltage between terminals, and estimates SOC (State Of Charge) indicative of the state of charge of the battery 5, detects a temperature of the battery from a temperature sensor (not shown) disposed in the battery 112, and calculates an energy conversion efficiency (charging efficiency) when electric energy is charged into the battery 112 and an energy conversion efficiency (discharging efficiency) when electric energy is taken out from the battery 112 from the SOC and the battery temperature based on a previously measured battery characteristic.

A continuously variable transmission transmitting efficiency calculator 116 calculates a transmission efficiency corresponding to the vehicle speed using a storing apparatus which holds data of transmission efficiency characteristic corresponding to a transmission speed-change ratio at each vehicle speed.

A target output shaft power calculator 117 obtains a required driving force of a driver from a vehicle speed and an accelerator pedal actuation amount at that time, and calculate power in the output shaft which realizes the required driving force based on the vehicle speed.

A calculator 118 for physical quantity per effective power in the occurrence of required power calculate power (required power) of engine 101 required for realizing the power calculated in the target output shaft power calculator 117 while taking the fuel consumption characteristic of the engine 101 and the transmission efficiency of the continuously variable transmission 104, and calculates a predetermined physical quantity (physical quantity per effective power in the occurrence of the required power) concerning the engine 101 per unit amount of the output shaft at that time.

A threshold value calculator 119 calculates a physical quantity which is an evaluation criteria for selecting the operating mode in an operating mode selector 122 which will be explained below. The threshold value calculator 119 sets a threshold value having the same unit as the physical quantity per effective power in the occurrence of the required power. For example, when an energy utilizing efficiency is to be enhanced, the threshold value assumes a fuel consumption amount ("effective fuel consumption rate [cc/J], hereinafter) per unit power or a value corresponding to this, and when the exhaust gas is to be minimum, an exhaust gas amount per unit power is selected as the threshold value. In this embodiment, a case in which fuel consumption amount is to be reduced will be explained.

A state decider 120 compares and decides which one of a threshold value obtained by the threshold value calculator 119 and a physical quantity per effective power in the occurrence of the required power obtained by the physical quantity calculator 118 per effective power in the occurrence of the required power is greater.

A power comparator 121 compares and decides which one of a required power calculated in the physical quantity calculator per effective power when required power is occurred 118 and a power in the operating point of the engine 101 which minimizes a predetermined physical quantity concerning the engine 101 per unit power is greater.

An operating mode selector 122 determines an operating mode including driving/stop information of the engine 101 and the motor 103 in accordance with a result of decision of the state decider 120 and the power comparator 121, and decides whether the clutch 102 should be released or fastened to output a command to the clutch controller 127.

A target unit operating point calculator 123 calculates a target torque and target rpm speed of the engine 101 which realize an operating mode obtained by the operating mode selector 122, a target torque and target rpm speed of the motor 103, and a target transmission speed-change ratio of the continuously variable transmission 104, and outputs commands to the engine controller 124, the motor controller 125 and the continuously variable transmission controller 126.

Figure 30:
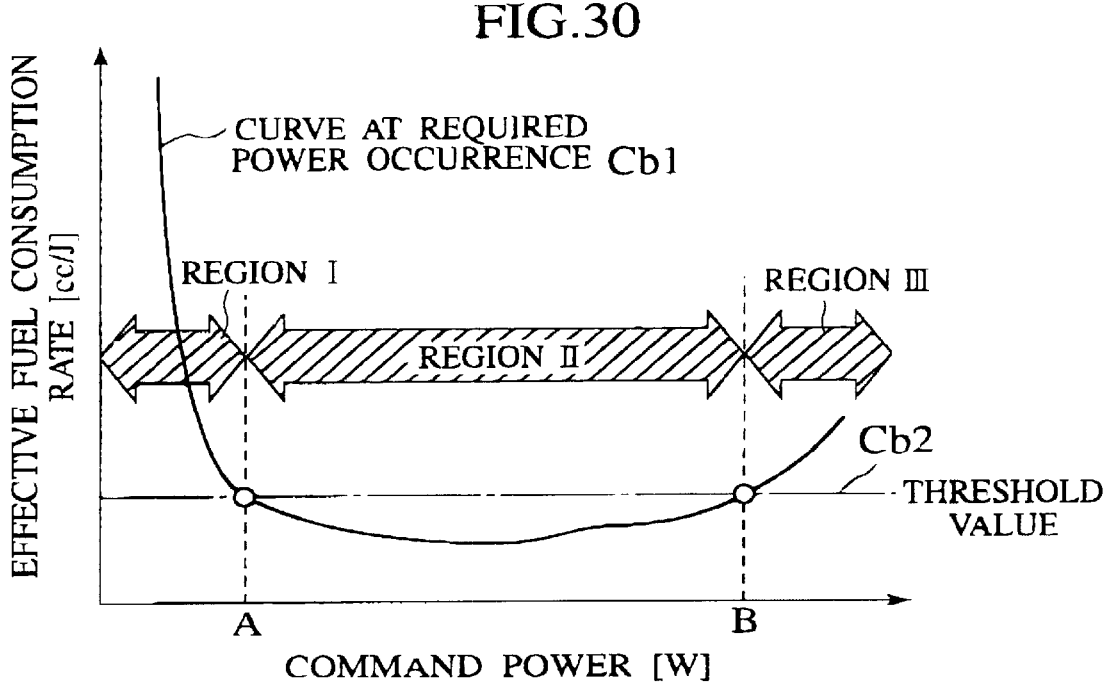
FIG. 30 is a graph showing criteria for selecting operating mode in the embodiment.

Next, the calculating processing of the operating mode selector 122 will be explained in detail. In FIG. 30, a curve Cb1 and a threshold value Cb2 are shown with chain lines. The curve Cb1 shows an effective fuel consumption rate in the occurrence of the required power in the engine 101 and transmitted to the driving wheels 107 through the continuously variable transmission 104, the speed reducer 105 and the differential apparatus 106. Intersections between the curve Cb1 and the threshold value Cb2 are points A and B. The threshold value Cb2 is calculated by the threshold value calculator 119, and in the following control, operating modes of the engine 101, the clutch 102 and the motor 103 which become effective fuel consumption rate equal to or lower than the threshold value, a target torque and target rpm speed of the engine 101, a target torque and target rpm speed of the motor 103 and a target transmission speed-change ratio of the continuously variable transmission 104 are set which become effective fuel consumption rate equal to or lower than the threshold value, a target torque and target rpm speed of the engine 101, a target torque and target rpm speed of the motor 103 and a target transmission speed-change ratio of the continuously variable transmission 104 are set.

When the required power is smaller than A[kW] (region I), control is carried out such that the engine 101 is stopped, the motor 103 is driven, the battery 112 is discharged, and the clutch 102 is released. When the required power is equal to or higher than A[kW] and equal to or lower than B[kW] (region II), control is carried out such that the engine 101 is driven, the motor 103 is driven, the battery 112 is charged, and the clutch 102 is fastened. When the required power exceeds B[kW] (region III), control is carried out such that the engine 101 is driven, the motor 103 is driven, the battery 112 is discharged, and the clutch 102 is fastened.

Next, calculating processing of the target unit operating point calculator 123 will be explained in detail based on FIGS. 31 to 33. As in FIG. 30, the curve Cb1 shows an effective fuel consumption rate when a required power is occurred in the engine 101. Curves Cb3 show an effective fuel consumption rate [cc/J] when power equal to or greater than the required power is occurred in the engine 101 and the surplus power is increased to increase the charging amount to the battery 112. Each curve Cb3 is obtained for each required power, and curve Cb3 which is closer to right side shows greater required power.

Figure 31:
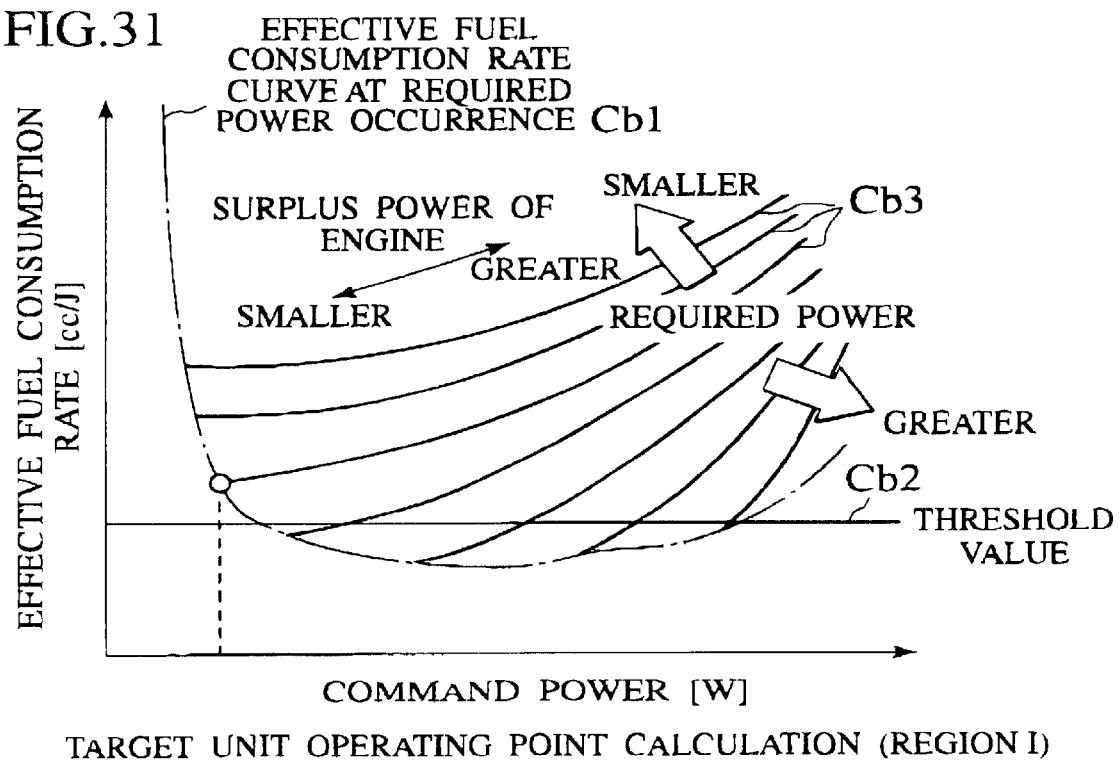
FIG. 31 is a diagram illustrating target unit operation point calculating processing (region I)

In FIG. 31, when the required power is in the region I, a point on a curve C showing the effective fuel consumption rate is great with respect to the threshold value Cb2, and if the engine 101 is driven, the efficiency with respect to the threshold value Cb2 is worsened. Therefore, the engine 101 is not driven, and output shaft power is generated by the motor 103 which is driven only by electric power discharged from the battery 112.

Figure 32:
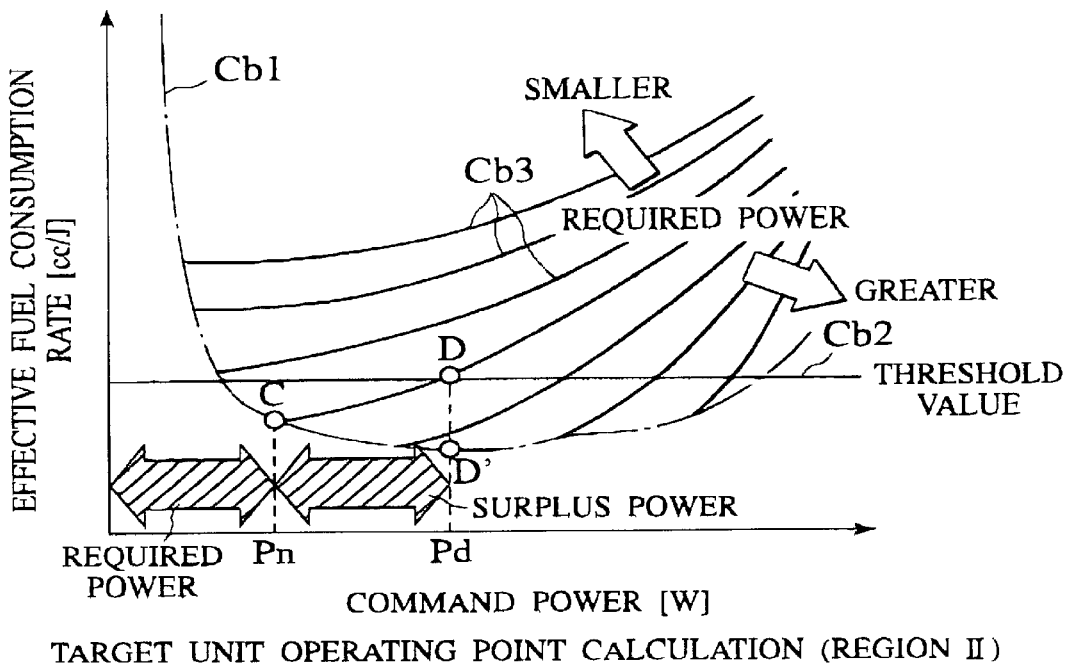
FIG. 32 is a diagram illustrating target unit operation point calculating processing (region II)

FIG. 32 shows a case in which the required power is in the region II. At a point in the region II, e.g., at a point C in FIG. 32, even if a required power (=Pn) calculated by the physical quantity calculator per effective power when required power is occurred 118 is occurred in the engine 101, the effective fuel consumption rate at that time is smaller than the threshold value Cb2. Therefore, it seems to be possible to generate a power corresponding to the required power in the engine 101. However, in the region where the effective fuel consumption rate becomes greater than the threshold value Cb2 when the engine 101 is driven, the motor 103 is driven by electric power discharged from the battery 112 to enhance the fuel economy. Therefore, it is preferable to charge the battery 112 efficiently as high as possible in a region where the threshold value is equal to or smaller than Cb2.

Thereupon, the engine 101 is driven at the point D in FIG. 32 so that the power (=Pd) generated in the engine 101 is increased and the effective fuel consumption rate becomes equal to the threshold value Cb2. A surplus power (=power Pd of the engine 101-required power Pn) which is a difference between the power of the engine 101 at the point D and output shaft power at the point C is used for generating electric power using the motor 103.

Here, power which is equal to the effective fuel consumption rate at the point D and power of the engine 101 at the point D is determined as a required power, and attention is paid to the effective fuel consumption rate at a point D' which is generated in the engine 101. A difference in effective fuel consumption rate of the points D and D' is generated from loss (motor efficiency, inverter efficiency, charging efficiency and discharging efficiency of the battery 112) generated when kinetic energy generated at the point D is once converted into electric energy by the motor 103 to charge the battery 112 and electric power is discharged from the battery 112. If it is assumed that a rate of loss with respect to surplus power used for generating electric power is constant, the loss is increased as the surplus power is greater. That is, the difference in effective fuel consumption rate at the points D and D' is increased.

Here, the effective fuel consumption rate may be calculated in such a manner that required power is previously used as parameter to obtain a value when surplus power which is added to the parameter is varied, and it is formed in a form of a map ("effective fuel consumption rate map" hereinafter). Of course, the value may not be formed in the form of a map, and it may be calculated by the CPU.

Figure 33:
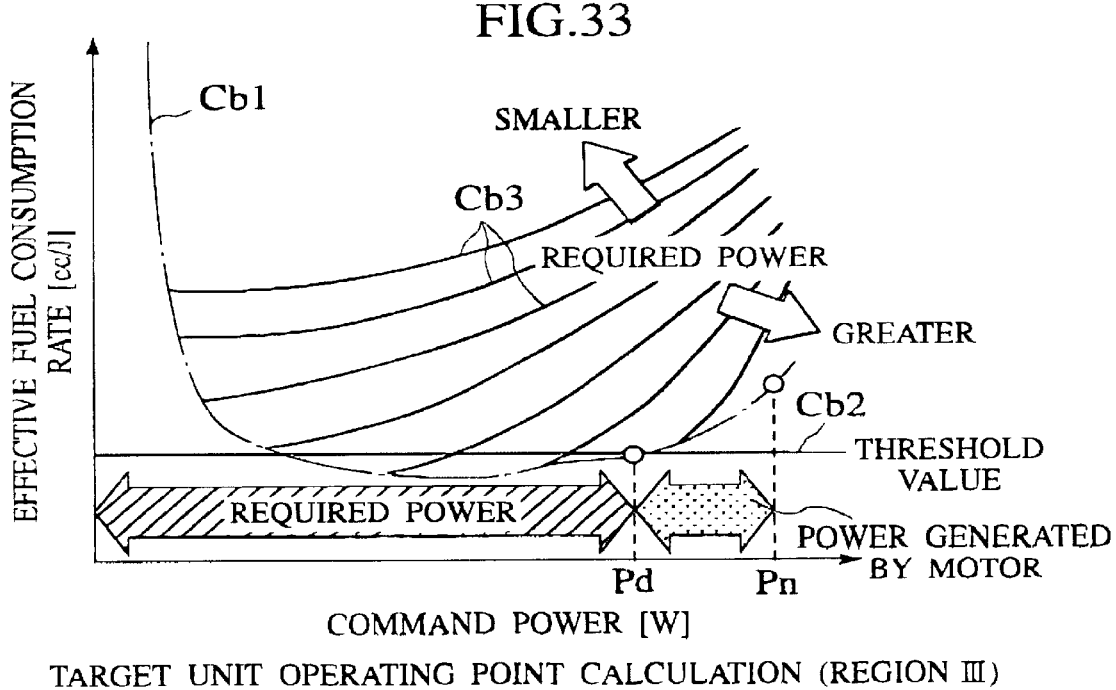
FIG. 33 is a diagram illustrating target unit operation point calculating processing (region III)

FIG. 33 shows a case in which the required power is in the region III. In this case, if the required power is occurred by the engine 101, the effective fuel consumption rate becomes greater than the threshold value. Therefore, the power generated by the engine 101 is set to a maximum value which is equal to or smaller than the threshold value Cb2, and insufficient power (=output shaft power Pn−power Pd of engine) is generated by the motor 103. As in the case in which the output shaft power is smaller than A[W], all the power may be compensated by the motor 103, but in this case, electric power coming in or out from the battery 112 is increased and loss caused by this is also increased and thus, all the power should not be compensated by the motor 103. However, when it is expected that a large quantity of electric power can be collected by regenerative braking, all the power may be compensated by the motor 103.

If effective fuel consumption rate when required power is occurred by the engine 101 is equal to the threshold value Cb2, the required power is occurred by the engine 101.

Next, control processing by the controller 114 shown in FIG. 29 will be explained in detail using flowcharts in FIGS. 34 to 41. These flowcharts are repeatedly calculated in a cycle of predetermined time.

Figure 34:
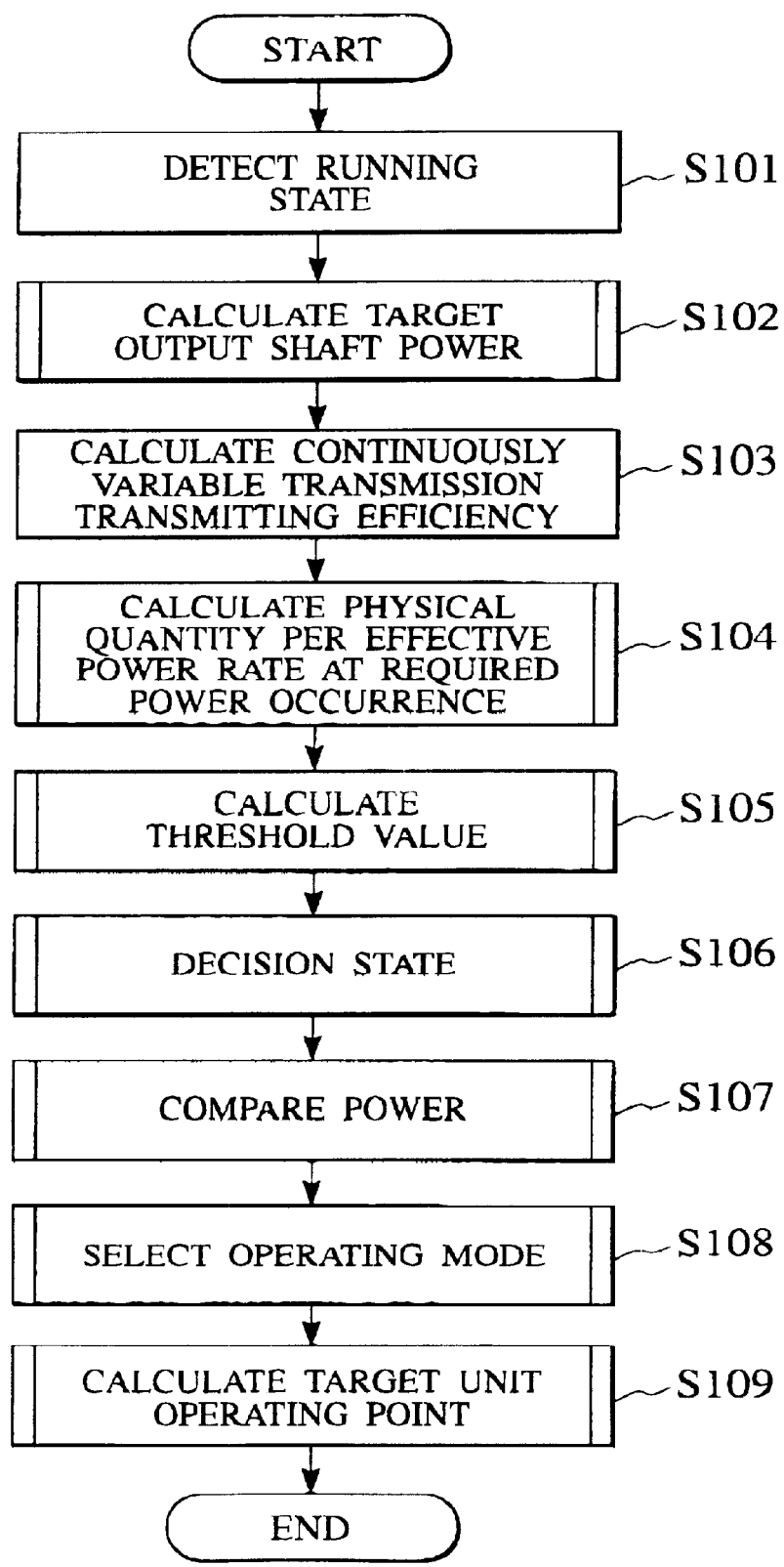
FIG. 34 is a flowchart of a main flow of the embodiment.

FIG. 34 shows the flowchart of a main flow of the control processing in this embodiment. In step S101, running states such as the vehicle speed VSP[km/h], accelerator opening acc[deg], $\eta c$ and charging efficiency $\eta d$ of the battery 112 are detected. Here, charging efficiency $\eta c$ and discharging efficiency $\eta d$ are calculated using average value of values obtained during past charging and discharging. These values may be calculated by learning of values when the last running is completed.

In step S102, power (output shaft power) tPd[W] generated in the output shaft is calculated to satisfy the driving force required by the driver. In step S103, transmitting efficiency data string with respect to the transmission speed-change ratio of the continuously variable transmission corresponding to the vehicle speed is calculated. In step S104, operating points of the engine 101, the motor 103 and the continuously variable transmission 104 capable of realizing the output shaft power with minimum fuel consumption amount are calculated, and a physical quantity per effective power in the occurrence of the required power when the power (required power) is occurred in the engine 101 using the calculated operating points is calculated.

In step S105, a threshold value for selecting the operating mode is calculated. In step S106, the threshold value and the physical quantity per effective power in the occurrence of the required power are compared in size. In step S107, the required power and the power at the operating point of the engine 101 which minimizes the amount of fuel consumed per unit power are compared in size.

in step S108, an operating mode is selected based on results of comparisons in steps S106 and S107. In step S109, operating points of the engine 101, the motor 103 and the continuously variable transmission 104 realizing the selected operating modes are calculated.

Figure 35:
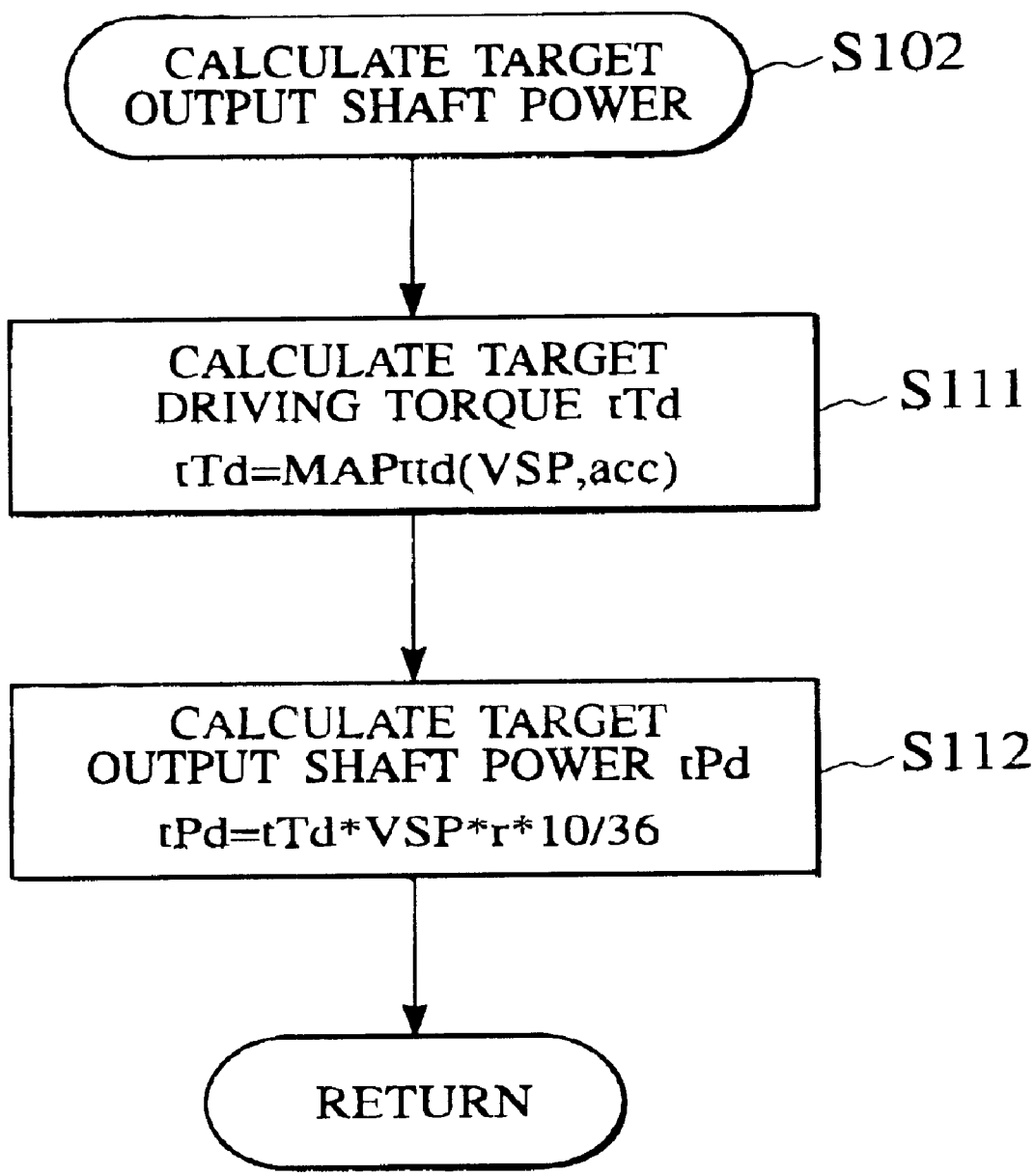
FIG. 35 is a detailed flowchart of target output shaft power calculating processing in the main flow of the embodiment.
Figure 43:
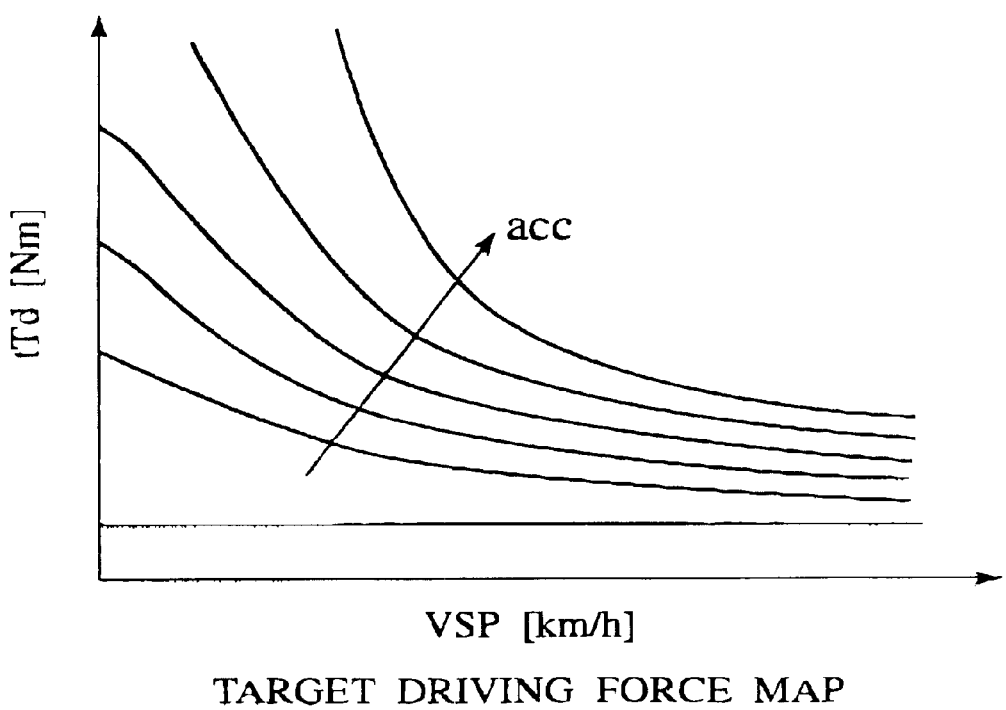
FIG. 43 is a graph showing one example of a target driving force map in the hybrid vehicle of the embodiment.

FIG. 35 is a flowchat showing detailed processing in step S102 for calculating the target output shaft power in FIG. 34. In step S111, a MAPttd (VSP, acc) is retrieved using map based on the vehicle speed VSP[km/h] and the accelerator opening acc[deg], thereby calculating the target driving torque tTd[Nm]. FIG. 43 shows an example of a target driving torque calculating map MAPttd (VSP, acc). This map is formed in such a manner that a driving force tTd required by the driver is estimated from the vehicle speed VSP and the accelerator opening acc at that time, and the estimated value tTd is formed in a form of a map. A dynamic compensation may be added to the target driving torque tTd by a variation limit or temporarily delay element for enhancing the driving performance after map retrieving.

In step S122, a target output shaft power tPd[W] is calculated by the following equation 4 based on the vehicle speed VSP, the target driving torque tTd and tire effective radius r[m].

$$tPn = tTd \cdot VSP \cdot r \cdot \frac{10}{36} \qquad \text{[Equation 4]}$$

Figure 36:
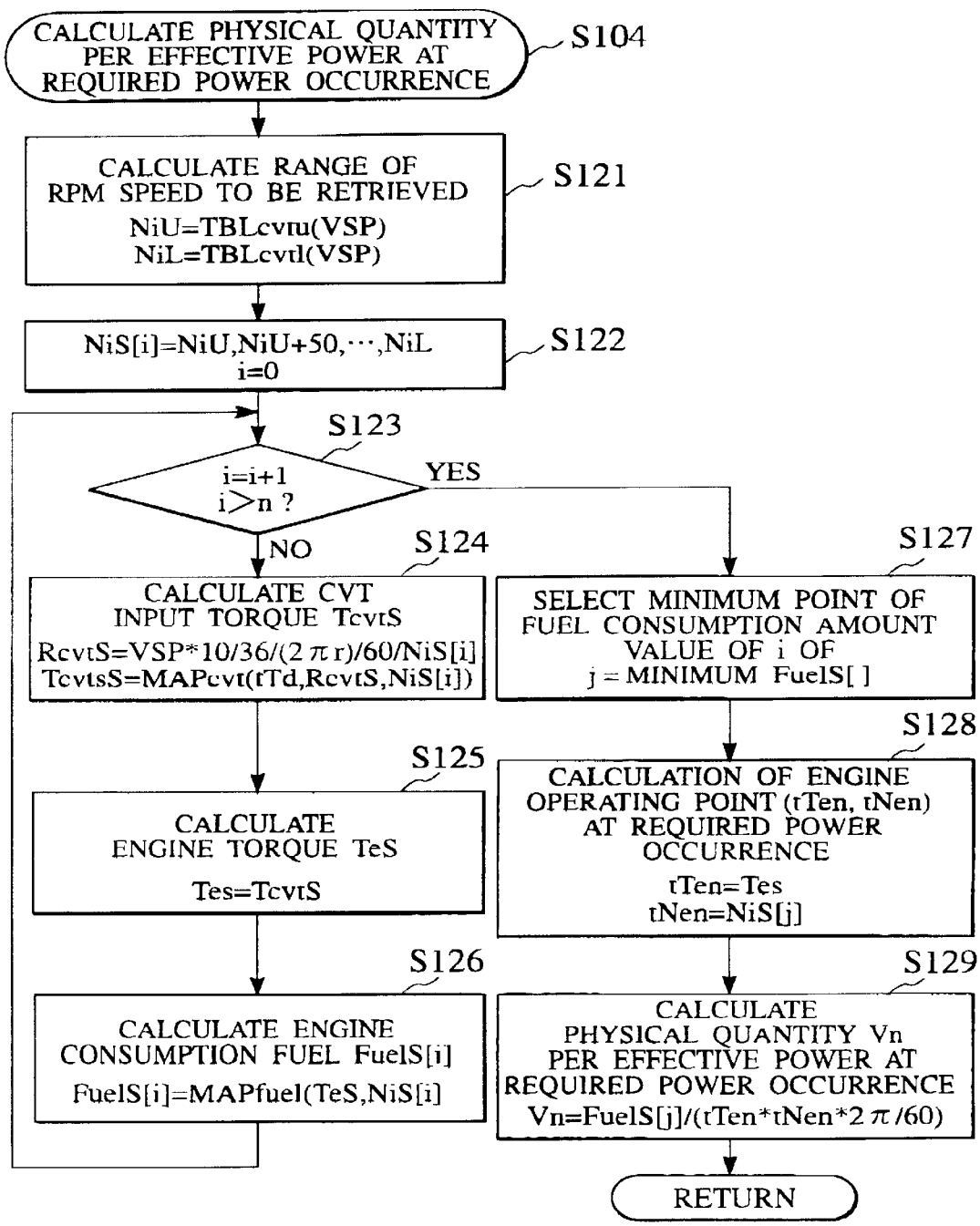
FIG. 36 is a detailed flowchart of physical quantity calculating processing per effective power when required power is occurred in the main flow of the embodiment.
Figure 44:
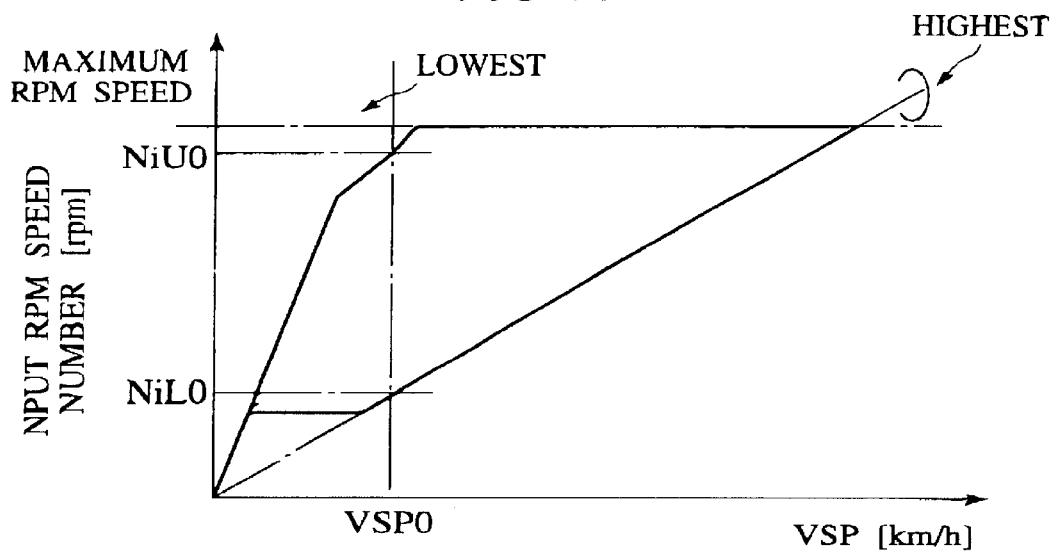
FIG. 44 is a graph showing possible range of rpm speed of an engine of the hybrid vehicle of the embodiment.

FIG. 36 is a flowchart showing detailed processing in step S104 for calculating a physical quantity per effective power in the occurrence of the required power in FIG. 34. In step S121, an rpm speed upper limit value NiU[rpm] and an rpm speed lower limit value NiL[rpm] are obtained from a table TBLcvtu(VSP) associated with an upper limit value of the engine rpm speed Ni[rpm] which can be taken in accordance with the vehicle speed VSP and from a table TBLcvtl(VSP) associated with a lower limit value. For example, if a range of the engine rpm speed which can be taken by limitation of the continuously variable transmission 104 is determined as shown in FIG. 44, the following associations are taken: Nil0=TBLcvtl(VSP0), NiU=TBLcvtu(VSP0).

In step S122, as the engine rpm speed for calculating the fuel consumption amount in the subsequent processing, strings NiS[n] (n is number of strings which is determined by NiL and NiU) which are divided every 50[rpm] from the rpm speed lower limit value NiL to the rpm speed upper limit value NiU are formed, and i is set to 0.

In step S123, i is incremented by one, and if i>n is not established, procedure is proceeded to step S124, and if i>n is established, the processing is proceeded to step S127.

In steps S124 to 126, a fuel consumption amount FuelS[i] of the engine 101 when engine rpm speed NiS[i] is taken is calculated. First, in step S124, a transmission speed-change ratio RcvtS of the continuously variable transmission 104 is obtained from the following equation 5 based on the vehicle speed VSP, the engine rpm speed NiS[i] and the tire effective radius r[m].

$$RcvtS = \frac{VSP}{\frac{2\pi r}{60} \cdot NiS[i]} \cdot \frac{10}{36} \qquad \text{[Equation 5]}$$

Then, a continuously variable transmission input torque TcvtS[Nm] is obtained using a map MAPcvt(tTd, RcvtS, NiS[i]) of the continuously variable transmission input torque capable of realizing a target driving torque by correcting loss torque in the continuously variable transmission 104 from a target driving torque tTd, a transmission speed-change ratio RcvtS and the engine rpm speed NiS[rpm].

Figure 42:
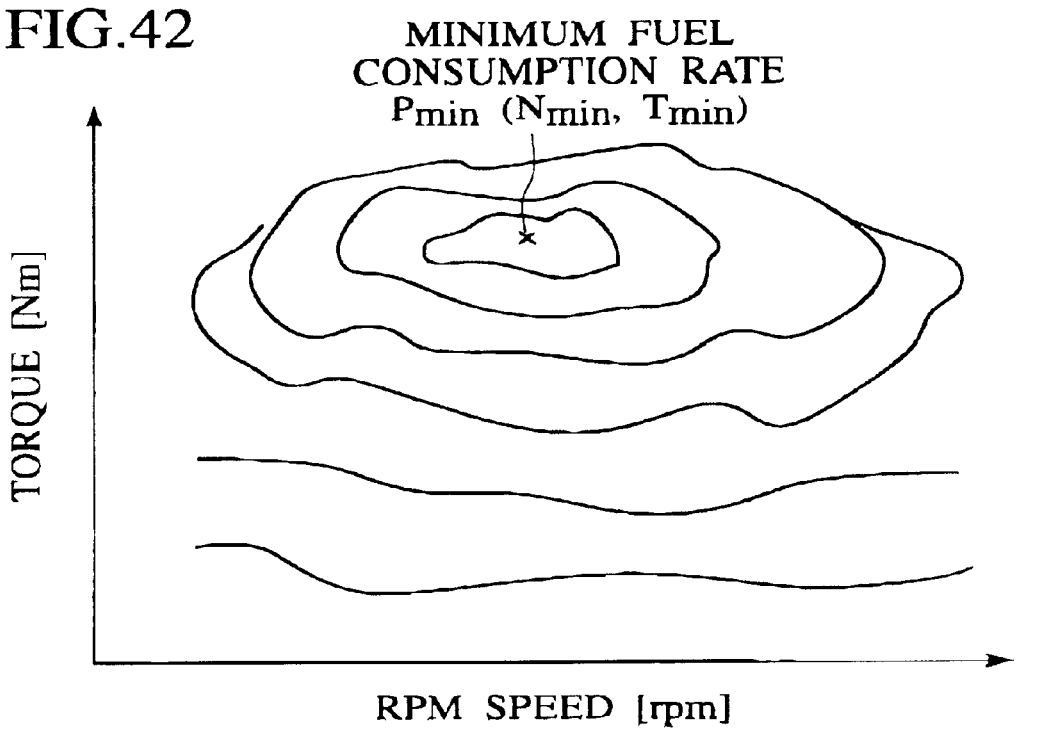
FIG. 42 is a graph showing fuel consumption rate characteristic in a hybrid vehicle of the embodiment.

In subsequent step S125, the continuously variable transmission input torque TcvtS is defined as the engine torque TeS. In step S126, a fuel consumption amount FuelS[i] of the engine 101 is retrieved using MAPfuel(TeS, NiS[i]) which is a function of the engine torque TeS and the engine rpm speed NiS[i]. FIG. 42 shows one example of the MAPfuel(TeS, NiS[i]).

If the processing in steps S124 to 126 for the number n of strings is completed, in step S127, a string order j having the smallest value among the fuel consumption amount FuelS[i] of the engine 101 corresponding to the engine rpm speed NiS[i] of all of i=1 to n is selected. In step S128, an operating point (torque: tTen[Nm], rpm speed. tNen[rpm] when power (required power) of the engine 101 which realizes the output shaft power is generated is calculated.

In step S129, a physical quantity Vn[cc/J] per effective power in the occurrence of the required power is obtained by the following equation 6.

$$Vn = \frac{FuelS[j]}{tTen \cdot tNen \cdot \frac{2\pi}{60}} \qquad \text{[Equation 6]}$$

Figure 37:
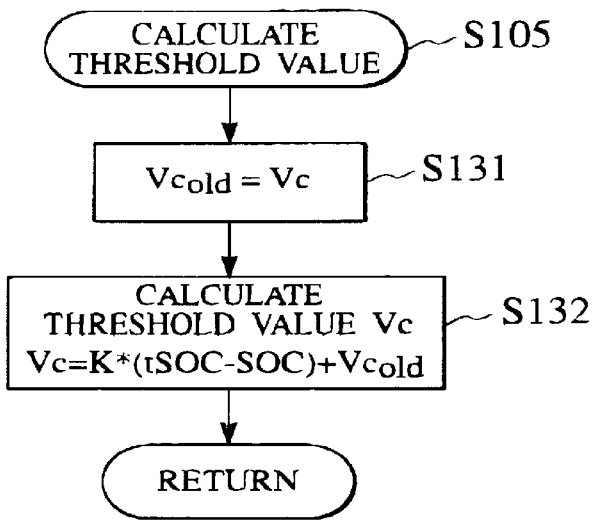
FIG. 37 is a detailed flowchart of threshold value calculating processing in the main flow of the embodiment.

FIG. 37 is a flowchart showing detailed processing in step 105 for calculating a threshold value to select the operating mode in FIG. 34. In step S131, a threshold value Vc[cc/J] for selecting an operating mode calculated in the last calculating cycle is defined as $Vc_{old}$[cc/J]

In subsequent step S132, proportion control is carried out based on deviation between a target SOC value tSOC[%] (e.g., SOC=50[%]) and the SOC value SOC[%] of the battery 112, and the threshold value Vc[cc/J] is calculated. Here, the threshold value Vc is calculated using the following equation 7.

$$Vc = K \cdot (tSOC - SOC) + Vc_{old} \qquad \text{[Equation 7]}$$

A value which was previously obtained by experiment is used for the constant K in this equation 7.

Figure 38:
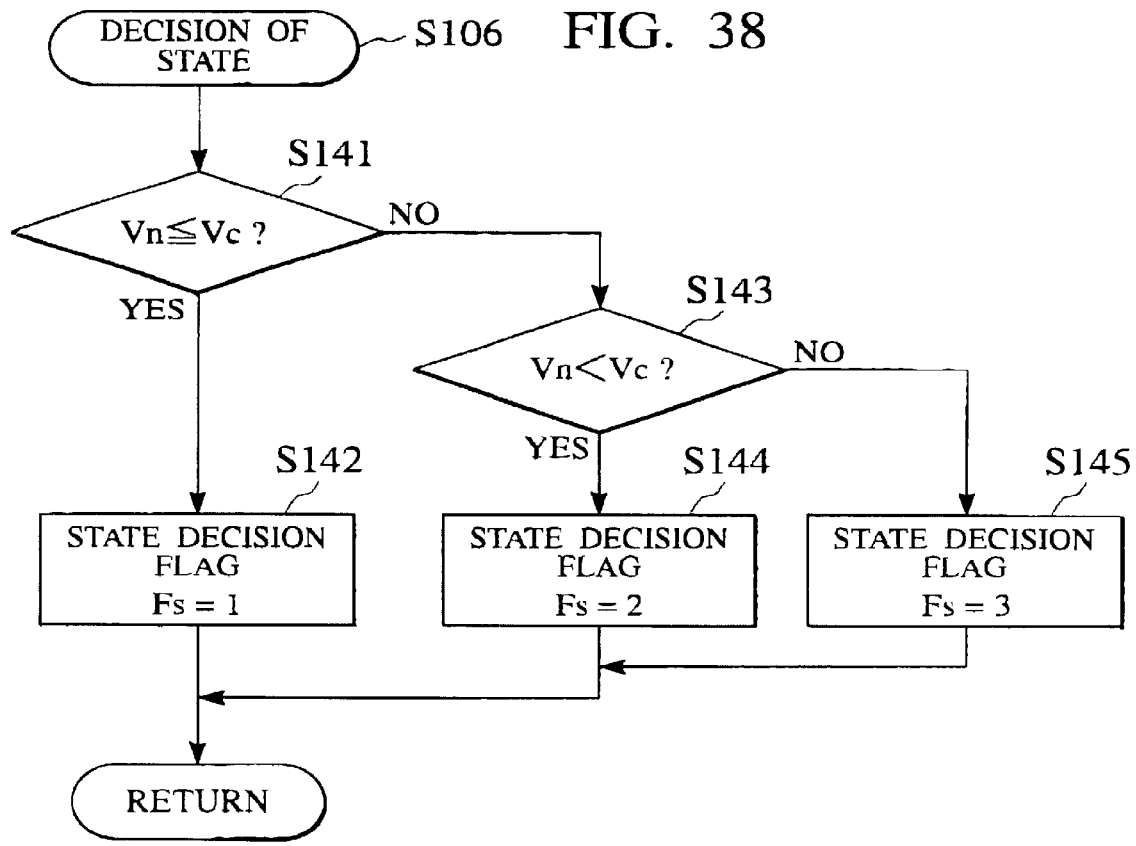
FIG. 38 is a detailed flowchart of state decision processing in the main flow of the embodiment.

FIG. 38 is a flowchart indicating detailed processing in step S106 which compares the threshold value and the physical quantity per effective power in the occurrence of the required power in size. In step S141, the threshold value Vc and the physical quantity Vn per effective power in the occurrence of the required power are compared in size.

In step S141, if Vn≦Vc is established, a state decision flag Fs is set to 1 in step S142. If Vn≦Vc is not established in step S141, it is decided whether Vn<Vc is established in step S143.

If Vn<Vc is established in step S143, a state decision flag Fs is set to 2 in step S144. If Vn<Vc is not established in step S143, a state decision flag Fs is set to 3 in step S145.

Figure 39:
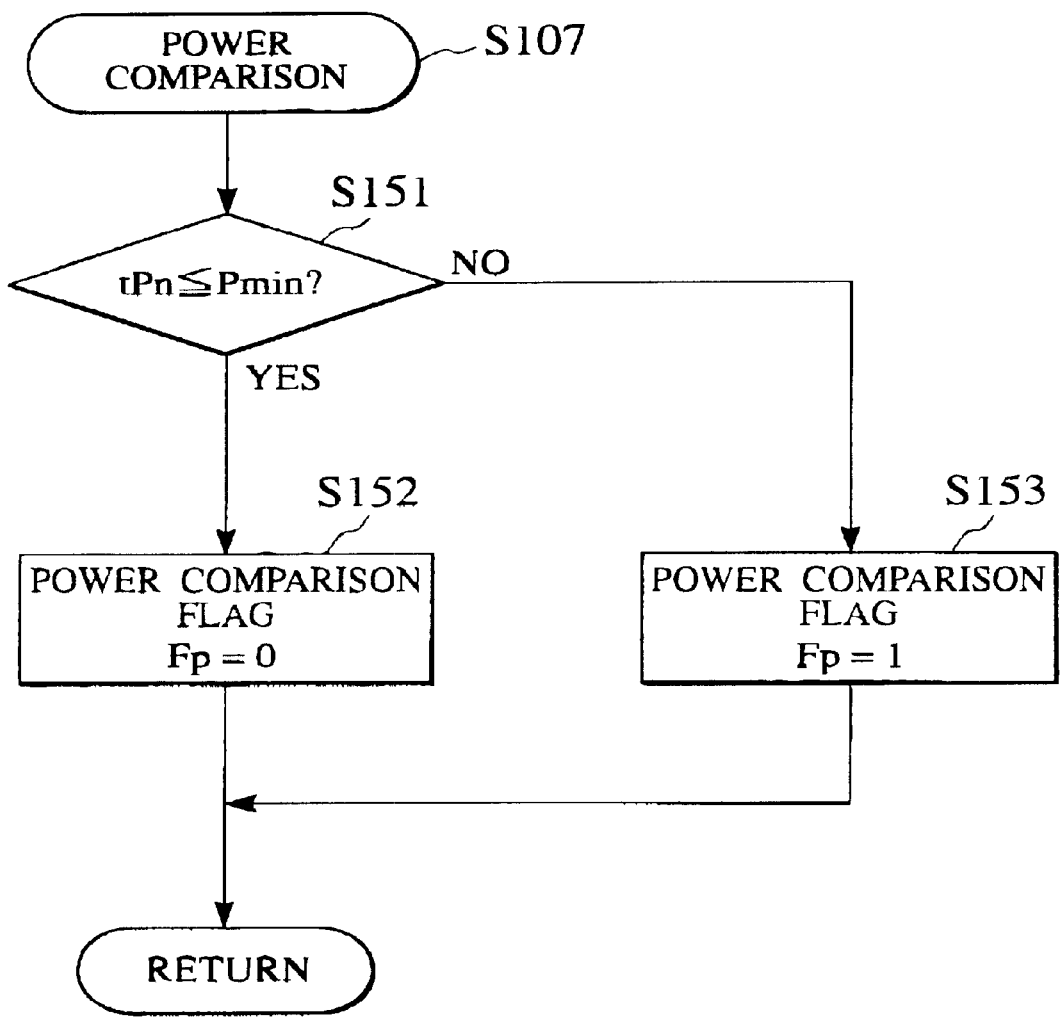
FIG. 39 is a detailed flowchart of power comparison processing in the main flow of the embodiment.

FIG. 39 is a flowchart showing detailed processing in step S107 for comparing the required power in FIG. 34 and a power at an operating point of the engine which minimizes an amount of fuel consumed per unit power. First, in step S511, a required power tPn[W] and a power Pmin[W] at the operating point of the engine in which the amount of fuel consumed per unit power becomes minimum from the fuel consumption rate characteristic shown in FIG. 42 are obtained, and they are compared in size. The following equation is for calculating the tPn and Pmin.

$$tPn = tTen \cdot tNen \cdot \frac{2\pi}{60}$$
$$Pmin = Tmin \cdot Nmin \cdot \frac{2\pi}{60}$$
[Equation 7]

In step S151, if tPn>Pmin is established, a power comparison flag Fp is set to 0 in subsequent step S152. If tPn>Pmin is not established in step S151, the power comparison flag Fp is set to 1 in step S153.

Figure 40:
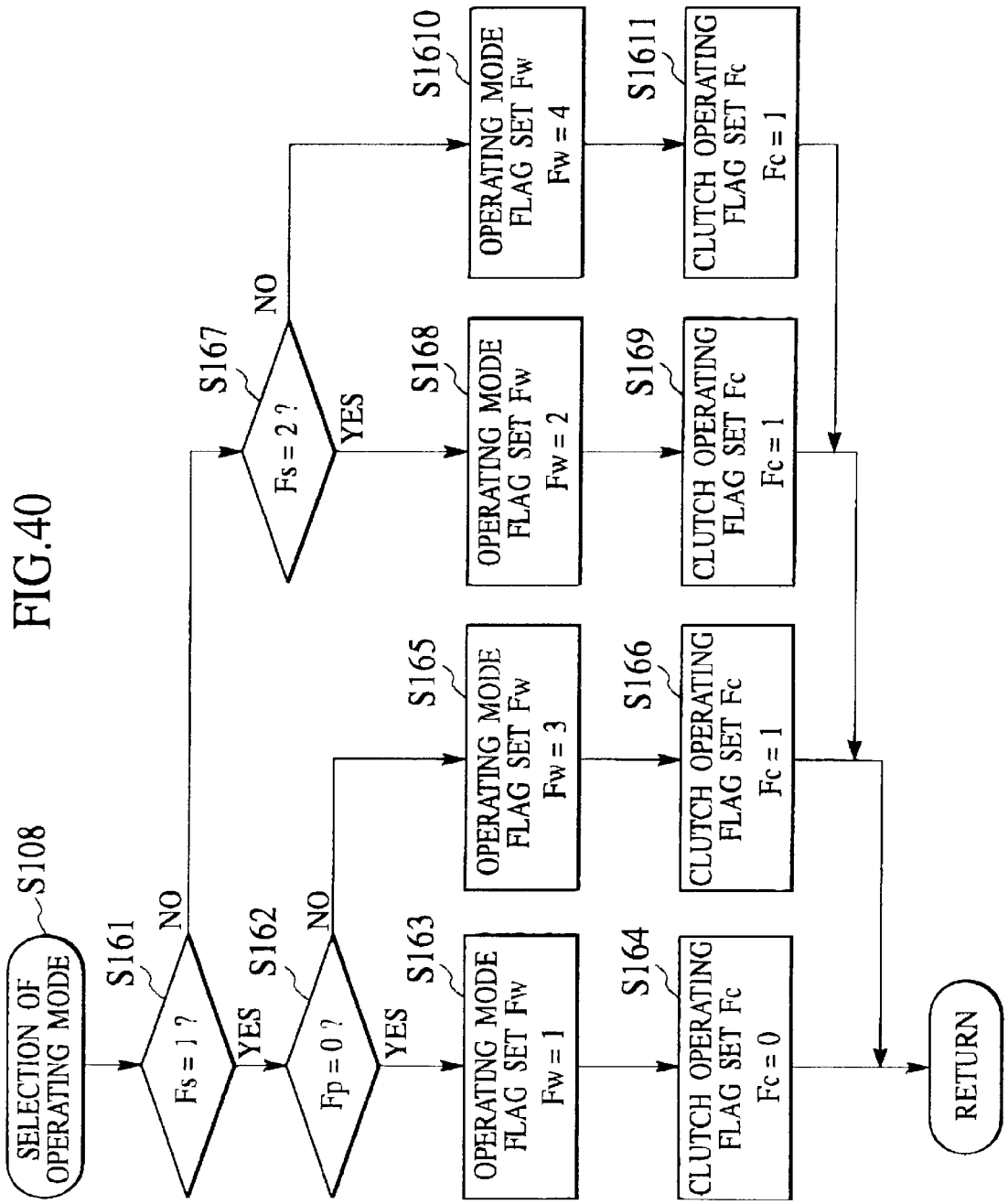
FIG. 40 is a detailed flowchart of operating mode selecting processing in the main flow of the embodiment.

FIG. 40 is a flowchart showing detailed processing in step S108 for selecting operating mode in FIG. 34. In step S161, it is decided whether state decision flag Fs is equal to 1. If Fs=1, processing is proceeded to step S162, and if Fs=1 is not established, processing is proceeded to step S167.

In step S162, it is decided whether the power comparison flag Fp is equal to 0. If Fp=0 is established, processing is proceeded to step S163, and if Fp=0 is not established, processing is proceeded to step S165.

In step S163, an operating mode flag Fw is set to 1, and a clutch operation flag Fc is set to 0 in step S164. Here, if the clutch operation flag Fc=0 is established, a signal for opening the clutch is sent to the clutch controller 127, and if Fc=1 is established, a signal for fastening the clutch is sent to clutch controller 127.

In step S162, if Fp=0 is not established and the processing is proceeded to step S165, the operating mode flag Fw is set to 3, and clutch operation flag Fc is set to 1 in step S166.

In step S161, if Fs=1 is not established and processing is proceeded to step S167, it is decided whether Fs is equal to 2. If Fs=2 is established, processing is proceeded to step S168, and if Fs=2 is not established, processing is proceeded to step S1610.

In step S168, the operating mode flag Fw is set to 2, and a clutch operating mode Fc is set to 1 in step S169.

In step S167, if Fs=2 is not established and processing is proceeded to step S1610, the operating mode flag Fw is set to 4, and the clutch operating mode Fc is set to 1 in step S1611.

Figure 41:
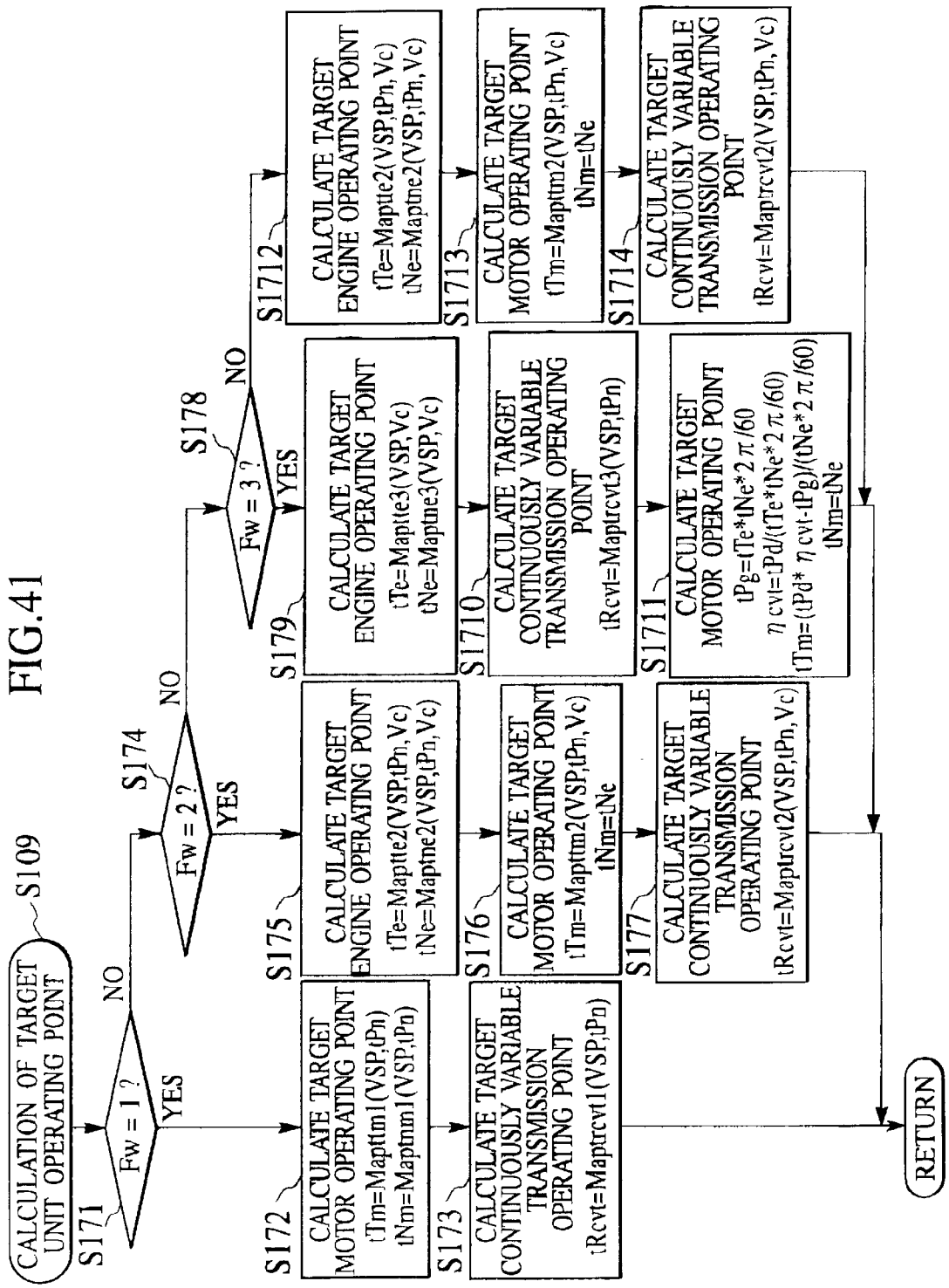
FIG. 41 is a detailed flowchart of target unit operating point calculating processing in the main flow of the embodiment.

FIG. 41 is a flowchart showing detailed processing in step S109 for calculating a target unit operating point in FIG. 34. First, in step S171, it is decided whether the operating mode flag Fw is equal to 1. If Fw=1 is established, processing is proceeded to step S172, and if Fw=1 is not established, processing is proceeded to step S174.

In steps 172 to 173, a combination of an operating point of the motor 103 capable of realizing the target output shaft power with minimum electric power and a transmission speed-change ratio of the continuously variable transmission 104 is obtained by map retrieving. Here, the map to be retrieved is formed in such a manner that previously calculated combination is formed in a form of a map per operating points to be obtained, and Mapttm1(VSP, tPn) is used for calculating the target torque tTm[Nm] of the motor 103, Mapttm1(VSP, tPn) is used for calculating the target rpm speed of the motor 103 in step S172, and Maptrcvt1(VSP, tPn) is used for calculating the target transmission speed-changetransmission transmission speed-change ratio of the continuously variable transmission 104 in step S173.

In step S171, if the operating mode flag Fw is not equal to 1 and processing is proceeded to step S174, it is decided whether the operating mode flag Fw is equal to 2. If Fw=2 is established, processing is proceeded to step S175, and if Fw=2 is not established, processing is proceeded to step S178.

$$\frac{2\pi}{60}$$

In FIGS. 175 to 177, when there is a required power tPn from an effective fuel consumption rate map corresponding to the vehicle speed VSP, a target torque and target rpm speed of the engine 101, a target torque and target rpm speed of the motor 103 and a target transmission speed-change ratio of the continuously variable transmission 104 are calculated by map retrieving. Each map used for retrieving is formed by associating operating points of the engine 101, the motor 103 and the continuously variable transmission 104 when the same effective fuel consumption rate as the threshold value Vc is obtained.

For example, when the effective fuel consumption rate map is prepared using torque and rpm speed of the engine 101, torque and rpm speed of the motor 103 and transmission speed-change ratio of the continuously variable transmission 104 for every vehicle speed in which the fuel consumption amount of the engine 101 is minimized while taking the fuel consumption rate of the engine 101, the energy conversion efficiency of the motor 103 and the transmission efficiency data strings of the continuously variable transmission 104 into consideration, operating points of the engine 101, the motor 103 and the continuously variable transmission 104 corresponding to the maps are calculated.

In step S175, the target torque tTe[Nm] and the target rpm speed tNe[rpm] of the engine 101 are calculated from the vehicle speed VSP, the required power tPn and threshold value Vc by map of the Maptte2 (VSP, tPn, Vc) and Maptne2 (VSP, tPn, Vc). In subsequent step S176, a target torque tTm[Nm] of the motor when the effective fuel consumption rate becomes the same as the threshold value is calculated by map retrieving of the Maptte2 (VSP, tPn, Vc) from the vehicle speed VSP and the required power tPn, and these are defined as target rpm speed tNm[rpm] and tNe[rpm]. In step S177, a transmission speed-change ratio tRcvt of the continuously variable transmission 104 when the effective fuel consumption rate becomes the same as the threshold value is calculated by map retrieving of Maptne2 (VSP, tPn, Vc) from the vehicle speed VSP, the required power tPn and the threshold value Vc.

In step S174, when the operating mode flag Fw=2 is not established, it is decided whether operating mode flag Fw is 3 in step S178, and if Fw=3 is established, processing is proceeded to step S179, and if Fw=3 is not established, processing is proceeded to step S1712.

In steps S179 to 1711, a target torque and target rpm speed of the engine 101 in which the effective fuel consumption rate becomes equal to the threshold value Vc corresponding to the vehicle speed VSP, a target torque and target rpm speed of the motor 103, and a target transmission speed-change ratio of the continuously variable transmission 104 are calculated by map retrieving from the effective fuel consumption rate map when various required powers are occurred in each vehicle speed. Each map used for retrieving is formed by associating operating points of the engine 101, the motor 103 and the continuously variable transmission 104 when the same effective fuel consumption rate as the threshold value Vc is obtained at the time of generation of the required power.

For example, when the effective fuel consumption rate map at the time of generation of the required power is prepared using torque and rpm speed of the engine 101, torque and rpm speed of the motor 103 and transmission speed-change ratio of the continuously variable transmission 104 for every vehicle speed in which the fuel consumption amount of the engine 101 is minimized while taking the fuel consumption rate of the engine 101, the energy conversion efficiency of the motor 103 and the transmission efficiency data strings of the continuously variable transmission 104 into consideration, operating points of the engine 101, the motor 103 and the continuously variable transmission 104 corresponding to the maps are calculated.

First, in step S179, the target torque tTe and the target rpm speed tNe of the engine 101 are calculated by map retrieving using the Maptte3(VSP, Vc) and Maptne3(VSP, Vc) from the vehicle speed VSP and the threshold value Vc. In subsequent step S170, a target transmission speed-change ratio tRcvt of the continuously variable transmission 104 is calculated by map retrieving of Maptrcvt3(VSP, tPn) from the vehicle speed VSP and the required power tPn. In step S1711, power tPg[W] when the target torque tTe and the target rpm speed tNe of the engine 101 are generated are calculated by the following equation 9.

$$tPg = tTe \cdot tNe \cdot \frac{2\pi}{60} \qquad \text{[Equation 9]}$$

Further, a transmission efficiency ηn cvt continuously variable transmission in the continuously variable transmission 104 is calculated by the following equation 10.

$$\eta cvt = \frac{tPd}{tTe \cdot tNe \cdot \frac{2\pi}{60}} \qquad \text{[Equation 10]}$$

Based on a result of the above calculation, a target torque tTm and the target rpm speed tNm of the motor in which the required power fuel consumption rate becomes equal to the threshold value Vc corresponding to the vehicle speed VSP are calculated by the following equation 11.

$$tTn = \frac{tPd \cdot \eta cvt - tPg}{tNe \cdot \frac{2\pi}{60}} \qquad \text{[Equation 11]}$$

$$tNm = tNe$$

In step S178, if the operating mode flag Fw is not 3, in steps S1712 to 1714, a target torque and target rpm speed of the engine 101 in which the effective fuel consumption rate at the time of generation of the required power becomes equal to the threshold value Vc, a target torque and target rpm speed of the motor 103, and a target transmission speed-change ratio of the continuously variable transmission 104 are calculated by map retrieving from the effective fuel consumption rate map corresponding to the vehicle speed VSP when the effective fuel consumption rate at the time of generation of the required power becomes equal to the threshold value Vc.

First, in step S1712, the target torque tTe[Nm] and the target rpm speed tNe[rpm] of the engine 101 are calculated by map retrieving using the Maptte2(VSP, tPn, Vc) and Maptne2(VSP, tPn, Vc) from the vehicle speed VSP and the threshold value Vc. Here, the Maptre2(VSP, tPu, Vc) and Maptne2(VSP, tPn, Vc) are the same as those used for map retrieving in step S175.

In step S1713, the target torque tTe[Nm] of the engine 101 is calculated from the vehicle speed VSP, the required power tPn and threshold value Vc by map retrieving of the Mapttm2 (VSP, tPn, Vc), and the target rpm speed tNmn [rpm] is defined as tNe[rpm]. Here, the Mapttm2 (VSP, tPn, Vc) is the same as that used for map retrieving in step S176.

In step S1714, the transmission speed-change ratio tRcvt of the continuously variable transmission 104 is calculated by map retrieving of Maptrcvt2 (VSP, tPn, Vc) from the vehicle speed VSP, required power tPn and threshold value Vc.

According to the above embodiment, a threshold value and a predetermined physical quantity concerning the engine 101 per effective power with respect to a sum of power of the output shaft calculate while taking energy conversion efficiency of the engine 101, the motor 103 and the continuously variable transmission 104, and power of the engine 101 at which electric power generated while taking the energy conversion efficiency of the engine 101, the motor 103 and the battery 112 once charged into the battery 112 and is used for generating electric power that can be consumed for the future discharging are compared, and operating mode of the engine 101 and the motor 103 at the time of running and operating points of the engine 101, the motor 103 and the continuously variable transmission 104 are determined and thus, it is possible to further optimize a predetermined physical quantity concerning the engine 101.

Figure 45:
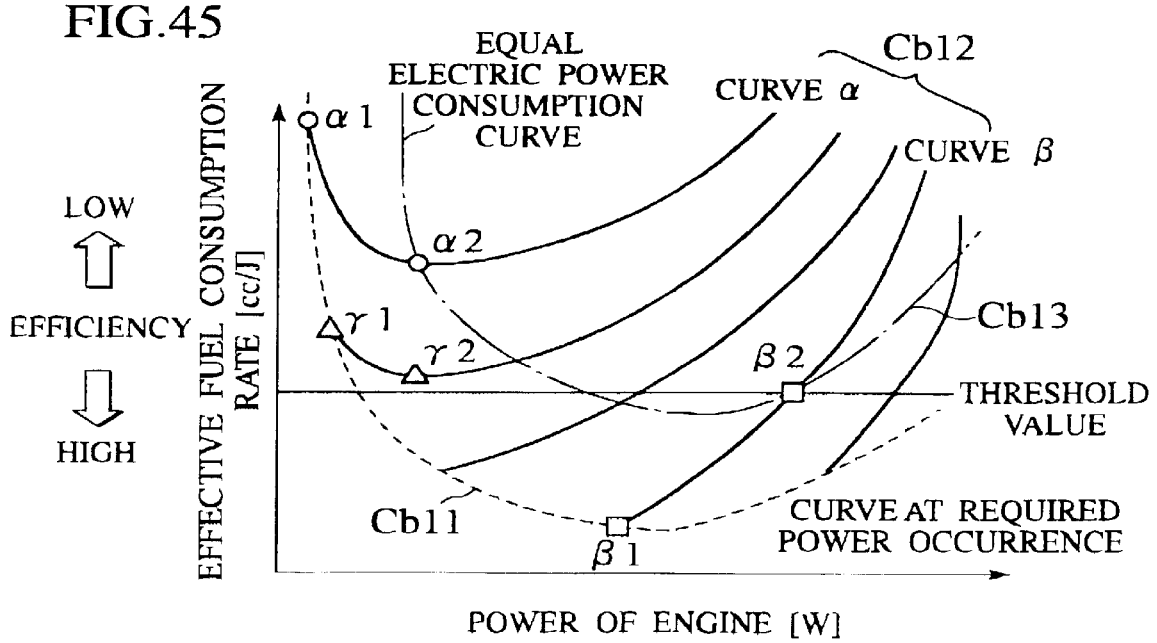
FIG. 45 is a graph showing operation characteristic of the embodiment.

This point will be explained while taking, as an example, a case in which fuel consumption amount of the engine 101 is reduced, using FIG. 45. In FIG. 45, a curve shown with broken line shows effective fuel consumption rate [cc/J] which is fuel consumption amount per effective power rate when required power is occurred in the engine 101 at a certain vehicle speed.

A physical quantity per effective power in the occurrence of the required power in this embodiment is shown with the broken line Cb11. Solid lines Cb12 are curves showing effective fuel consumption rate when power equal to or greater than required power is occurred in the engine 101 and surplus power to be charged into the battery 112 is increased. The solid lines are obtained for each required power, and line which is closer to right side shows higher load having greater required power.

In the related art, a power equal to or greater than a required power at the time of a certain required power is occurred in the engine, and effective fuel consumption rate when the surplus to be charged into the battery is increased is compared, an operating mode, and operating points of the engine, the motor and the transmission which correspond when the value becomes minimum are calculated.

That is, operating mode and each operating point having best efficiency within a range at the time of certain required power are calculated. For example, when the required power is α1, an effective fuel consumption rate when power of the engine which is surplus equal to or greater than the required power is changed is shown with a curve α. In the related art, an operating mode which generates the required power by the engine is selected, required power or higher power is occurred at the point α2, and electric power generated using the power of the surplus engine is charged into the battery. When the required power is α1, an operating mode using the engine as a power source for running is selected, only power corresponding to a required power β1 at which the efficiency in the engine becomes highest is generated, and the battery is not charged. If attention is paid to the selected α2 and β1, the point α2 surely has best efficiency at the time of the required power.

However, when the same electric power is charged, it is apparent that efficiency is higher when electric power is generated at the intersection β2 between a curve β when the required power is β1 and a curve formed when the charging electric power shown with a chain line Cb13 is the same. At the point β1, electric power is not generated although electric power can be generated efficiently as described when attention is paid to α2.

This is because that when the required power is α1, when the required power is α1, α1 and α2 are compared, and α2 having higher efficiency is selected, and similarly, when the required power is Y1, Y2 is selected, and the required power is β1, β1 is selected so that a point having best efficiency in the range of the required power during the current running is selected. As a result, the electric power is charged in a low efficiency state. That is, in the related art, an operating mode always capable of minimizing the fuel consumption amount throughout the entire running state is not selected.

Further, in the related art, it is not possible to select an operating mode controlling the efficiency to a predetermined value. More specifically, since the object to be compared (efficiency in a range of required power during current running state) when high efficiency is selected is largely varied in accordance with the required power, the efficiency of the selected operating mode is not efficiency which is previously set by a designer or the like, and value is varied at every required power.

Whereas, in this embodiment, the operating mode is selected using absolute criteria which are threshold values concerning the fuel consumption amount set by the designer. Therefore, under a normal condition, when charging is not required in a hurry, the threshold value is set such that the efficiency is enhanced as high as possible to generate electric power in which efficiency is enhanced. When the electric power is charged in a low efficient state, this is limited to a case in which a designer's will to charge even if the efficiency is low is reflected to the threshold value, and its amount is set to be minimum. When the efficiency is lowered if the engine 101 is driven, although it depends on the setting of the threshold value, the motor 103 is driven by electric power from the battery 112 charged with electric power in the efficient state to avoid generation of electric power in a low efficiency state, which makes it possible to reduce the fuel consumption amount.

Further, the threshold value is set by will of the designer to control the efficiency, and the operating mode of running can be selected with effective fuel consumption rate which is equal to or lower than the threshold value. Therefore, it is possible to set the threshold value to the effective fuel consumption rate as small as possible within a range causing no problem for running, and to reduce the fuel consumption amount more effectively. Further, when a physical quantity per effective power is defined as exhaust gas amount per effective power rate in the engine, it is possible to reduce the exhaust gas amount as compared with the related art.

Further, a designer who applies the present invention only need to use the calculation method of a threshold value. With this operation, the operating mode or target generated electric power can be determined uniquely in accordance with the running state, and a system can be designed with high visibility.

In the above embodiment, physical quantity per effective power can be made as exhaust gas component to be limited per power in the engine, which makes it possible to reduce the exhaust gas component with respect to the power of the engine as compared with the related art.

Further, by comparing the threshold value and the physical quantity per effective power with respect to the required power, it is possible to select operating mode which is equal to or better than the threshold value.

More specifically, in the first operating mode, output shaft power is generated by the motor 103. Thus, driving for reducing the efficiency with respect to the threshold value is not carried out in the engine 101, and the physical quantity per effective power at that time is more excellent with respect to the threshold value. In the second operating mode, driving having efficiency equal to or higher than the threshold value is carried out in the engine 101, power of the engine 101 equal to or higher than the required power is occurred, and electric power is generated by power of the engine 101 which is surplus is charged into the battery 112. Therefore, driving is not carried out in a state where the efficiency with respect to the threshold value is lower is not carried out in the engine 101 like the first or third operating mode, and the vehicle can run with the motor 103 using electric power charged with high efficiency in the second operating mode.

In the third operating mode, the power of the engine 101 is efficiently generated such that maximum required power equal to or lower than the threshold value is obtained, and insufficient power with respect to the required power is occurred by the motor. Thus, physical quantity per effective power at that time is equal to the threshold value. As compared with a case in which all the required power is occurred by the motor 103 in a relatively high load, since a large quantity of electricity is not discharged at once from the battery 112, it is possible to suppress the abrupt rise of temperature and deterioration of performance of the battery 112, and to reduce the battery 112 in size.

In the fourth operating mode, required power is occurred in the engine 101, and the vehicle can run with efficiency equal to the threshold value.

Further, according to the present embodiment, the operating points of the engine 101, the motor 103 and the continuously variable transmission 104 used for calculating physical quantity per effective power are calculated such that a driving force required by the driver and the power of the engine 101 in the various required power and various power of the engine 101 are calculated such that a predetermined physical quantity concerning the engine 101 is minimized. Therefore, operating mode calculated based on the physical quantity per effective power and the operating points of the engine 101, the motor 103 and the continuously variable transmission 104, as well as a predetermined physical quantity concerning the engine 101 can be set suitably.

In the above embodiment, the belt type continuously variable transmission 104 is used, and the one motor 103 controls the starting, electric power generation, running and regenerative braking of the engine 101. Alternatively, the present invention can also be applied to the above-described transmission (toroidal type continuously variable transmission, continuously variable transmission using the above-described planetary gear and transmission for changing speed stepwise) or a hybrid vehicle using two motors.

Figure 46:
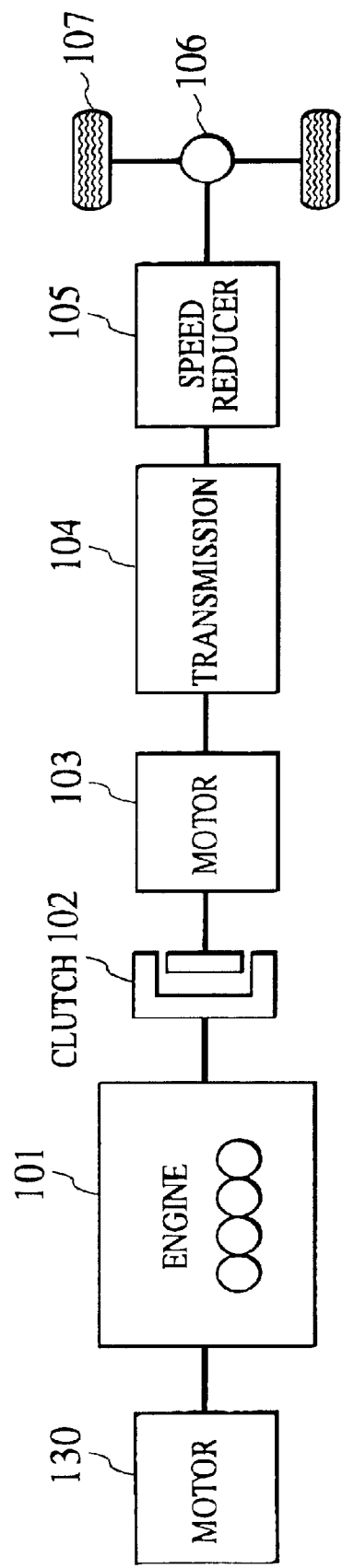
FIG. 46 is a block diagram showing a power train of a ninth embodiment of the invention.

FIG. 46 shows a power train of a control system for a hybrid vehicle of a ninth embodiment. In the ninth embodiment, a belt type or toroidal type continuously variable transmission or a transmission which changes speed stepwisely is used as the transmission 104. In this example of disposition, a motor 130 used for starting the engine 101 and generating electric power, and two motors 103 used for running the vehicle and regenerative braking are used.

In this disposition example, the motor 130 on the input side of the clutch 102 and the engine 101 may be disposed such that the motor 130 is disposed upstream from the engine 101, or the motor 130 is disposed downstream from the engine 101 (not shown). Alternatively, the output shaft of the engine 101 may be directly connected to the input shaft of the clutch 102 as one shaft, and output of the engine 101 may be transmitted to the motor 103, the transmission 104, the speed reducer 105 and the differential apparatus 106 which are constituted with one shaft through the clutch 102. On the other hand, the motor 103 on the side of the output of the clutch 102 and the transmission 104 may be disposed such that the motor 103 is disposed upstream from the transmission 104 as shown in FIG. 8, or the motor 103 is disposed downstream from the transmission 104.

If the propulsion mechanism is constituted in a manner that power from the engine 101 is transmitted to the driving wheels 107 from the output shaft of the transmission 104 through the speed reducer 105 and the differential apparatus 106, and one or more motors transmit the power to the driving wheels 107, the devices may be disposed freely. When the above-described planetary gear is used for the transmission 104, two motors are used. The engine 101 is connected to a carrier, the motor (generator) is connected to a sun gear, and a ring gear connected to the other motor is connected to the output, and power generated by the engine 101 and the generator is transmitted to the driving wheels 107 through the planetary gear and the differential apparatus 106.

Next, a control system for a hybrid vehicle of a tenth embodiment of the present invention will be explained.

In a so-called series hybrid vehicle (S-HEV) in which the control system for a hybrid vehicle of the above first embodiment comprises the engine, the electric power generating apparatus and battery constituted by the generator or fuel cell, and the driving motor is allowed to operate and ram with electric power supplied from the electric power generating apparatus and the battery, electric power from the electric power generating apparatus is once charged in the battery, the operating mode of the physical quantity and target generated electric power are determined such that energy conversion efficiency of the electric power generating apparatus and the battery are taken into account, a predetermined physical quantity (corresponding to the electric power generating efficiency) concerning the electric power generating apparatus per effective electric power obtained by subtracting the loss from the generated electric power becomes equal to the set value. In this set value is set such that the efficiency becomes as high as possible when normal charging need not be carried out in a hurry, and the charging amount is reduced to the minimum as long as the charging need to be carried out even if the efficiency is low when the charging is carried out at low efficiency and thus, a predetermined concerning the electric power generating apparatus can be appropriately set.

In the control system for a hybrid vehicle of the first embodiment, a representative value is used for the energy conversion efficiency of the battery, and a predetermined physical quantity concerning the electric power generating apparatus per effective electric power is calculated as a constant value. Therefore, the calculating processing is simplified, and there is a merit that a load applied to the control microcomputer is low.

Figure 66:
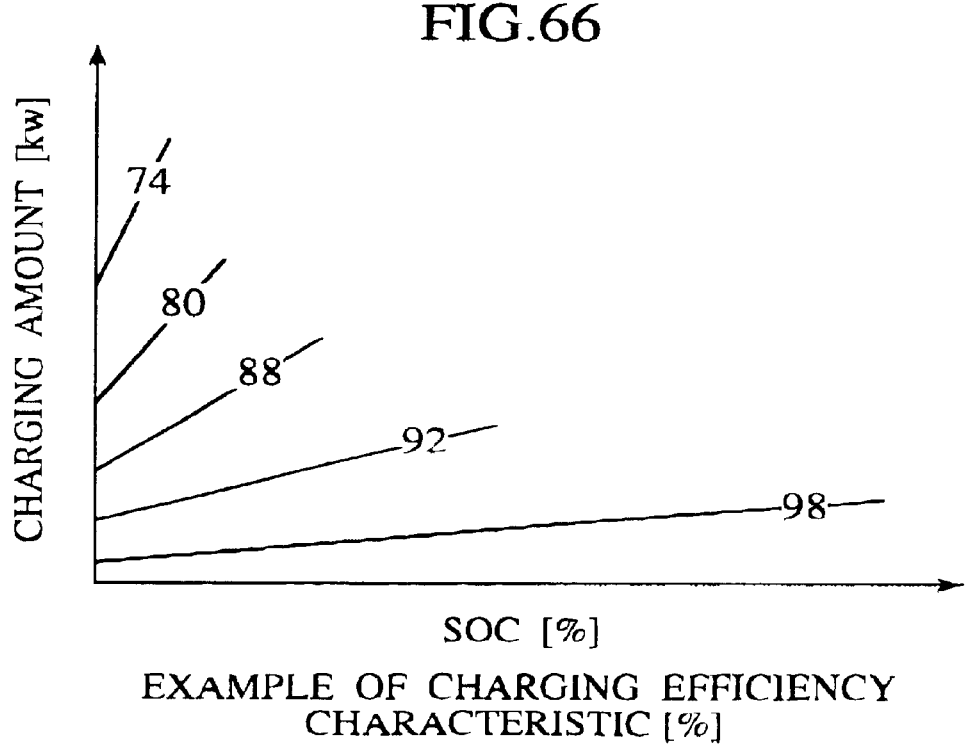
FIG. 66 is a graph showing charging efficiency characteristic in the hybrid vehicle of the embodiment.

However, the actual energy conversion efficiency of the electric power generating apparatus is varied in accordance with a state of the battery. FIG. 66 shows one example of the charging efficiency characteristic of the battery. A lateral axis shows charging state SOC[%], a vertical axis shows the charging amount [kW], and the charging efficiency in each case is shown with the equal charging efficiency line. From the charging efficiency in FIG. 66, it can be found that even if the charging amount is the same, if SOC is higher, the efficiency is higher. Further, the characteristic of the charging efficiency is varied also depending upon a temperature of the electric power generating apparatus or degree of the deterioration, these factors may be taken into account for calculating the charging efficiency.

Therefore, in the control system for a hybrid vehicle of the first embodiment, the predetermined physical quantity concerning the electric power generating apparatus per effective electric power calculated while determining the energy conversion efficiency of the battery as a constant value and the actual value may be different from each other. Further, the operating mode or the target generated electric power of the electric power generating apparatus and the battery determined based on the predetermined physical quantity concerning the electric power generating apparatus per effective electric power does not always optimize the predetermined physical quantity concerning the electric power generating apparatus in accordance with running state.

The tenth embodiment solves this point. The control system for the hybrid vehicle of this embodiment comprises an electric power generating apparatus constituted by a prime motor or prime motor and generator, a battery for storing the generated electric power generated by the electric power generating apparatus and the regenerative braking electric power at the time of deceleration, and a running prime motor, and the hybrid vehicle runs by a driving force from at least one of the prime motor and the motor. The energy conversion efficiency of the prime motor, or prime motor and the generator and the motor, and energy conversion efficiency of the battery which is different in accordance with the SOC or charging efficiency are taken into account, operating mode of the electric power generating apparatus, battery and motor suitable for actual running, and operating points of the electric power generating apparatus and the motor are clearly indicated, a fuel consumption amount of the prime motor or the fuel cell and exhaust gas component amount to be limited are effectively reduced.

The control system for the hybrid vehicle of the tenth embodiment will be explained using FIGS. 47 and 48.

Figure 47:
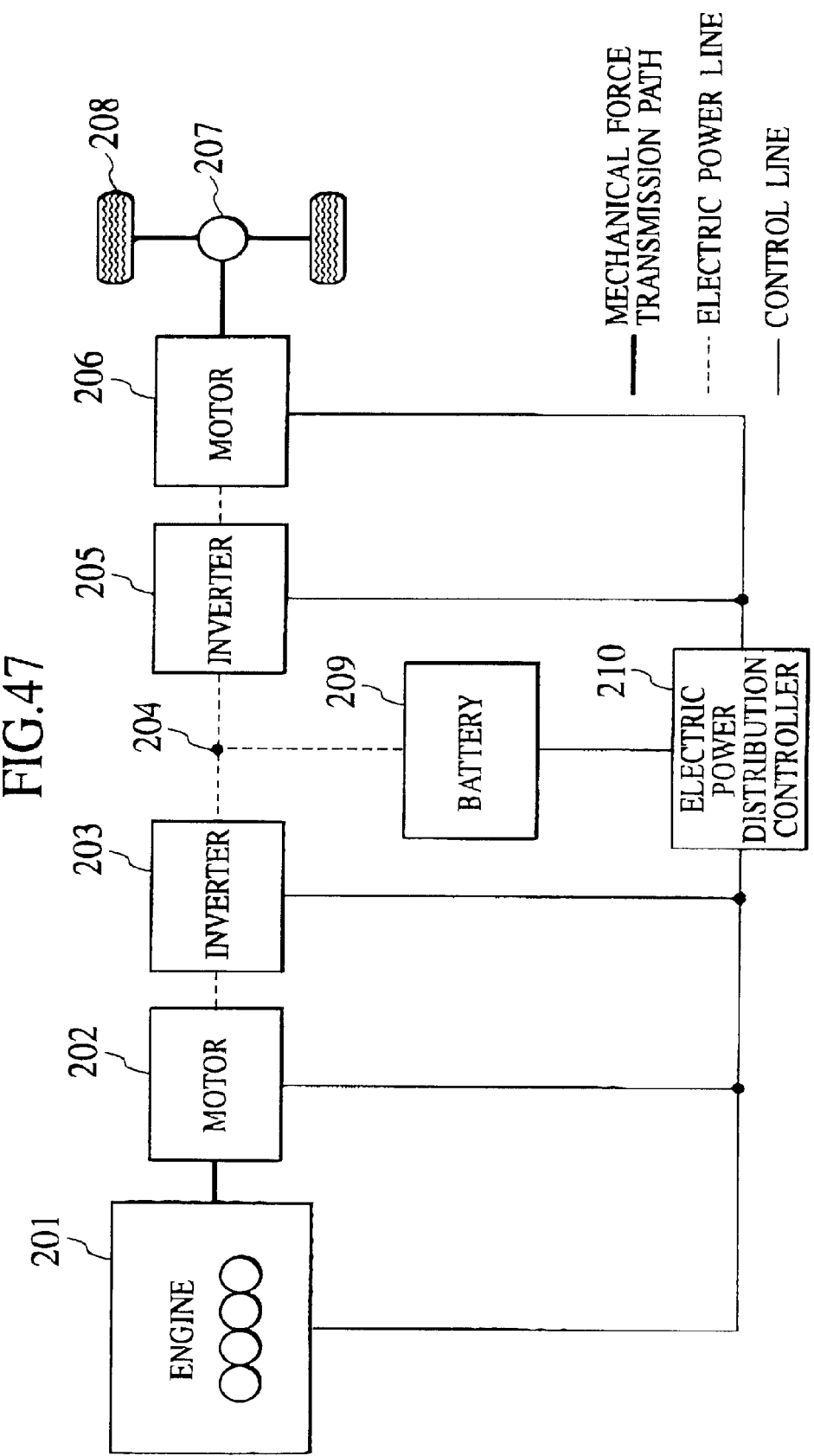
FIG. 47 is a block diagram showing a system structure of a control system for a hybrid vehicle of a tenth embodiment.
Figure 48:
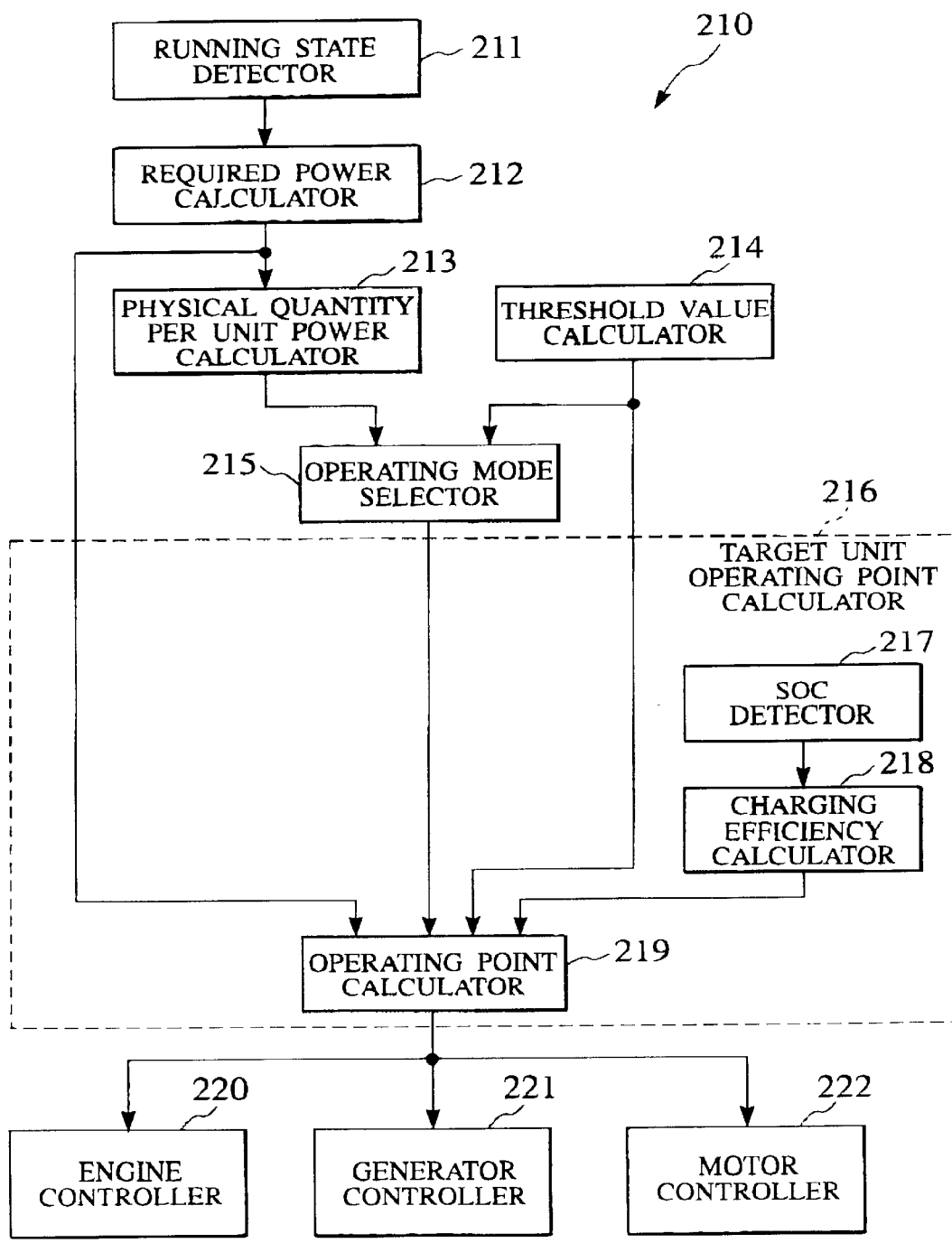
FIG. 48 is a block diagram showing a functional structure of an electric power distribution controller of the embodiment.

In FIG. 47, a thick solid line indicates a transmitting path of a mechanical force, and a broken line shows an electric power line. A thin solid lines show control lines. An engine 201 drives a generator 202 to generate electric power. These may be a fuel cell. Electric power generated from the generator 202 drives a motor 206 to transmit the driving force to the road surface through a differential apparatus 207 and tires 208, thereby allowing the vehicle to run. When the electric power generated by the generator 202 is greater than electric power consumed by the motor 206, such electric power is stored in a battery 209 as surplus electric power. When the electric power generated by the generator 202 is smaller than electric power consumed by the motor 206, insufficient electric power is discharged from the battery 209 and supplied to the motor 206.

The generator 202 and the motor 206 are not limited to alternating current apparatus, and direct current apparatus may also be used. The generator 202 and the motor 206 are driven by inverters 203 and 205. When the direct current apparatus is used as the generator 202 and the motor 206, DC/DC converter is used instead of the inverters.

The inverters 203 and 205 are connected to the battery 209 through a DC link 204, the alternating current electric power of the generator 202 is converted into direct current electric power to charge the battery 209, the direct current electric power of the battery 209 is converted into alternating current electric power and the power is supplied to the motor 206. It is possible use various batteries such as lithium-ion battery, nickel, hydrogen battery and lead battery, or electric double layer battery, so-called power battery can be used for the battery 209.

An electric power distribution controller 210 decides how to operate the engine 201, the generator 202 and the battery 209 based on accelerator operation from a driver (not shown) or vehicle speed signals from a vehicle speed sensor. To meet a result of the decision and requirement from the driver through the accelerator operation, the electric power distribution controller 210 generate a command value to the engine 201, the generator 202 and the motor 206.

Next, using FIG. 48, the electric power distribution controller 210 will be explained in detail. Input to the electric power distribution controller 210 are physical quantity or conversion amount corresponding to physical quantity indicative of vehicle speed such as accelerator pedal actuation amount, throttle opening, rpm speed of the engine, vehicle speed, motor drive current, motor rpm speed, generator drive current, generator rpm speed, load of auxiliary equipment and temperature of the battery.

A running state detector 211 in the electric power distribution controller 210 detects the vehicle speed and the accelerator pedal operating amount for example. A power calculator 212 calculates power (required power) of the electric power distribution controller 210 which is necessary to realize a driving force required by the driver from the vehicle speed and accelerator pedal operating amount at that instant.

A physical quantity per effective power calculator 213 calculates a predetermined physical quantity concerning the power in the output shaft and the engine per unit of sum of power used for driving the auxiliary equipment. A threshold value calculator 214 calculates a physical quantity which becomes evaluation criterion for selecting an operating mode in an operating mode selector 215 which will be explained below, and sets a threshold value in the same unit as the physical quantity per effective power. For example, when it is necessary enhance the energy utilizing efficiency, the threshold value becomes the amount of fuel consumed per unit power or value corresponding thereto, and when the exhaust gas component amount in which exhaust should be limited is to be minimum, the exhaust gas component amount per unit power is selected. In this embodiment, a case in which the fuel consumption is reduced will be explained.

The operating mode selector 215 decides drive or stop of the engine 201, the generator 202 and the motor 206 and based on a result thereof, the operating mode selector 215 outputs a driving state command to an engine controller 220, the generator controller 221 and the motor controller 222.

A target unit operating point calculator 216 comprises an SOC detector 217, a charging efficiency calculator 218 and an operating point calculator 219, and calculates target operating points of the engine 201, the generator 202 and the motor 206 based on the required power, operating mode, threshold value and charging efficiency of the battery 209, and outputs a result thereof to the engine controller 220, the generator controller 221 and the motor controller 222. These controllers respectively control the engine 201, the generator 202 and the motor 206 based on outputs from the target unit operating point calculator 216.

Figure 49:
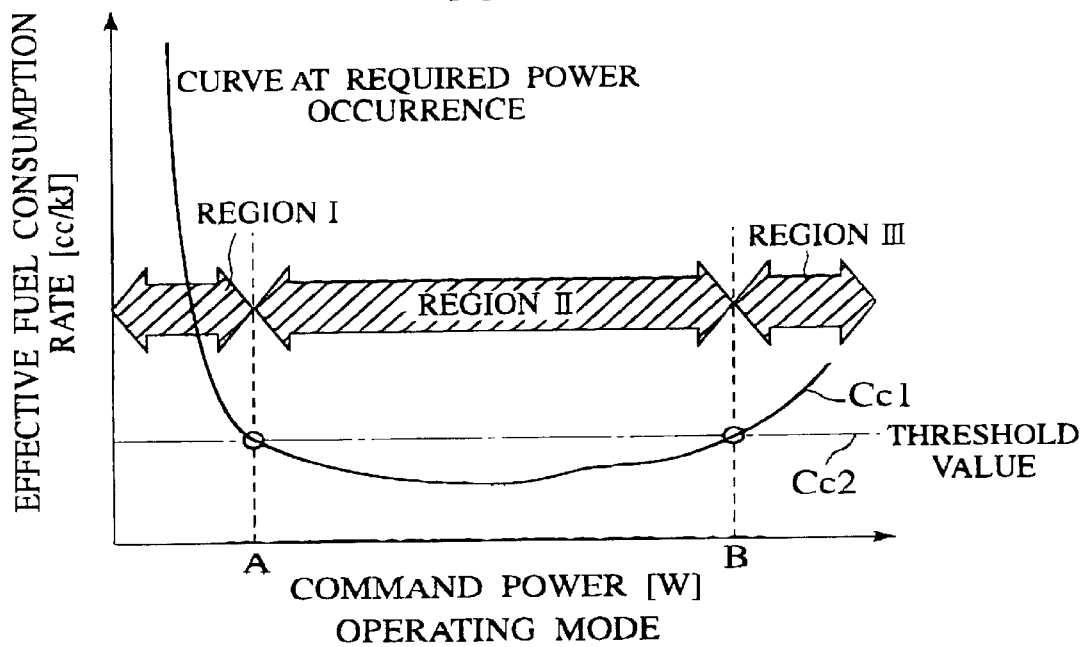
FIG. 49 is a graph showing criteria for selecting operating mode in the embodiment.

A function of the operating mode selector 215 in the electric power distribution controller 210 will be explained in more detail. In FIG. 49, a curve Cc1 shows effective fuel consumption rate and a phantom chain line shows a threshold value Chain line Cc2 when required power is occurred in the engine 201, and this electric power directly drives the motor 206. Points of intersection are A point and B point.

When the required power is smaller than A[kW] (region I), control is carried out such that the engine 201 the generator 202 are stopped, and the battery 112 is discharged. When the required power is equal to or higher than A[kW] and equal to or lower than B[kW] (region II), control is carried out such that the engine 201 and the generator 202 are driven, and the battery 209 is charged. When the required power exceeds B[kW] (region III), control is carried out such that the engine 201 and the generator 202 are driven, and the battery 209 is discharged.

Next, a function of the target unit operating point calculator 216 will be explained in detail. The target unit operating point calculator 216 comprises the SOC detector 217, the charging efficiency calculator 218 and the operating point calculator 219.

In the SOC detector 217, electric power coming in or our from the battery 209 is obtained and electric power coming in or out from the battery 209 is obtained from the voltage between terminals currently, and estimates SOC indicative of charging efficiency of the battery 209. The charging efficiency calculator 218 calculates charging efficiency when electric energy is charged based on the SOC, a temperature of the battery 209 and battery characteristic which was previously measured.

Figure 68:
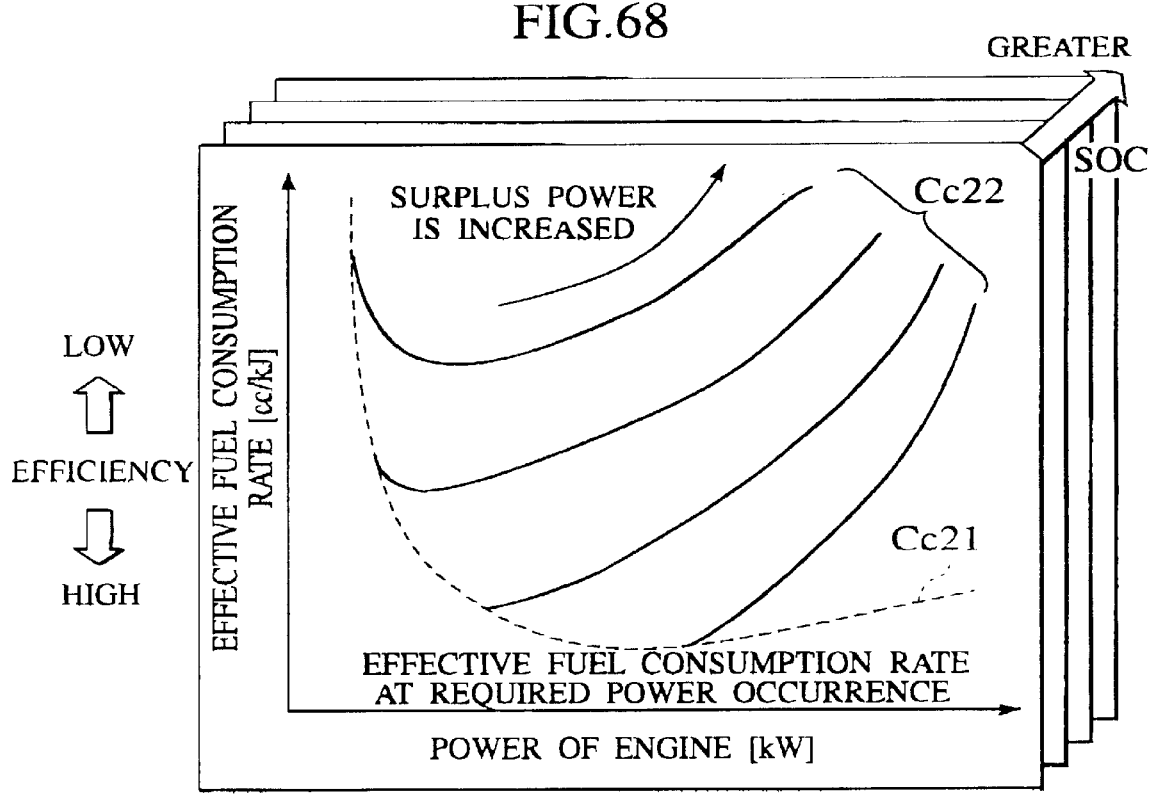
FIG. 68 is a graph showing operation characteristic of the hybrid vehicle of the embodiment.

The operating point calculator 219 calculates operating point of the electric power generating apparatus 200 which is equal to or lower than the threshold value. A curve Cc21 shown with a broken line in FIG. 68 shows an effective fuel consumption rate [cc/kJ] which is a fuel consumption amount per electric power when required power is occurred by the engine 201 in a certain SOC. The physical quantity per effective power is shown with this broken line Cc21. Each solid line Cc22 is a curve showing effective fuel consumption rate when required power is occurred in the engine 201 and surplus power to be used for charging into the battery 209 is increased. Each solid line Cc22 is obtained for each required power, and solid line which is closer to right side shows higher load having greater required power. Each solid line Cc22 is calculated while taking the charging efficiency of the battery 209 shown in FIG. 66 into account.

In FIG. 66, a lateral axis shows charging state (SOC), a vertical axis shows the charging amount [kW], and the charging efficiency in each case is shown with the equal charging efficiency line. From FIG. 66, it is found that even if the charging amount is the same, if SOC is higher, the efficiency is higher.

This charging efficiency characteristic is taken into account in the operating point calculator 219, required power is occurred in the engine 201 for each SOC, and effective fuel consumption rate when surplus power which is to be charged into the battery 209 is increased is calculated. A function of the operating point calculator 219 will be explained using FIGS. 50 to 52.

Figure 50:
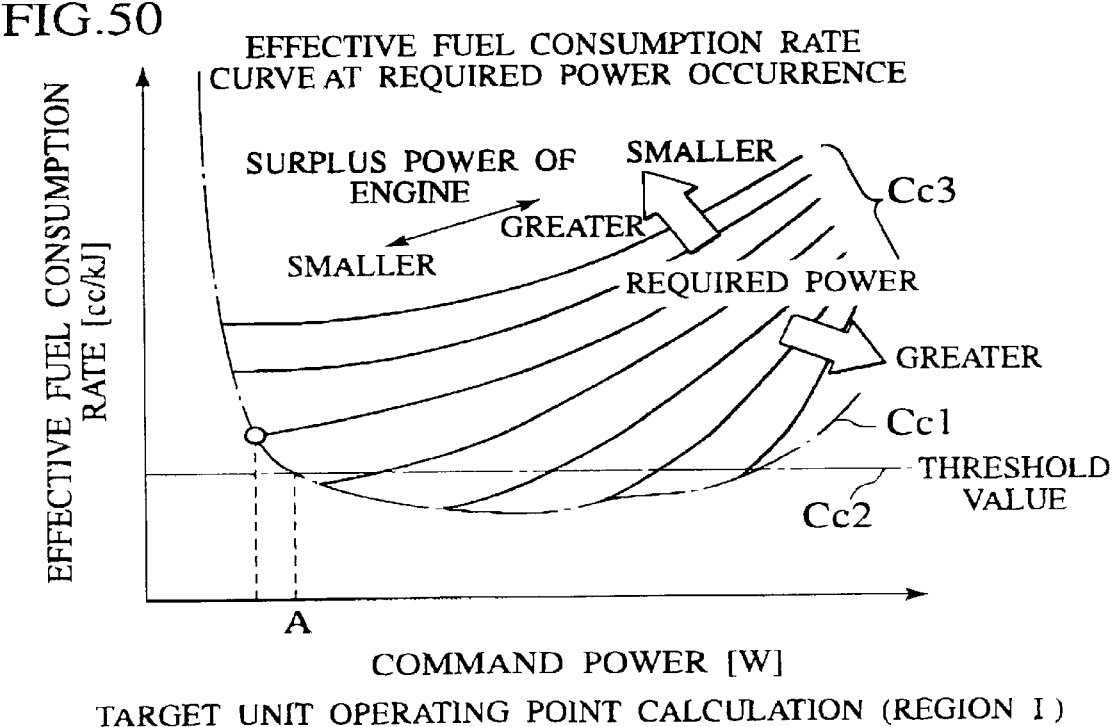
FIG. 50 is an explanatory view of target unit operating point calculating processing in the embodiment (region I)

In FIG. 50, the curve Cc1 shown with the phantom chain line shows an effective fuel consumption rare when electric power is directly distributed. Each solid line Cc3 shows an effective fuel consumption rate when surplus electric power with respect to the required power is occurred when the required power in a certain SOC is a predetermined value and the surplus electric power is increased. Each solid line Cc3 is obtained for each required power, and solid line which is closer to right side shows higher load having greater required power.

If a point when the required power is directly distributed is in the region I, the curve Cc1 showing the effective fuel consumption rate is greater than the threshold value Cc2, and if the engine 201 is driven the efficiency is deteriorated with respect to the threshold value. Therefore, the engine 201 is not driven, and the motor 206 is driven by electric power discharged from the battery 209 to generate the driving power.

Figure 51:
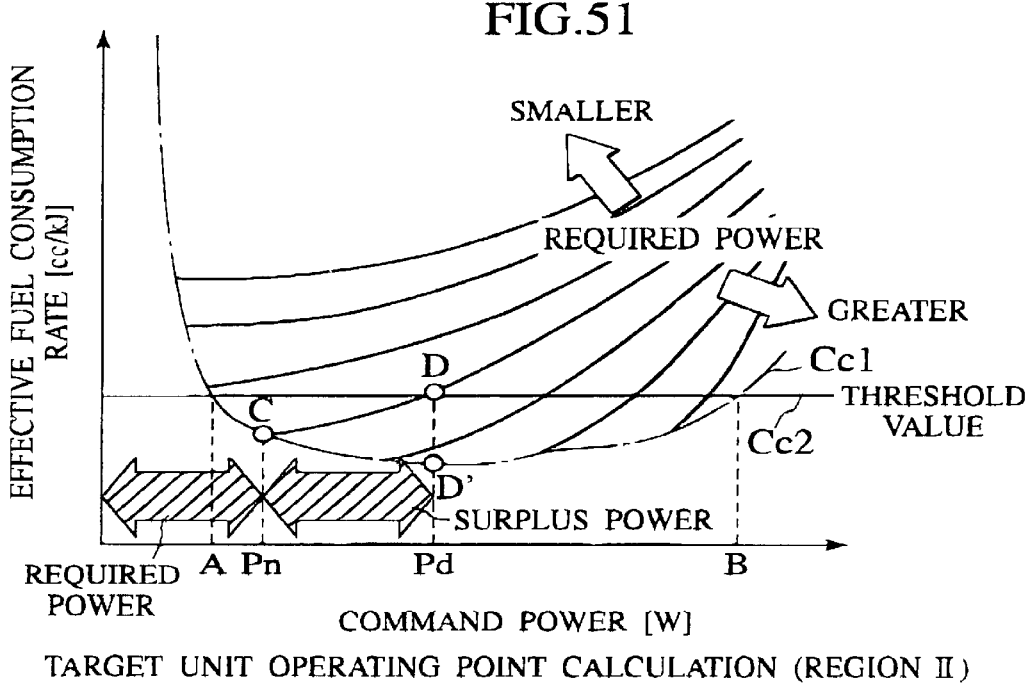
FIG. 51 is an explanatory view of target unit operating point calculating processing in the embodiment (region II)

FIG. 51 shows a case in which a point when the required power is directly distributed is in the region II. At a point in the region II, e.g., a point C in the drawing, the effective fuel consumption rate Cc1 when the electric power is directly distributed is smaller than the threshold value Cc2. Therefore, it seems possible to directly distribute the electric power at the point C. However, in a region where the effective fuel consumption rate Cc1 becomes greater than the threshold value Cc2 when the engine 201 is driven, the motor 206 is driven by electric power discharged from the c209 to enhance the fuel economy. Thus, it is preferable that to charge the battery 209 with electricity as efficiently as possible in a region where even if the electric power is directly distributed in the region II, the value becomes lower than the threshold value Cc2. Thereupon, the power (=Pd) generated in the engine 201 is increased to drive the engine 201 at a point D in the drawing in which the effective fuel consumption rate becomes equal to the threshold value.

In this case, a surplus power (=power Pd of the engine 201–required power Pn) which is a difference between the power of the engine 201 at the point D and output shaft power at the point C is used for charging into the battery 209. Here, power which is equal to the effective fuel consumption rate at the point D and power of the engine 201 at the point D is determined as a required power, and attention is paid to the effective fuel consumption rate at a point D' which is generated in the engine 201. A difference in effective fuel consumption rate of the points D and D' is generated from loss (motor efficiency, inverter efficiency, charging efficiency and discharging efficiency of the battery) generated when kinetic energy generated at the point D is once converted into electric energy by the generator 202. If it is assumed that a rate of loss with respect to surplus power used for generating electric power is constant, the loss is increased as the surplus power is greater. That is, the difference in effective fuel consumption rate at the points D and D' is increased.

Here, the effective fuel consumption rate may be calculated in such a manner that required power is previously used as parameter to obtain a value when surplus power which is added to the parameter is varied, and it is formed in a form of a map ("effective fuel consumption rate map" hereinafter). Of course, the value may not be formed in the form of a map, and it may be calculated by the CPU.

Figure 52:
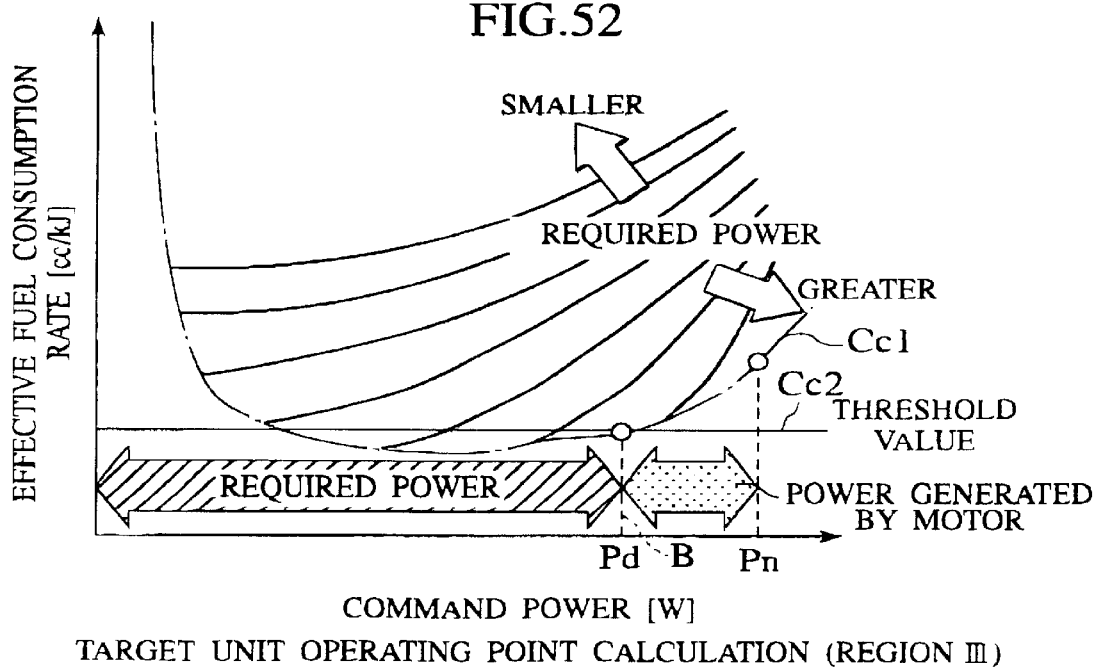
FIG. 52 is an explanatory view of target unit operating point calculating processing in the embodiment (region III)

FIG. 52 shows a case in which a point when the required power is directly distributed is in the region III. In this case, if the required power is occurred by the engine 201, the effective fuel consumption rate Cc1 becomes greater than the threshold value Cc2. Therefore, the power generated by the engine 201 is set to a maximum value which is equal to or smaller than the threshold value Cc2, and insufficient power is compensated by discharged electric power from the battery 209. As in the case in which the output shaft power is smaller than A[kW], all the power may be compensated by electric power discharged from the battery 209, but in this case, electric power coming in or out from the battery 209 is increased and loss caused by this is also increased and thus, all the power should not be compensated by the battery 209. However, when it is expected that a large quantity of electric power can be collected by regenerative braking, all the power may be compensated by the battery 209.

If effective fuel consumption rate Cc1 when required power is directly distributed is equal to the threshold value Cc2, the required power is occurred by the engine 201.

An operating point of a target operating point calculator 321 in an eleventh embodiment which will be described later can be determined in the same manner as that of the target unit operating point calculator 219 of the tenth embodiment by taking the transmission efficiency of the transmission 304 when the effective fuel consumption rate is calculated into account.

Figure 53:
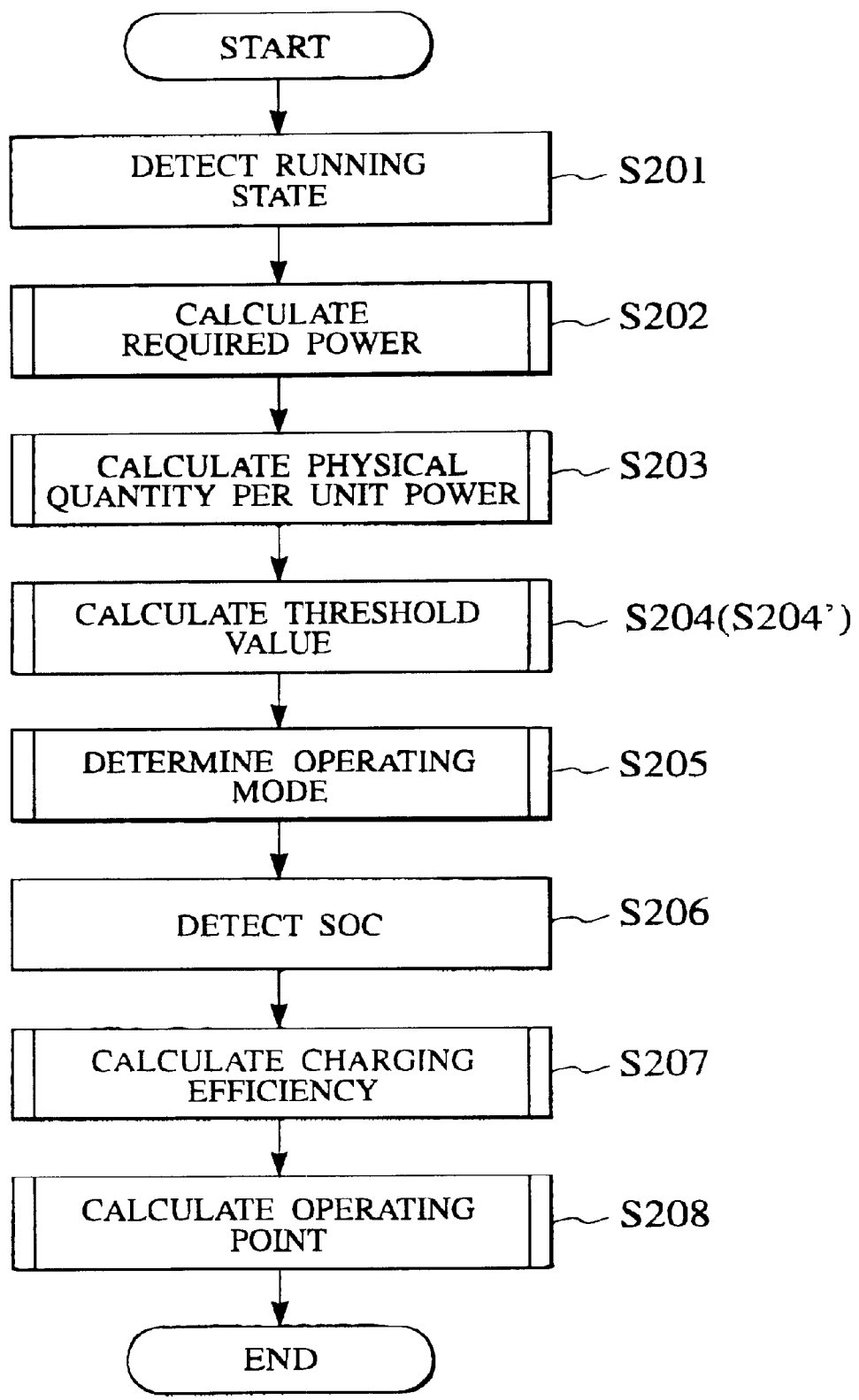
FIG. 53 is a flowchart of a main flow of the embodiment.

Next, a control of this embodiment will be explained based on flowcharts in FIGS. 53 to 60. FIG. 53 is a flowchart showing the flow of the entire control of this embodiment.

In step S201, signals indicative of vehicle states such as accelerator pedal actuation amount θa[deg], vehicle speed VSP[km/h], the rpm speed of motor Nm[rpm], the auxiliary equipment power Pa[kW] are read.

In step S202, power (required power) of the engine 201 required for running is calculated from the driving force power required by the driver and auxiliary equipment power required for driving the auxiliary equipment. In step S203, a fuel consumption rate per unit of a sum of the driving power and the auxiliary equipment power in the occurrence of the required power is calculated as a physical quantity per effective power. In step S204, a threshold value for determining the operating mode is calculated. In step S205, operating modes of the engine 201, the generator 202 and the battery 209 are determined.

In step S206, the charging state SOC is detected. In step S207, the charging efficiency is calculated with reference to the charging efficiency characteristic data based on the SOC detection value.

In step S208, operating points of the engine 201 and the generator 202 for realizing the determined operating modes are calculated.

Figure 54:
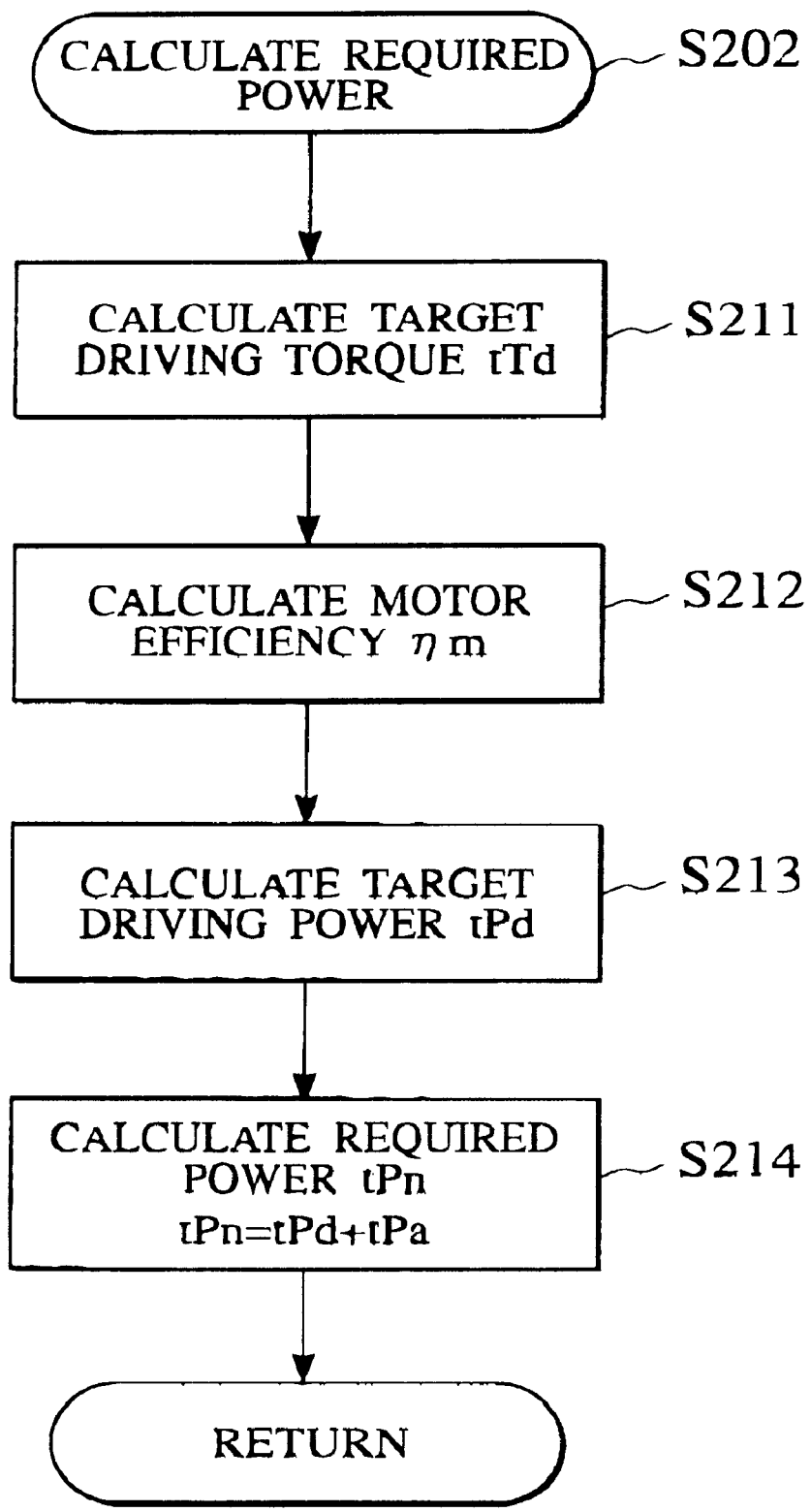
FIG. 54 is a detailed flowchart of required power calculating processing in the main flow of the embodiment.

Based on the flowchart in FIG. 54, detailed processing in step S202 for calculating the required power in the main flow in FIG. 53 will be explained.

Figure 61:
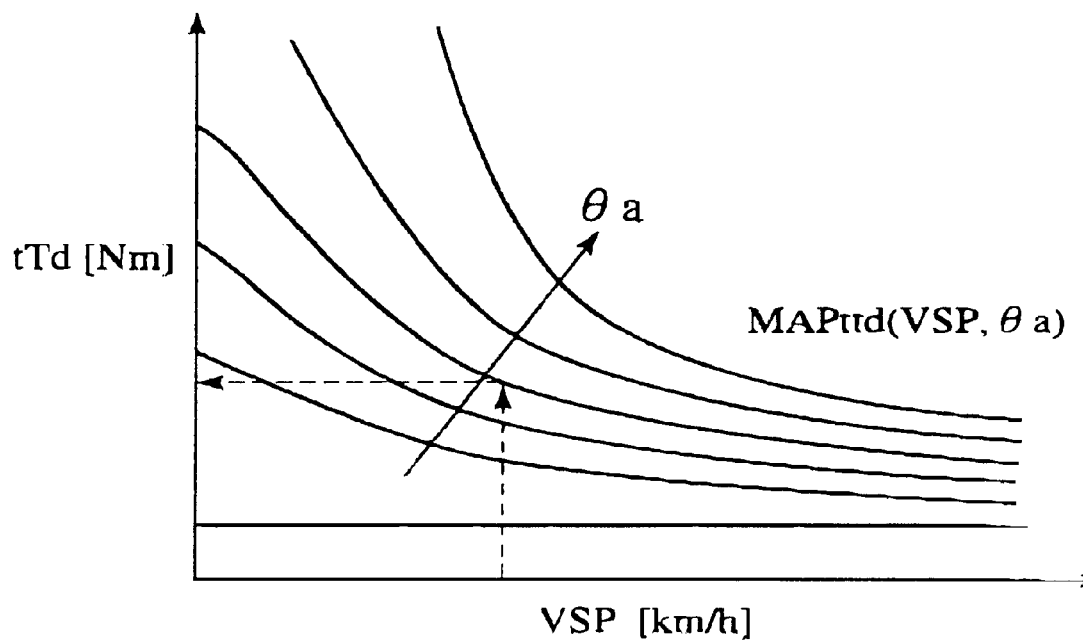
FIG. 61 is a graph of an example of target driving force map in the hybrid vehicle of the embodiment.

In step S211, MAPttd (VSP, θa) is retrieved using a map based on the vehicle speed VSP[km] and the accelerator pedal actuation amount θa[deg], thereby calculating the target driving torque tTd[Nm]. FIG. 61 shows an example of the target driving torque calculating map MAPttd (VSP, θa). This map is formed in such a manner that a driving force tTd required by the driver is estimated from the vehicle speed VSP and the accelerator pedal actuation amount θa, and the estimated value is formed in the form of a map. With respect to the target driving torque tTd[Nm], a dynamic compensation may be added to the target driving torque tTd by a variation limit or temporarily delay element for enhancing the driving performance after map retrieving.

Figure 62:
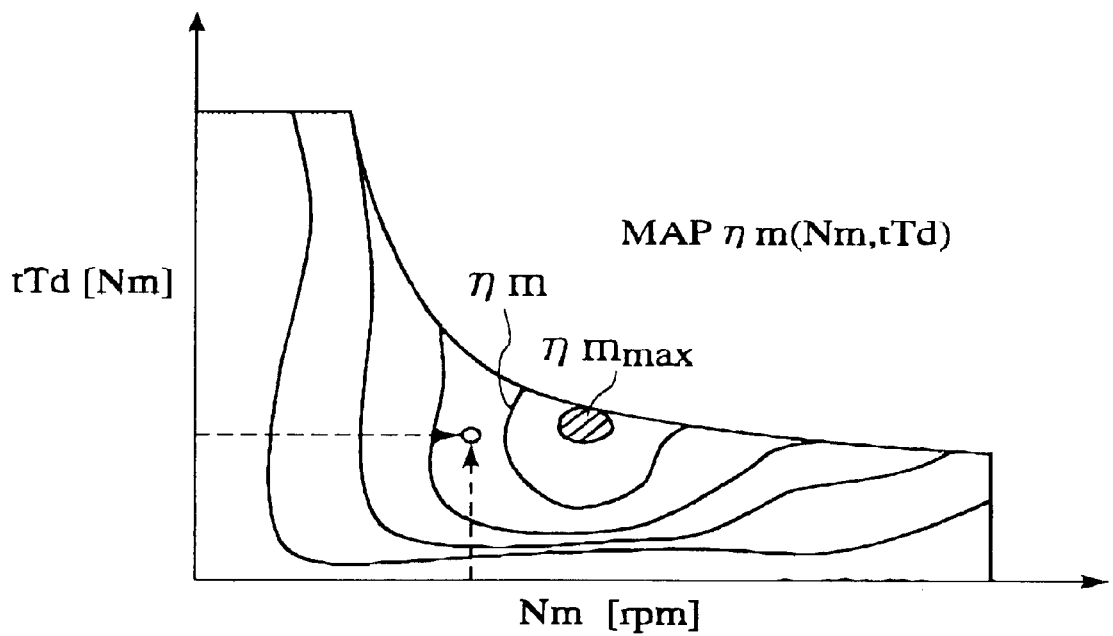
FIG. 62 is a graph of an example of motor efficiency in the hybrid vehicle of the embodiment.

In step S212, based on the target driving torque tTd[Nm] and the rpm speed of motor Nm[rpm], MAP ηm(tTd, Nm) is retrieved, thereby calculating the motor efficiency ηm. FIG. 62 shows an example of the motor efficiency calculating map MAP ηm(rTd, Nm). This map is formed from motor efficiency data previously obtained by experiment. In the drawing, equal motor efficiency line is shown, and a region ηmmax shown with a slant has a highest efficiency.

In step S213, a target driving power tPd[kW] is calculated by equation 12 using the target driving torque tTd[Nm], the rpm speed of motor Nm[rpm] and the motor efficiency ηm.

$$tPd = \frac{1}{1000} \cdot tTd \cdot \left(\frac{2\pi}{60} \cdot Nm\right) \cdot \frac{1}{\eta m} \qquad \text{[Equation 12]}$$

In step S214, a required power tPn[kW] is calculated by the following equation based on the target driving power tPd[kW] and auxiliary equipment power Pa[kW].

$$tPn = tPd + Pa \qquad \text{[Equation 13]}$$

Figure 55:
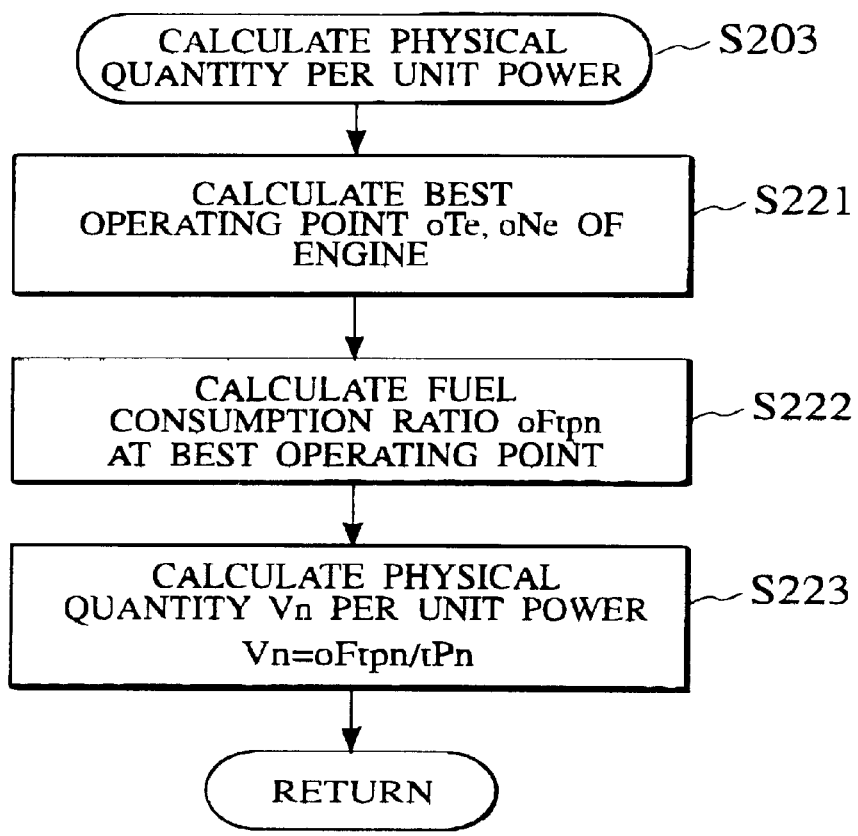
FIG. 55 is a detailed flowchart of physical quantity calculating processing per unit time in the main flow of the embodiment.

Based on the flowchart in FIG. 55, detailed processing in step S203 for calculating physical quantity per effective power in the main flow in FIG. 53 will be explained.

Figure 63:
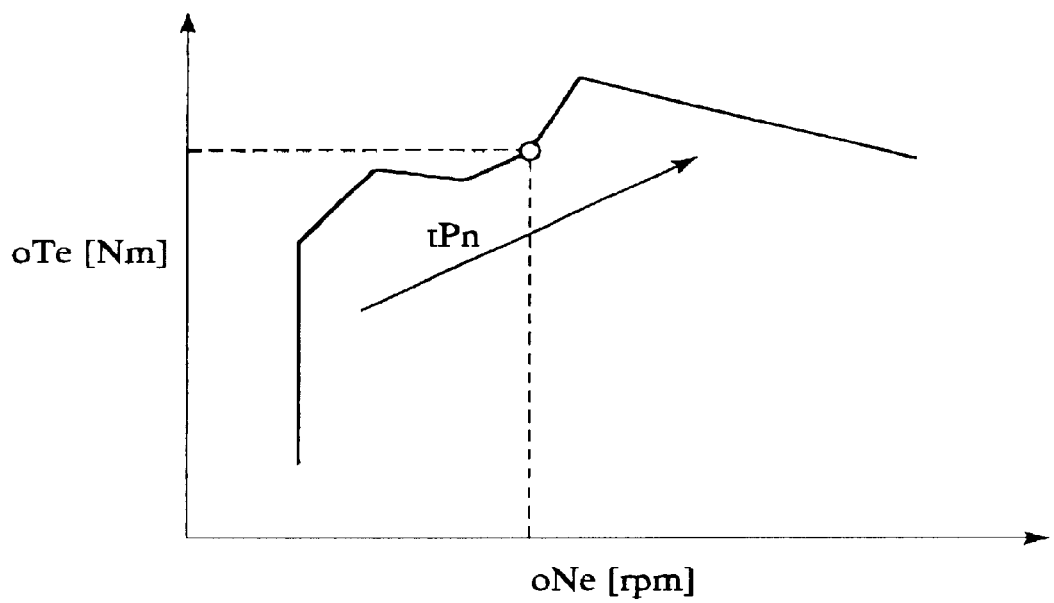
FIG. 63 is a graph of an example of operating point of an engine in the hybrid vehicle of the embodiment.

In step S221, best torque oTe[Nm] and best rpm speed oNe[rpm] which are best operating point of the engine 201 satisfying the required power tPn[kW] are calculated by retrieving from map data TBLote(tPn), TBLone(tPn) respectively. This map is calculated such that the fuel consumption amount when the required power tPn[kW] is occurred becomes smallest based on the fuel consumption rate of the engine 201 and the energy conversion efficiency of the generator 202. FIG. 63 shows an example of operating points of the engine 201 satisfying the required power tPn[kW]. The map data TBLote(tPn), TBLone(tPn) are formed in such a manner that operating points of required power shown in FIG. 63 are formed in a form of table for torque and rpm speed, respectively.

Figure 64:
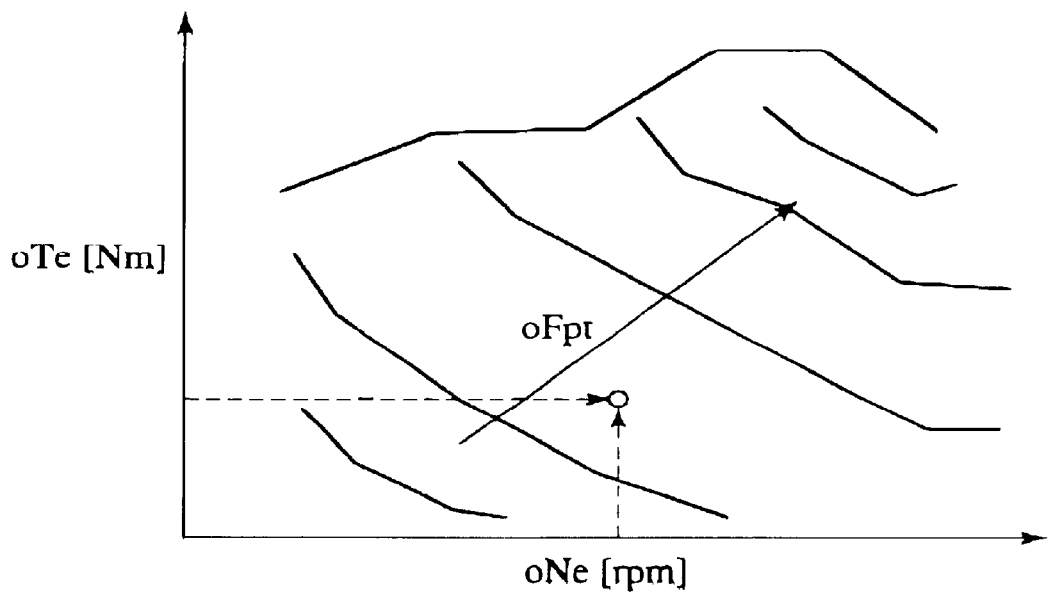
FIG. 64 is a graph of fuel consumption rate characteristic in the hybrid vehicle of the embodiment.

In step S222, based on the best torque oTe[Nm] and best rpm speed oNe[rpm], fuel consumption rate oFtpn[cc/sec] at the best operating point of the engine 201 is calculated by map retrieving the MAPfuel(oTe, oNe). FIG. 64 shows an example of the fuel consumption rate calculating map MAPfuel(oTe, oNe) of the engine 201. This map is formed by forming the fuel consumption rate previously obtained by experiment data and the like into a map.

In step S223, a physical quantity per effective power Vn[cc/kJ] is obtained by the following equation 14 based on the required power tPn[kW] and the fuel consumption rate oFtpn[cc/sec].

$$Vn = \frac{oFtpn}{tPn} \qquad \text{[Equation 14]}$$

Figure 56:
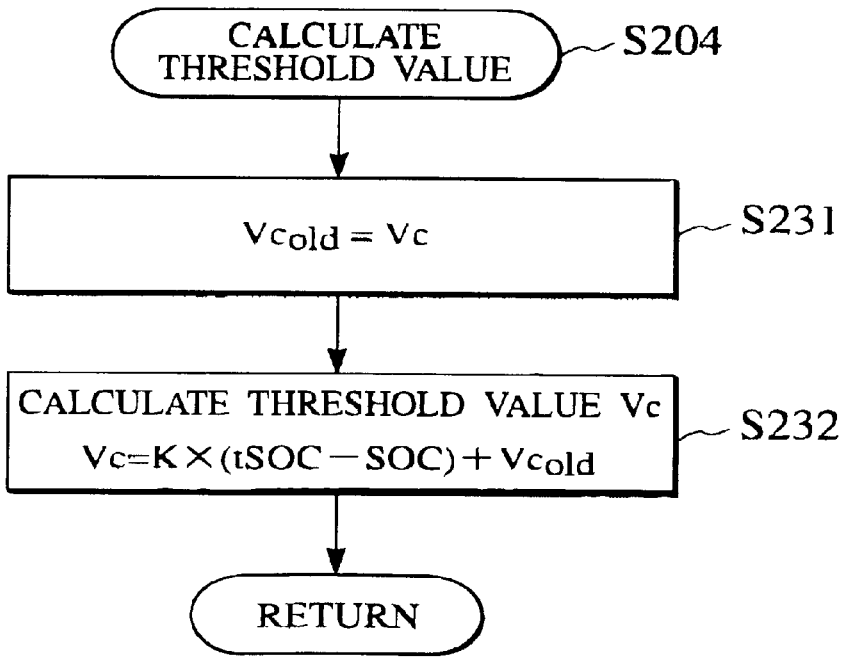
FIG. 56 is a detailed flowchart of threshold value calculating processing in the main flow of the embodiment.

Based on the flowchart in FIG. 56, detailed processing of the block S204 for calculating a threshold value for determining the operating mode in a main flow in FIG. 53 will be explained.

In step S231, a threshold value Vcbase[cc/kJ] in the last calculation is defined as $Vc_{old}$. In step S232, proportional control is carried out based on a deviation between a target SOC value tSOC[%] (e.g. tSOC=50[%]) and SOC value [%] of the battery 209, thereby calculating a threshold value Vc[cc/kJ]. Here, the threshold value Vc[cc/kJ] is obtained by the following equation 15.

$$Vc = K \cdot (tSOC - SOC) + Vc_{old} \qquad \text{[Equation 15]}$$

A value which was previously obtained by experiment is used as a constant K in the equation 15.

Figure 57:
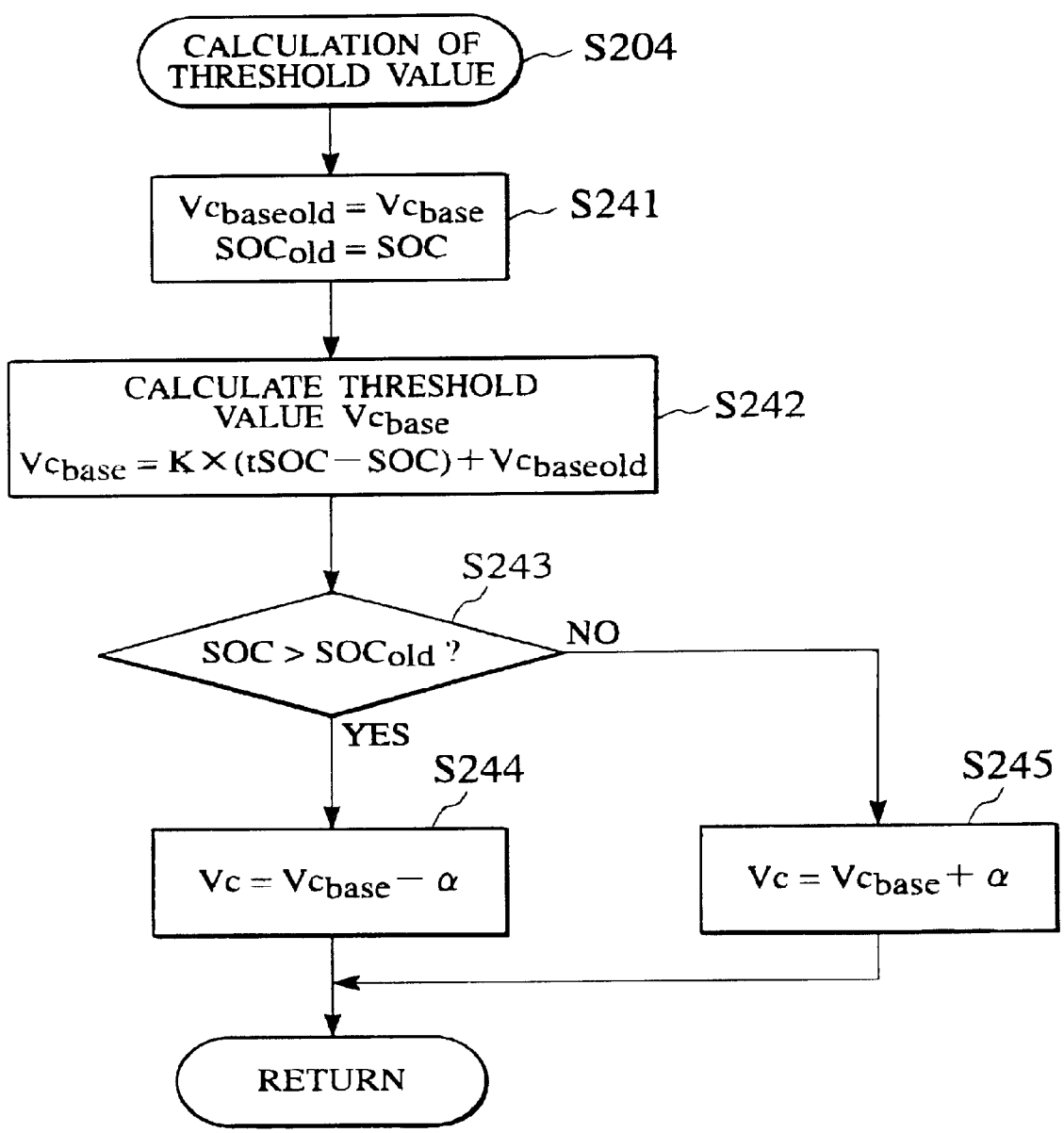
FIG. 57 is a detailed flowchart of state decision processing in the main flow of the embodiment.

The processing in step S204 for calculating the threshold value in the main flow in FIG. 53 can also be carried out by step S204' shown in the flowchart in FIG. 57. The processing of step S204' will be explained below.

First, in step S241, a threshold value $Vc_{base}$[cc/kJ] in the last calculation is defined as $Vc_{baseold}$[cc/kJ], and SOC detection value SOC[%] detected in the last calculation is defined as SOCold[%].

In step S242, proportional control is carried out based on a deviation between a target SOC value tSOC[%] (e.g., tSOC=50[%]) and SOC value [%] of the battery 209, thereby calculating a threshold value $Vc_{base}$[cc/kJ]. Here, the threshold value $Vc_{base}$[cc/kJ] is obtained by the following equation 16.

$$Vc_{base} = K \cdot (tSOC - SOC) + Vc_{basold} \qquad \text{[Equation 16]}$$

A value which was previously obtained by experiment is used as a constant K in the equation 16.

In step S243, SOC detection value SOC[%] detected in the current calculation and SOC detection value SOCold are compared in size. In this comparison, of SOC>SOCold, a threshold value Vc is obtained by the following equation 17 in step S244.

$$Vc = Vc_{base} - \alpha \qquad \text{[Equation 17]}$$

A value which was previously obtained by experiment is used as a constant α in the equation 17.

In this comparison in step S243, of SOC>SOCold is not established, a threshold value Vc is obtained by the following equation 18 in step S245.

$$Vc = Vc_{base} + \alpha \qquad \text{[Equation 18]}$$

A value which was previously obtained by experiment is used as a constant α in the equation 18.

Based on the flowchart in FIG. 58, detailed processing of the block S205 for determining operating mode in a main flow in FIG. 53 will be explained.

In step S251, physical quantity per effective power Vn[cc/kJ] and threshold value Vc[cc/kJ] are compared in size.

Figure 65:
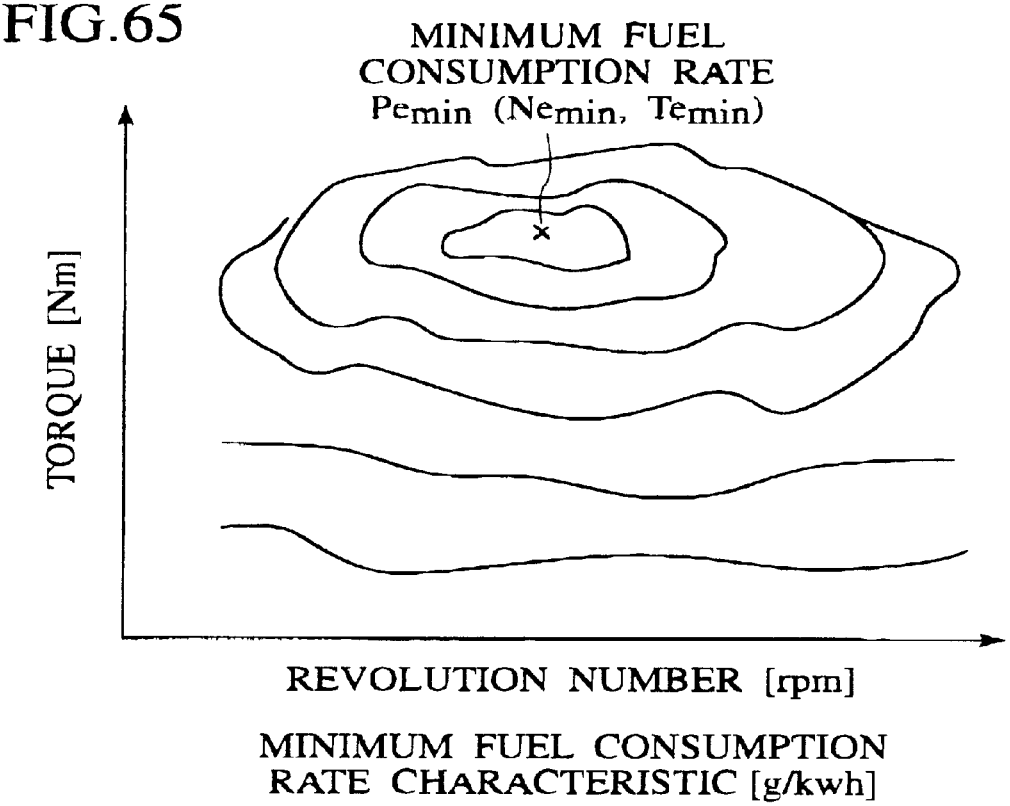
FIG. 65 is a graph showing minimum fuel consumption rate characteristic in the hybrid vehicle of the embodiment.

In this comparison, of Vn>Vc, required power tPn[kW], torque Temin [Nm] of the engine 201 which minimizes the amount of fuel consumed per unit power, and power Pemin [kW] in rpm speed Nemin[rpm] are compared in size. FIG. 65 shows a concrete example of Pemin[kW]. The following equation 19 is used for calculating the power Pemin[kW] in the operating point of the engine 201 which minimizes the amount of fuel consumed per unit power.

$$Pemin = Temin \cdot Nemin \cdot \frac{2\pi}{60 \cdot 1000} \qquad \text{[Equation 19]}$$

In comparison in step S252, if tPn=Pemin is established, operating mode flag FW is set t 1 in step S253, and if tPn=Pemin is not established, operating mode flag FW is set to 3 in step S254.

In comparison in step S251, if Vn>Vc is not established, it is decided whether Vn=Vc in step S255. If Vn=Vc, operating mode flag Fw is set to 4 in step S256, and if Vn=Vc is not established, operating mode flag Fw is set to 2 in step S257.

Based on a flowchart in FIG. 59, detailed processing in step S207 for calculating the charging efficiency in the main flow in FIG. 53 will be explained. In step S261, a charging efficiency ηc when a charging amount Pc[kW] is changed in each charging state SOC[%] is calculated by map retrieving using MAP (SOC, Pc). A value which was previously obtained by experiment is used as the MAP (SOC, Pc). In the present embodiment, the charging efficiency is calculated using the map formed based on the relation between the SOC and the charging amount. Alternatively, a map formed based on various factors affecting charging efficiency such as a temperature of the battery 209 may also be used.

Figure 60:
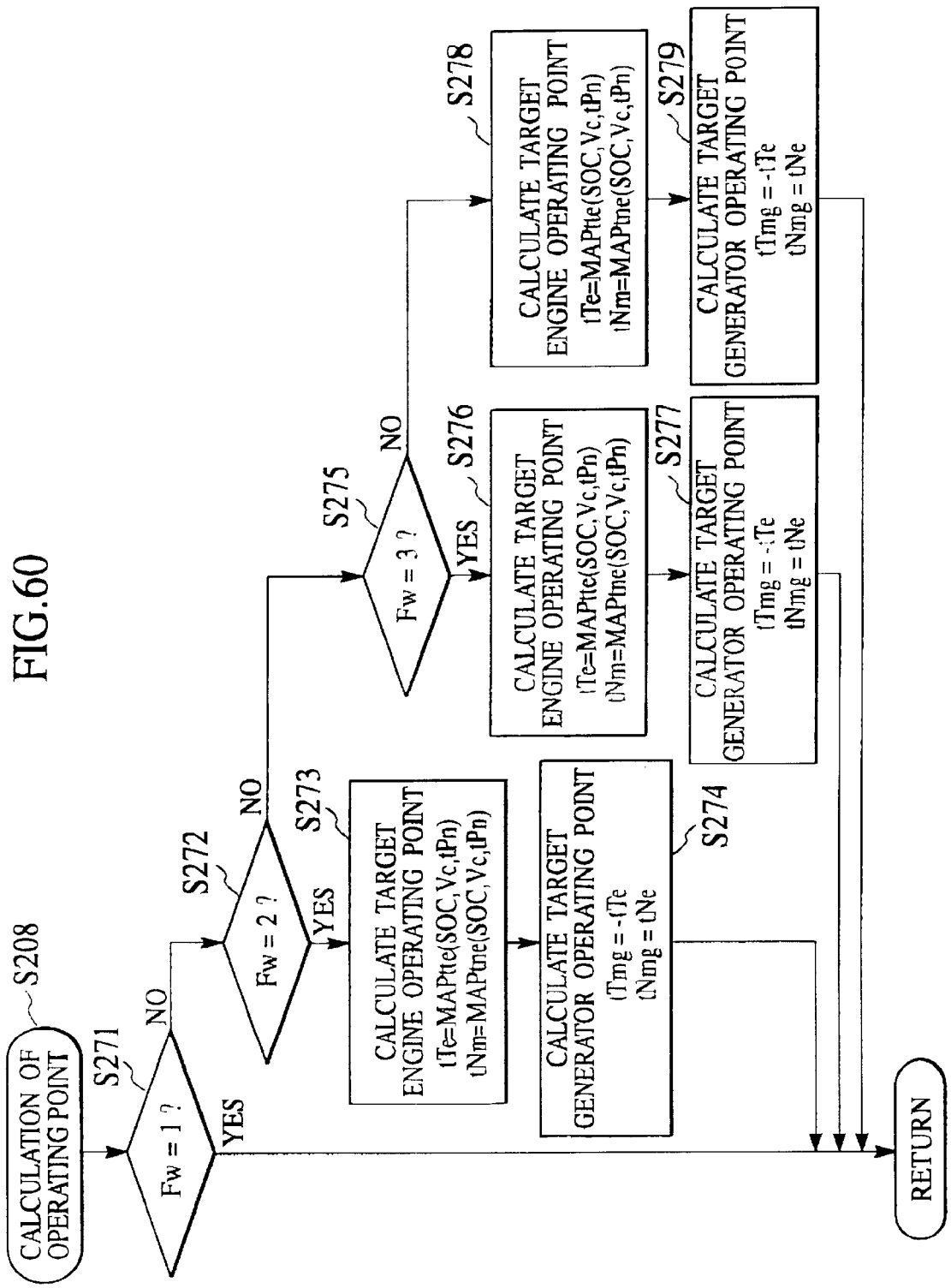
FIG. 60 is a detailed flowchart of operating point calculating processing in the main flow of the embodiment.

Based on a flowchart in FIG. 60, detailed processing in step S208 for calculating the operating point of the engine and the generator which realize the operating mode in the main flow in FIG. 53 will be explained.

In step S271, it is decided whether the operating mode flag Fw is equal to 1. If the operating mode flag Fw is 1, the engine 201 and the generator 202 are stopped, required power is supplied from the battery 209 and the processing is completed. However, if FW is not 1, it is decided whether the operating mode flag Fw is 2 in step S272.

In step S272, if the operating mode flag Fw is 2, the processing is proceeded to step S273. In step S273, a target torque tTe[Nm] and target rpm speed tNe[rpm] which are effective fuel consumption rate equal to a threshold value Vc[cc/kJ] at the time of the required power tPn[kW] are obtained by map retrieving using MAPtte(sov,Vc,tPn) and MAPtne(sov,Vc,tPn) from an effective fuel consumption rate map corresponding to the SOC detection value SOC [%]. The map used for retrieving is formed by associating the operating point of the engine 201 which becomes effective fuel consumption rate equal to the threshold value Vc[cc/kJ]. For example, the fuel consumption rate of the engine 201 and the energy conversion efficiency of the generator 202 are taken into account, and an operating point of the engine which minimizes the fuel consumption rate of the engine 201 is used.

In step S274, based on the target torque tTe[Nm] and target rpm speed tNe[rpm], a target torque Tmg[Nm] and a target rpm speed tNmg[rpm] of the generator 202 are obtained by the following equation 20.

$$tTmg = -tTe$$
$$tNmg = tNe \qquad \text{[Equation 20]}$$

In step S272, if the operating mode flag Fw is not 2, the processing is proceeded to step S275. In step S275, it is decided whether the operating mode flag Fw is 3.

In step S275, if the operating mode flag Fw is 3, the processing is proceeded to step S276. In step S276, a target torque tTe[Nm] and a target rpm speed tNe[rpm] of the engine 201 when maximum power equal to or lower than threshold value Vc are obtained by map retrieved using MAPtte(sov,Vc,tPn) and MAPtne(sov,Vc,tPn) from an effective fuel consumption rate map corresponding to the SOC detection value SOC[%]. The map used for retrieving is the same as that used in step S273. Insufficient electric power with respect to required power is supplied from the battery 209.

In step S277, based on the target torque tTe[Nm] and a target rpm speed tNe[rpm] of the engine 201, target torque Tmg[Nm] and a target rpm speed tNmg[rpm] of the generator 202 are obtained by the above equation 20.

In step S275, when the operating mode flag Fw is not 3, the processing is proceeded to step S278. In step S278, a target torque tTe[Nm] and a target rpm speed tNe[rpm] of the engine 201 when maximum power equal to or lower than threshold value Vc are obtained by map retrieved using MAPtte(sov,Vc,tPn) and MAPtne(sov,Vc,tPn) from an effective fuel consumption rate map corresponding to the SOC detection value SOC[%]. The map used for retrieving is the same as that used in step S273.

In step S279, based on the target torque tTe[Nm] and a target rpm speed tNe[rpm] of the engine 201, target torque Tmg[Nm] and a target rpm speed tNmg[rpm] of the generator 202 are obtained by the above equation 20.

Figure 67:
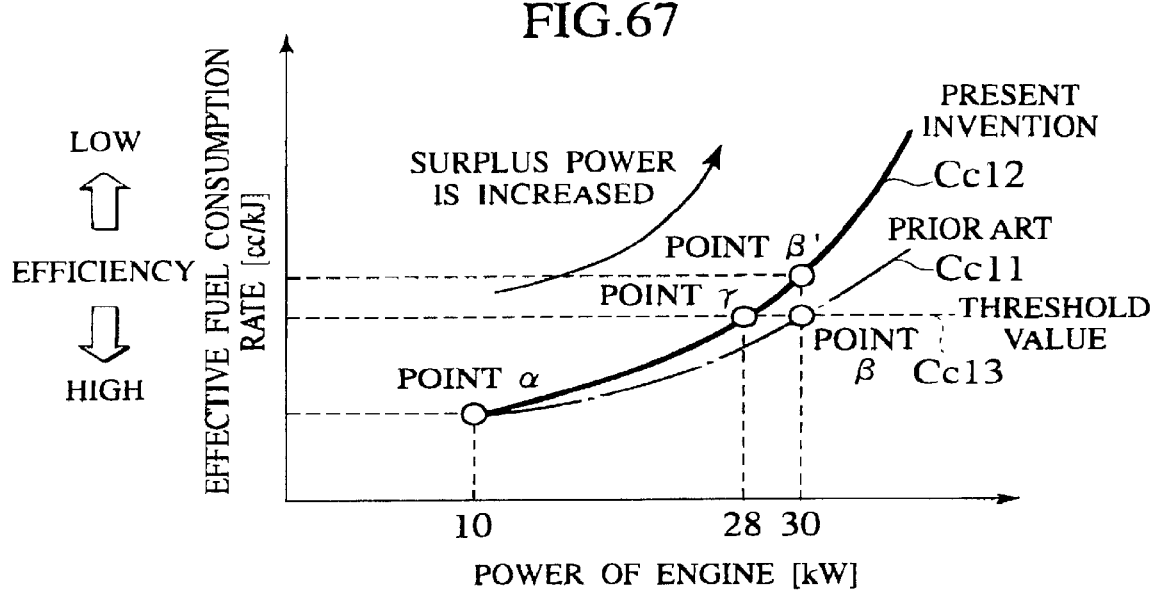
FIG. 67 is a graph showing working effect of the embodiment.

According to the tenth embodiment of the present invention, the following effect can be achieved. FIG. 67 shows an effective fuel consumption rate [cc/kJ] as a physical quantity per effective power when the power equal to or the required power (e.g., 10[kW]) is occurred in the engine 201 and surplus power to be used for charging into the battery 209 is increased. As the effective fuel consumption rate is smaller, the efficiency of the electric power generation is higher, and as the effective fuel consumption rate is greater, the efficiency of the electric power generation is low. A phantom chain line Cc11 shows an effective fuel consumption rate of a relevant example in which energy conversion efficiency of the battery 209 is constant value, and a thick solid line Cc12 shows an effective fuel consumption rate o this embodiment in which the energy conversion efficiency of the battery 209 is suited to the charging state.

A point α shows a case in which required power is occurred in the engine 201. A point β shows a case in which surplus power in the related art is increased and power of the engine (e.g., 30[kW]) is generated, and a point β' shows a case in which surplus power in the present embodiment is increased and power of the engine 201 (e.g., 30[kW]) is generated. As shown in FIG. 66, a difference in effective fuel consumption rate between the points β and β' is caused due to a difference in different energy conversion efficiency in accordance with the charging state. Further, operating modes of the generator 200 and the battery 209 and power of the engine 201 are calculated based on this effective fuel consumption rate.

In FIG. 67, a thick chain line Cc13 shows a threshold value. Here, an operating mode is selected such that the effective fuel consumption rate becomes equal to the threshold value and as a result, such operating modes that the generator 200 is driven and the battery 209 is charged with electric power are selected. As a power of the engine 201, power corresponding to the point β (e.g., 30[kW]) in the related art is calculated, and power corresponding to a point γ (e.g., 28[kW]) in the case of the present embodiment is calculated.

In the related art, since the effective fuel consumption rate is calculated using a small value with respect to the energy conversion efficiency of the actual battery, if power of the engine corresponding to the point β is generated, the actual effective fuel consumption rate corresponds to the point β'. As a result, electric power is generated with poor efficiency with respect to the threshold value.

FIG. 68 is a view illustrating the processing that the power of the engine 201 is actually calculated and the operating point calculator 219 for calculating the operating point at that time is calculated. In FIG. 68, a curve shown with a broken line Cc21 shows effective fuel consumption rate [cc/kj] which is fuel consumption amount per electric power when required power is occurred in the engine 201 in a certain SOC. The physical quantity per effective power is shown with this broken line Cc21. Each solid line Cc22 is a curve showing effective fuel consumption rate when required power is occurred in the engine 201 and surplus power to be used for charging into the battery 209 is increased. Each solid line Cc22 is obtained for each required power, and solid line which is closer to right side shows higher load having greater required power. Each solid line Cc22 is calculated while taking the charging efficiency of the battery 209 shown in FIG. 66 into account.

If the charging efficiency characteristic of the battery 209 in FIG. 66 is seen, even if the charging amount is the same, if SOC is high, efficiency is high. In the operating point calculator 219, the charging efficiency characteristic of the battery 209 is taken into account, required power is occurred in the engine 201 for each SOC, and the effective fuel consumption rate when the surplus power to be charged into the battery 209 is increased can be calculated.

Parallel Hybrid Vehicle

Figure 69:
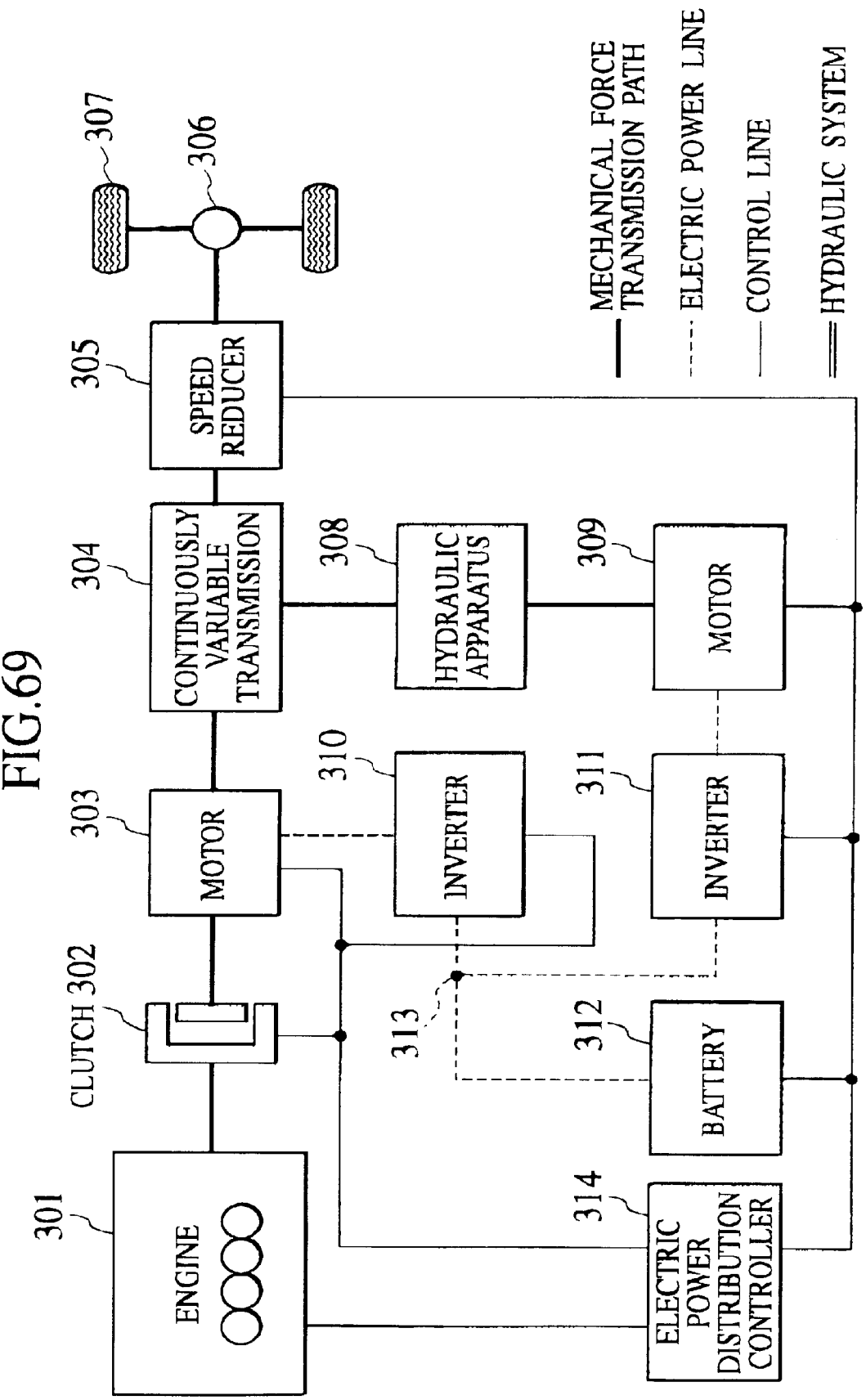
FIG. 69 is a block diagram showing a power train of an eleventh embodiment.
Figure 70:
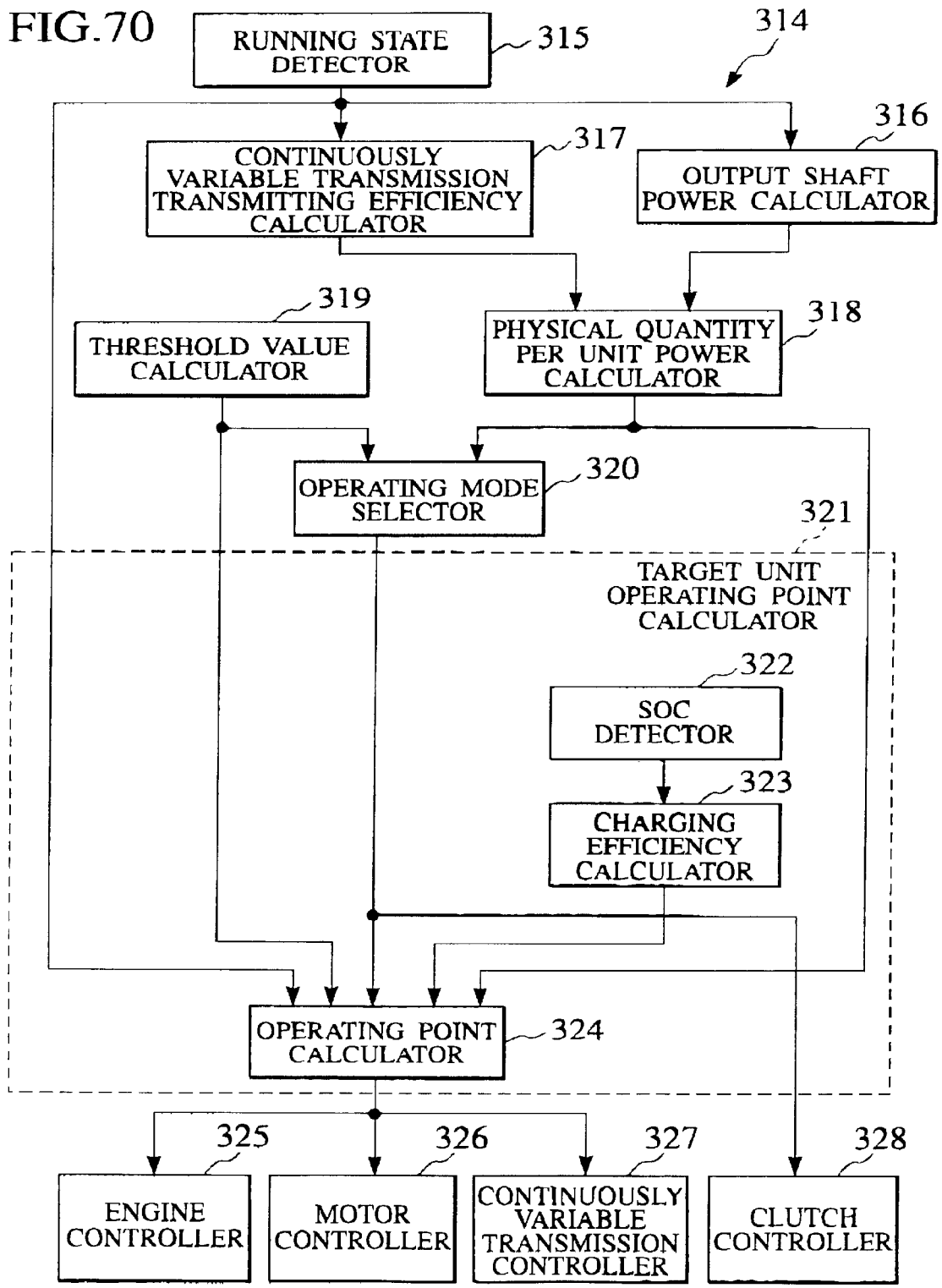
FIG. 70 is a block diagram showing a functional structure of an electric power distribution controller of the embodiment.

Next, a control system for a hybrid vehicle of an eleventh embodiment of the present invention will be explained based on FIGS. 69 and 70. FIG. 69 shows a structure of the eleventh embodiment. Here, a case in which a belt type continuously variable transmission is used as a transmission 304. In FIG. 69, a thick solid line indicates a transmitting path of a mechanical force, a broken line shows an electric power line, a thin solid line shows a control line, and a double line shows a hydraulic system.

A power train of this vehicle comprises an engine 301, a clutch 302, a motor 303, the transmission 304, a speed reducer 305, a differential apparatus 306 and driving wheels 307. An output shaft of the engine 301 and an input shaft of the clutch 302 are connected to each other. An output shaft of the clutch 302, an output shaft of the motor 303 and an input shaft of the transmission 304 are connected to each other. When the clutch 302 is fastened, the engine 301 and the motor 303 are propulsion sources of the vehicle, and when the clutch 302 is released, only the motor 303 is a propulsion source of the vehicle.

A driving force of the engine 301 and/or the motor 303 is transmitted to the driving wheels 307 through the continuously variable transmission 304, the speed reducer 305 and the differential apparatus 306. Pressure oil is supplied to the continuously variable transmission 304 from a hydraulic apparatus 308 for lubricating a clamp of a belt. An oil pump (not shown) of the hydraulic apparatus 308 is driven by a motor 309, and the motors 303 and 309 are not limited to alternating current apparatus, and direct current apparatus may also be used.

The clutch 302 is a powder clutch, and can adjust transmitted torque. It is also possible to use a dry single plate clutch or a wet multi-plate clutch as the clutch 302. In addition to the belt type continuously variable transmission in this embodiment, a continuously variable transmission or multi-stage transmission of another structure can also be used as the transmission 304 like the other embodiments.

The motors 303 and 309 are driven by inverters 310 and 311. When the direct current apparatus is used as the motors 303 and 309, DC/DC converter is used instead of the inverters. The inverters 310 and 311 are connected to the battery 312 through a common DC link 313, the direct current electric power of a battery 312 is converted into alternating current electric power, and the converted power is supplied to the motor 303, and the alternating current electric power of the motor 303 is converted into the direct current electric power and the converted power is charged into the battery 312. Like the other embodiments, various secondary batteries can be employed as the battery 312.

An electric power distribution controller 314 decides how to operate the engine 301 and the motor 303 based on accelerator operation from a driver (not shown) or vehicle speed signals from a vehicle speed sensor. To meet a result of the decision and requirement from the driver through the accelerator operation, the electric power distribution controller 314 generate a command value to the engine 301, the clutch 302, the motor 303 and the continuously variable transmission 304.

Next, using FIG. 70, the electric power distribution controller 314 will be explained in detail. The electric power distribution controller 314 comprises an operating mode selector for the engine 301, the motor 303 and the clutch 302 at the time of running, a calculator of operating points of the engine 301, the motor 303 and the continuously variable transmission 304 realizing the operating modes, and a controller group including an engine controller 325, a motor controller 346, a continuously variable transmission controller 327 and a clutch controller 328.

The engine controller 325 controls the engine 301 for realizing a command value (e.g., target torque or target rpm speed) from the portion which calculates the operating point. The continuously variable transmission controller 327 controls the continuously variable transmission 304 for realizing a command value (e.g., target transmission speed-change ratio) from the portion which calculates the operating point. The clutch controller 328 controls the clutch 302 for realizing the selected operating mode.

A running state detector 315 in the electric power distribution controller 314 detects the vehicle speed and the accelerator pedal operating amount. A continuously variable transmission efficiency calculator 316. A continuously variable transmission efficiency calculator 316 refers to transmission efficiency characteristic data with respect to transmission speed-change ratio for each vehicle speed stored in the memory, and calculates the transmission efficiency corresponding to the vehicle speed.

An output shaft power calculator 317 obtains a vehicle speed and a required driving force of the driver from an accelerator pedal operating amount at that time, and calculates power in the output shaft for realizing the required driving force based on the vehicle speed.

A physical quantity per effective power calculator 318 takes into account a fuel consumption rate characteristic of the engine 301 and a transmission efficiency of the continuously variable transmission 304, calculates power (required power) of the engine 301 required for realizing the power calculated in the output shaft power calculator 317, and calculates a predetermined physical quantity (physical quantity per effective power) concerning the engine 301 per unit amount of the output shaft power at that time.

A threshold value calculator 319 calculates a physical quantity which is an evaluation criterion for selecting an operating mode in an operating mode selector 320 which will be described latter, and sets a threshold value of the same unit as the physical quantity per effective power. For example, when an energy utilizing efficiency is to be enhanced, the threshold value assumes an amount of fuel consumed per unit power or value corresponding thereto, and when the exhaust gas is to be minimum, an exhaust gas amount per unit power is selected as the threshold value. In this embodiment, a case in which fuel consumption amount is to be reduced will be explained.

An operating mode selector 315 decides driving/stop of the engine 301 and the motor 303 and opening/fastening of the clutch 302, and based on the decision result, the operating mode selector 315 outputs a command to the clutch controller 328.

The target operating point calculator 321 comprises an SOC detector 322, a charging efficiency calculator 323, and an operating point calculator 324, and calculates target operating points of the engine 301, the motor 303 and the continuously variable transmission 304 based on the vehicle speed, the required power, the operating mode, the threshold value and the charging efficiency of the battery 312. The target operating point calculator 321 outputs the results to the engine controller 325, the motor controller 326 and the continuously variable transmission controller 327.

In the operating mode selector 320 of the eleventh embodiment also, the required power is occurred in the engine 301, and the required power is divided into the regions I to III as shown in FIG. 49 depending upon a relation between the effective fuel consumption rate and the threshold value when the generated required power is transmitted to the driving wheels 307 through the continuously variable transmission 304, the speed reducer 305 and the differential apparatus 306. In each region, the following operating mode is established. In the case of the region I, control is carried out in such a manner that the engine 301 is stopped, the battery 312 is discharged, and the clutch 302 is opened. In the case of the region II, control is carried out in such a manner that the engine 301 is driven, the motor 303 is driven, the battery 312 is charged, the clutch 302 is fastened. In the case of the region III, control is carried out in such a manner that the engine 301 is driven, the motor 303 is driven, the battery 312 is discharged, the clutch 302 is fastened.

Figure 72:
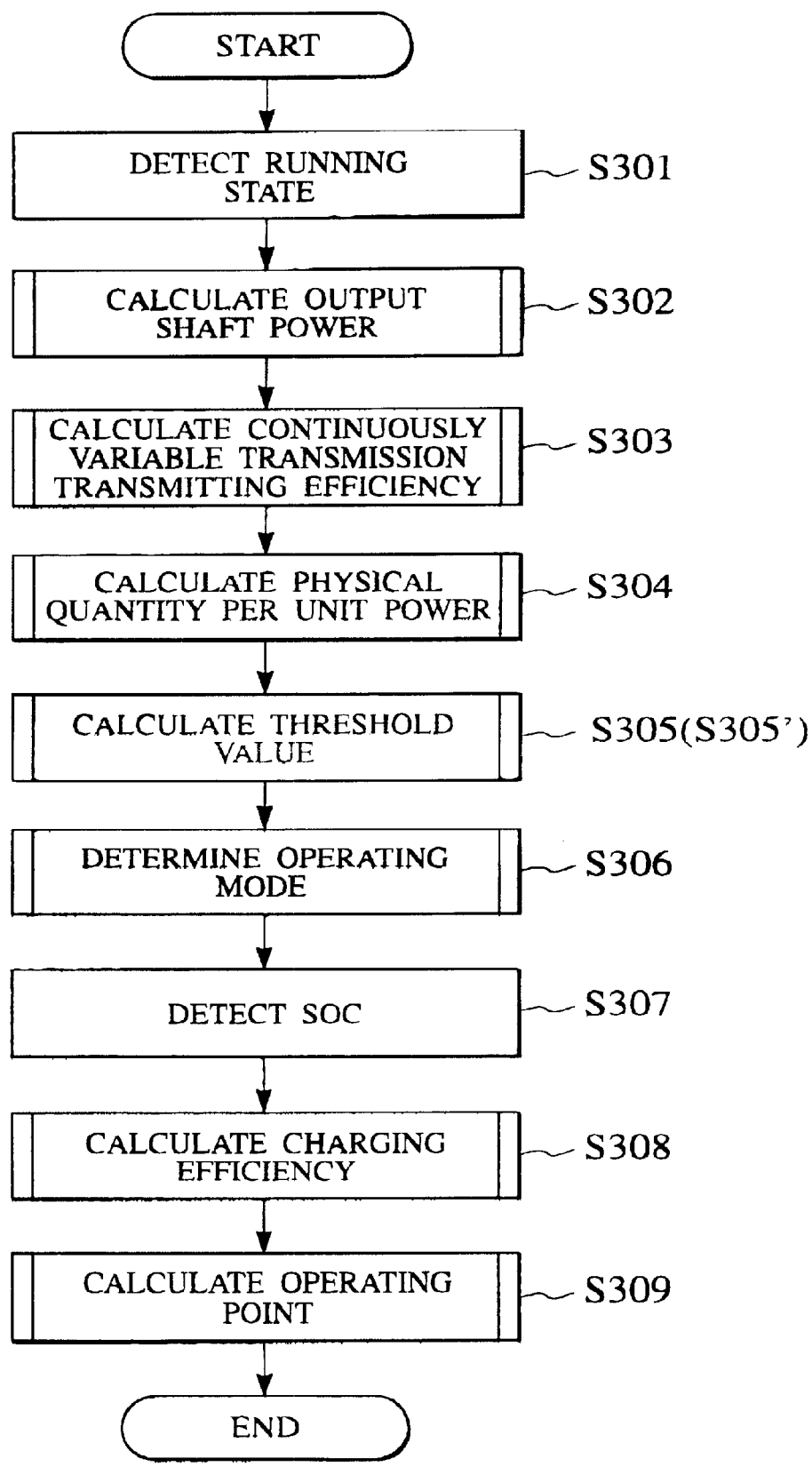
FIG. 72 is a flowchart of a main flow of the embodiment.

Next, control of the eleventh embodiment will be explained. FIG. 72 is a flowchart showing the entire flow of the control of the eleventh embodiment.

In step S301, signals indicative of vehicle states such as accelerator pedal operating amount θa[deg] and vehicle speed VSP[km/h] are read in. In step S302, power (output shaft power) required in the output shaft for satisfying the driving force required by the driver is calculated. Next, in step S303, transmission efficiency data string corresponding to transmission speed-change ratio of the continuously variable transmission 304 suitable for the vehicle speed is calculated. Next, in step S304, operating points of the engine 301, the motor 303 and the continuously variable transmission 304 capable of realizing the output shaft power with a minimum fuel consumption rate are calculated, and using the calculated operating points, a fuel consumption rate per unit amount when the power (required power) is occurred in the engine 301 is calculated.

Further, in step S305, a threshold value for determining the operating mode is calculated. In next step S306, operating modes of the engine 301, the motor 303, the battery 312 and the clutch 302 are determined. In next step S307, charging state SOC of the battery 312 is detected. In next step S308, charging efficiency is calculated from the charging efficiency characteristic data based on the SOC detection value.

Thereafter, in step S309, operating points of the engine 301, the motor 303 and the continuously variable transmission 304 for realizing the determined operating modes are calculated, and based on this, various devices are controlled.

Figure 73:
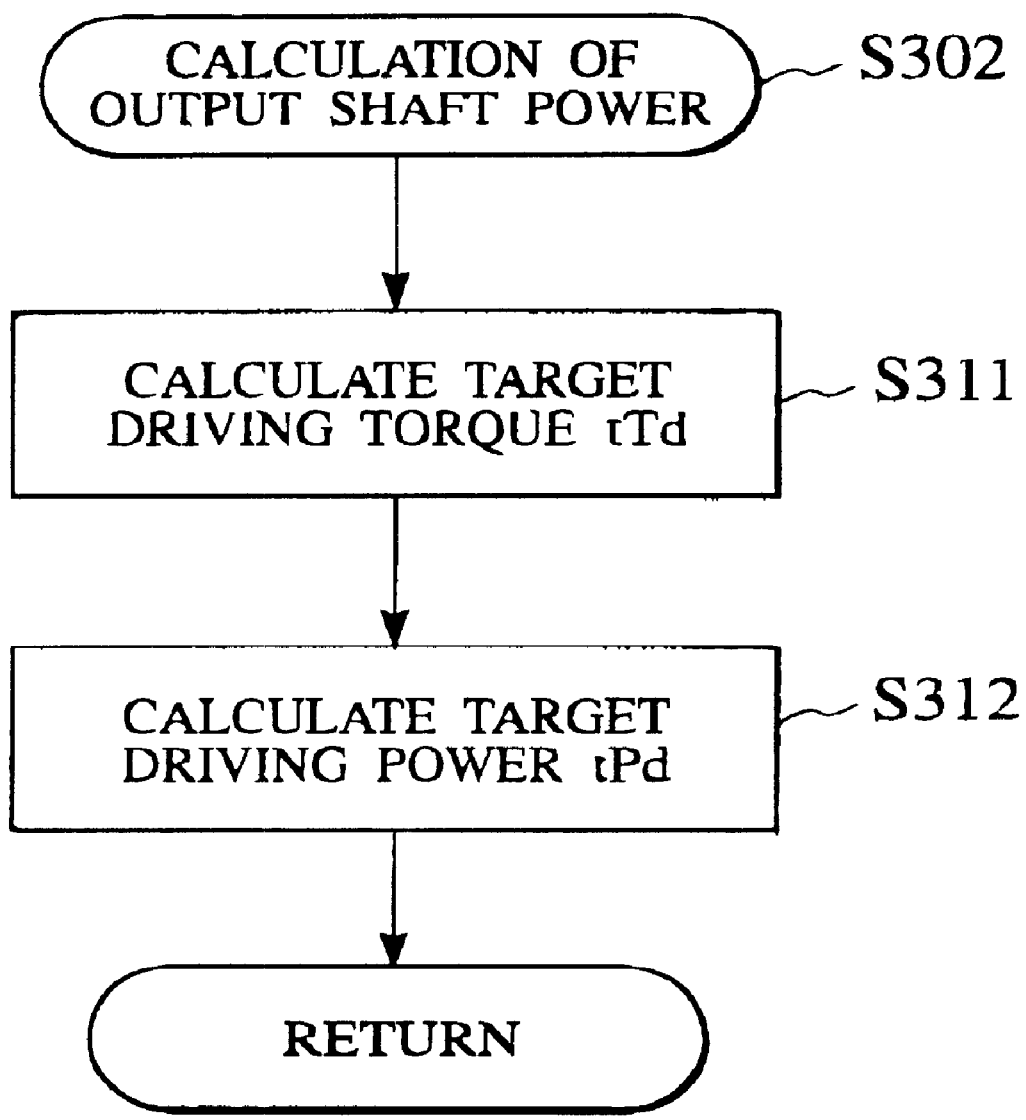
FIG. 73 is a detailed flowchart of output shaft power calculating processing in the main flow of the embodiment.

Based on a flowchart in FIG. 73, detailed processing in step S302 for calculating the output shaft power in the main flow in FIG. 72 will be explained. In step S311, a target driving torque tTd[Nm] is calculated by map retrieving a MAPttd (VSP, θa) based on the vehicle speed VSP[km/h] and the accelerator pedal actuation amount θa[deg]. This target driving torque calculating map MAPttd (VSP, θa) is shown in FIG. 61 like the tenth embodiment.

In next step S312, a target output shaft power tPd[kW] is calculated by the following equation 21 based on the target driving torque tTd[Nm] and the motor rpm speed Nm[rpm].

$$tPd = tTd \cdot \left( \frac{2\pi}{60 \cdot 1000} \cdot Nm \right) \quad \text{[Equation 21]}$$

Figure 74:
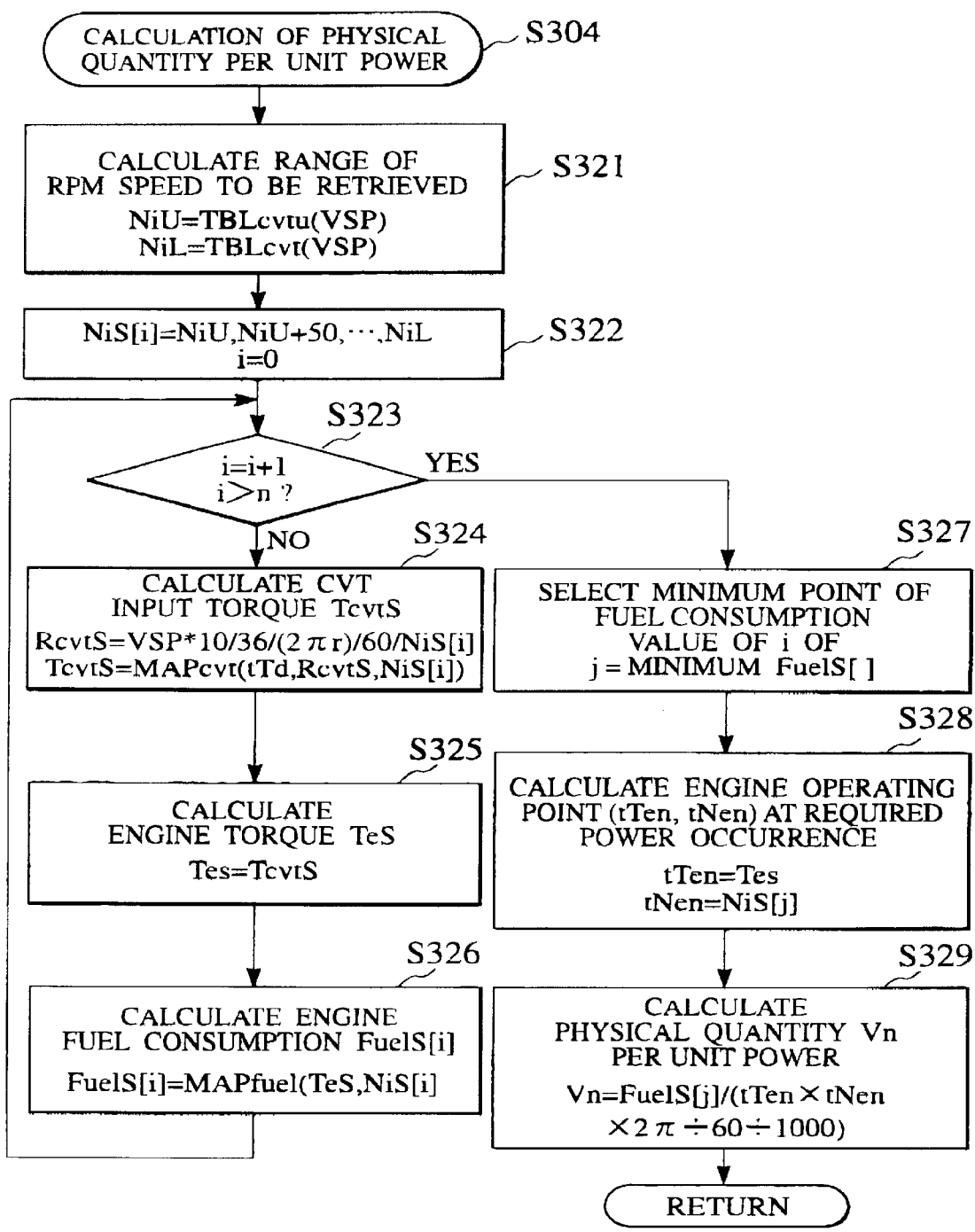
FIG. 74 is a detailed flowchart of physical quantity calculating processing per unit power in the main flow of the embodiment.

Based on a flowchart in FIG. 74, detailed processing in step S304 for calculating physical quantity per effective power in the occurrence of the required power in the main flow in FIG. 72 will be explained.

Figure 71:
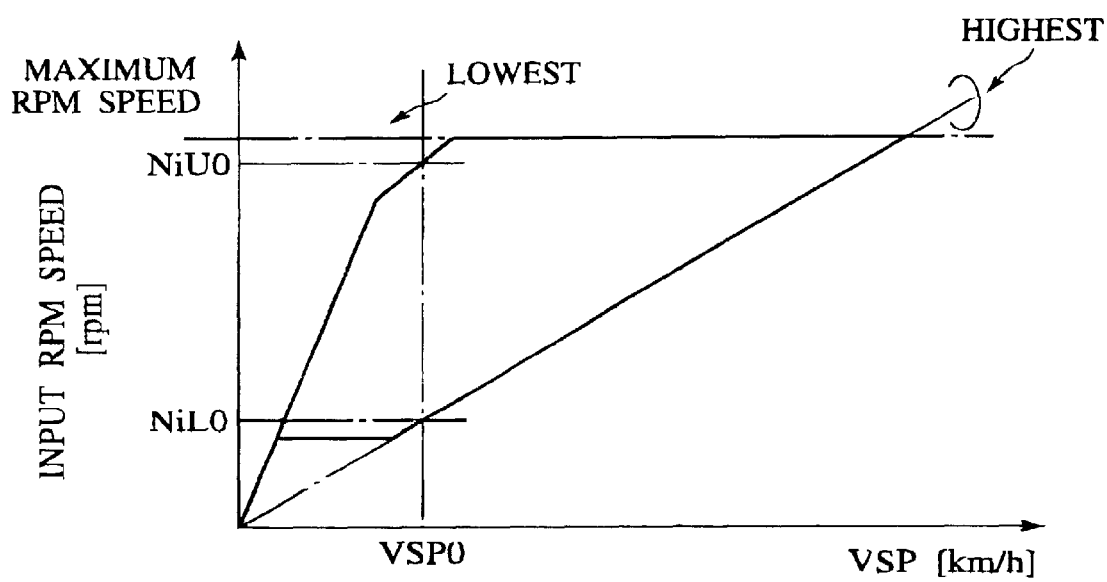
FIG. 71 is a graph showing possible range of rpm speed of an engine by limitation of a continuously variable transmission of the embodiment.

In step S321, a rpm speed upper limit value NiU[rpm] and a rpm speed lower limit value NiL[rpm] are obtained from a table TBLcvtu associated with an upper limit value of the engine rpm speed Ni[rpm] which can be taken in accordance with the vehicle speed VSP and from a table TBLcvtl associated with a lower limit value. For example, if a range of the engine rpm speed which can be taken by limitation of the continuously variable transmission 304 is determined as shown in FIG. 71, the following associations are taken: NiL0=TBLcvtl(VSP0), NiU0=TBLcvtu(VSP0).

In step S322, as the engine rpm speed for calculating the fuel consumption amount in the subsequent processing, strings NiS[n] (n is number of strings which is determined by NiL and NiU) which are divided every 50[rpm] from the rpm speed lower limit value NiL to the rpm speed upper limit value NiU are formed, and i is set to 0.

In step S323, i is incremented by one, and if i>n is not established, procedure is proceeded to step S324, and if i>n is established, the processing is proceeded to step S327.

In steps S324 to 326, a fuel consumption amount FuelS[i] of the engine 301 when engine rpm speed NiS[i] is taken is calculated. First, in step S324, a transmission speed-change ratio RcvtS of the continuously variable transmission 304 is obtained from the following equation 22 based on the vehicle speed VSP, the engine rpm speed NiS[i] and the tire effective radius r[m].

$$RcvtS = \frac{VSP \cdot 10}{36 \cdot 2\pi \cdot 60 \cdot NiS[i]} \quad \text{[Equation 22]}$$

Then, a continuously variable transmission input torque TcvtS[Nm] is obtained using a map MAPcvt(tTd, RcvtS, NiS[i]) of the continuously variable transmission input torque capable of realizing a target driving torque by correcting loss torque in the continuously variable transmission 304 from a target driving torque tTd[Nm], a transmission speed-change ratio RcvtS and the engine rpm speed NiS [rpm].

In step S325, the continuously variable transmission input torque TcvtS is defined as the engine torque TeS. In Step S326, a fuel consumption amount FuelS[i] of the engine 301 is retrieved using MAPfuel which is a function of the engine torque and the engine rpm speed. FIG. 65 shows one example of the MAPfuel.

If i>n in step S323 and the processing is proceeded to step S327, a string order j having the smallest value among the fuel consumption amount FuelS[] of the engine 301 corresponding to the engine rpm speed NiS[] is selected. In step S328, an operating point (torque: tTen[Nm], rpm speed tNen[rpm]) when power (required power) of the engine 301 which realizes the output shaft power is generated is calculated.

In step S329, a physical quantity Vn[cc/J] per effective power is obtained by the following equation 23.

$$Vn = \frac{FuelS[j]}{tTen \cdot tNen \cdot \frac{2\pi}{60 \cdot 1000}} \quad \text{[Equation 23]}$$

Detailed processing in step 305 for calculating a threshold value for determining an operating mode in the main flow in FIG. 72 is the same as that in step S204 in the tenth embodiment. This may be obtained by step S204' shown in a flowchart in FIG. 57.

Figure 58:
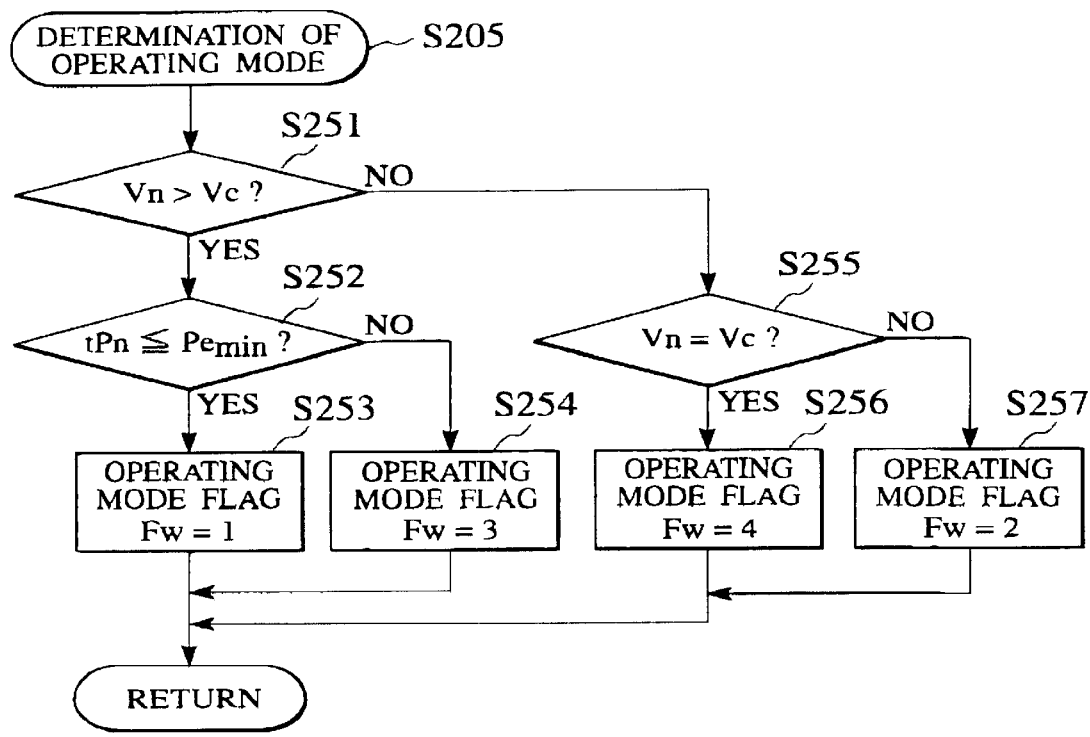
FIG. 58 is a detailed flowchart of operating mode determining processing in the main flow of the embodiment.
Figure 59:
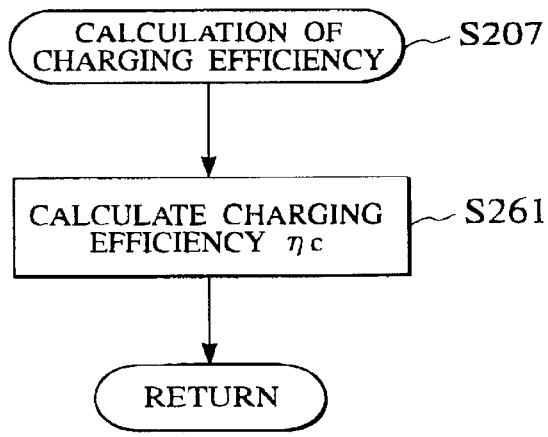
FIG. 59 is a detailed flowchart of charging efficiency calculating processing in the main flow of the embodiment.

Detailed processing in step S306 for determining an operating mode in the main flow in FIG. 72 is the same as that in step S205 in the tenth embodiment shown in FIG. 58, and detailed processing in step S308 for calculating the charging efficiency is the same as that shown in the flowchart in step S204 shown in FIG. 59.

Figure 75:
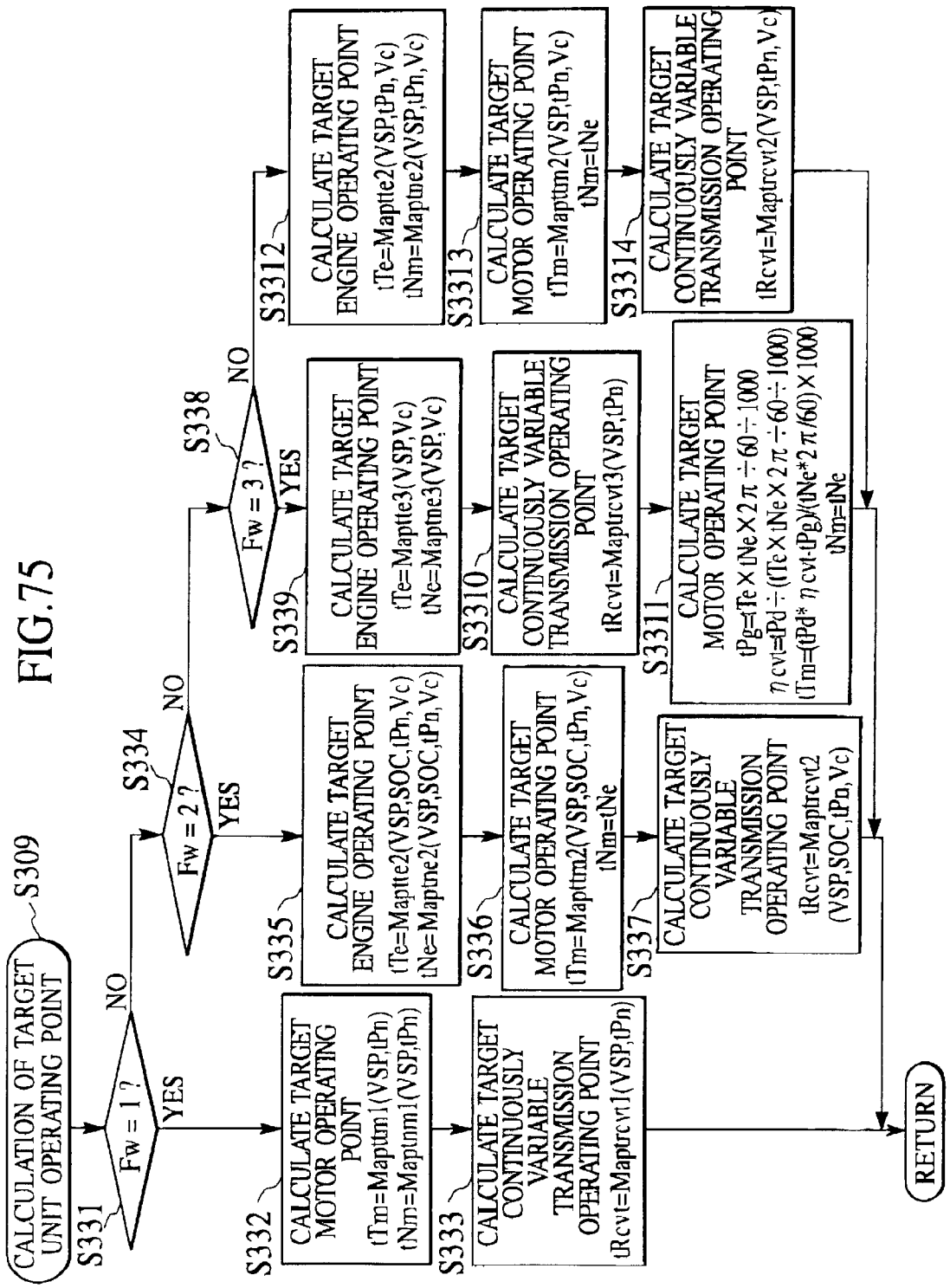
FIG. 75 is a detailed flow of operating point calculating processing in the main flow of the embodiment.

Next, detailed processing in step S309 for calculating operating points of the engine 301, the motor 303 and the continuously variable transmission 304 for realizing operating modes determined in the main flow in FIG. 72 will be explained based on a flowchart in FIG. 75.

In step S331, it is decided whether the operating mode flag Fw is 1. If Fw is 1, the processing is proceeded to step S332, and if not, the processing is proceeded to step S334.

If the operating mode flag Fw is 1 in step S331, in steps 332 and 333, energy conversion efficiency of the motor 303 and transmission efficiency of the continuously variable transmission 304 are taken into account, a combination of the operating point of the motor 303 capable of realizing the target output shaft power with minimum electric power and a transmission speed-change ratio of the continuously variable transmission 304 are obtained by map retrieving from the vehicle speed VSP[km/h] and the target output shaft power tPn[kW]. Here, as the map to be retrieved, a combination which was previously calculated is formed as a map for every operating point to be obtained. In step S332, when target torque tTm[Nm] of the motor is calculated, Mapttm1(VSP, tPn) is used, and a target rpm speed tNm[rpm] of the motor 303 is calculated, Maptnm1(VSP, tPn) is used. In step S333, when target transmission speed-change ratio tRcvt is calculated, Maptrcvt1(VSP, tPn) is used.

In step S331, if the operating mode flag Fw is not 1, in step S334, it is decided whether the operating mode flag Fw is 2. If Fw is 2, the processing is proceeded to step S334, and if Fw is not 2, the processing is proceeded to step S338.

In step S334, if the operating mode flag Fw is 2, in steps S335 to S337, target torque and target rpm speed of the engine 301, target torque and target rpm speed of the motor 303 and target transmission speed-change ratio of the continuously variable transmission 304 which are effective fuel consumption rate equal to a threshold value Vc[cc/kJ] at the time of the required power tPn[kW], are obtained by map retrieving corresponding to the vehicle speed VSP[km/h] and SOC detection value SOC[%].

The map used for retrieving is formed by associating the operating point of the engine 301, the motor 303 and the continuously variable transmission 304 which becomes effective fuel consumption rate equal to the threshold value Vc[cc/kJ]. For example, the fuel consumption rate of the engine 301, the energy conversion efficiency of the motor 303 and transmission efficiency data string of the continuously variable transmission 304 are taken into account, and the fuel consumption rate map is formed using torque and rpm speed of the engine 301, torque and rpm speed of the motor 303 and transmission speed-change ratio of the continuously variable transmission 304 which minimizes the fuel consumption rate of the engine 301.

In step S335, the target torque tTe[Nm] and the target rpm speed tNe[rpm] of the engine 301 are calculated from the vehicle speed VSP[km/h], the required power tPn[kW] and threshold value Vc[cc/kJ] by map of the Maptte2 (VSP, SOC, tPn, Vc) and Maptne2 (VSP, SOC, tPn, Vc).

In step S336, a target torque tTm[Nm] of the motor 303 when the effective fuel consumption rate becomes the same as the threshold value is calculated by map retrieving of the Mapttm2 (VSP, SOC, tPn, Vc) from the vehicle speed VSP[km/h], SOC detection value SOC[%] and the required power tPn[kW], and these are defined as target rpm speed tNm[rpm] and tNe[rpm].

In step S337, a transmission speed-change ratio tRcvt of the continuously variable transmission 304 when the effective fuel consumption rate becomes the same as the threshold value is calculated by map retrieving of Maptrcvt2 (VSP, SOC, tPn, Vc) from the vehicle speed VSP[km/h], SOC detection value SOC[%], the required power tPn[kW] and the threshold value Vc[cc/kJ].

In the above-described step S334, if the operating mode flag Fw is not 2, it is decided whether the operating mode flag Fw is 3 in step S338, and if the operating mode flag Fw is 3, the processing is proceeded to step S339. If the operating mode flag Fw is not 3, the processing is proceeded to step S3312.

If the operating mode flag Fw is 3 in step S338, target torque and target rpm speed of the engine 301, target torque and target rpm speed of the motor 303 and target transmission speed-change ratio which are effective fuel consumption rate equal to a threshold value Vc[cc/kJ] at the time of the required power tPn[kW], are obtained by map retrieving corresponding to the vehicle speed VSP[km/h] in steps S339 to S3311.

The map used for retrieving is formed by associating the operating points of the engine 301, the motor 303 and the continuously variable transmission 304 which becomes effective fuel consumption rate equal to the threshold value Vc[cc/kJ]. For example, the fuel consumption rate of the engine 301, the energy conversion efficiency of the motor 303 and transmission efficiency data string of the continuously variable transmission 304 are taken into account, and the fuel consumption rate map is formed using torque and rpm speed of the engine 301, torque and rpm speed of the motor 303 and transmission speed-change ratio of the continuously variable transmission 304 which minimizes the fuel consumption rate of the engine 301.

In step S339, the target torque tTe[Nm] and the target rpm speed tNe[rpm] of the engine 301 are calculated from the vehicle speed VSP[km/h] and threshold value Vc[cc/kJ] by map of the Maptte3 (VSP, Vc) and Maptne3 (VSP, Vc).

In next step S3310, a target transmission speed-change ratio tRcvt of the continuously variable transmission 304 is calculated by map retrieving of MaptrcvT3(VSP, tPn) from the vehicle speed VSP and the required power tPn[kW].

In step S3311, power tPg[kW] of the engine 301 when the target torque tTe[Nm] and the target rpm speed tNe[rpm] of the engine 301 are generated is calculated using the following equation 24.

$$tPg = tTe \cdot tNe \cdot \frac{2\pi}{60 \cdot 1000} \quad \text{[Equation 24]}$$

A transmission efficiency ηcvt continuously variable transmission in the continuously variable transmission 304 is calculated using the following equation 25.

$$\eta cvt = \frac{tPd}{tTe \cdot tNe \cdot \frac{2\pi}{60 \cdot 1000}}$$ [Equation 25]

Based on the above calculation results, the target torque tTe[Nm] and the target rpm speed tNe[rpm] of the motor which become effective fuel consumption rate when the required power equal to the threshold value Vc[cc/kJ] corresponding to the vehicle speed VSP[km/h] is generated are calculated using the following equation 26.

$$tTm = \frac{tPd \cdot \eta cvt - tPg}{tNe \cdot \frac{2\pi}{60}} \cdot 1000$$ [Equation 26]

$$tNm = tNe$$

If the operating mode flag Fw is not 3 in step S338, target torque and target rpm speed of the engine 301, target torque and target rpm speed of the motor 303 and target transmission speed-change ratio of the continuously variable transmission 304 when the effective fuel consumption rate equal in the occurrence of the required power becomes equal to the threshold value Vc[cc/kJ] are obtained by map retrieving corresponding to the vehicle speed VSP[km/h] in steps S3312 to S3314.

In step S3312, the target torque tTe[Nm] and the target rpm speed tNe[rpm] of the engine 301 are calculated from the vehicle speed VSP[km/h], the required power tPn[kW] and threshold value Vc[cc/kJ] by map of the Maptte2 (VSP, tPn, Vc) and Maptne2 (VSP, tPn, Vc). Here, the Maptte2 (VSP, tPn, Vc) and Maptne2 (VSP, tPn, Vc) are the same as those used in the map retrieving in step S3in the map retrieving in step S335.

In step S3313, a target torque tTm[Nm] of the motor 303 when the effective fuel consumption rate becomes the same as the threshold value is calculated by map retrieving of the Mapttm2 (VSP, tPn, Vc) from the vehicle speed VSP[km/h], and the required power tPn[kW], and the target rpm speed tNm[rpm] is defined as tNe[rpm]. Here, the Mapttm2 (VSP, tPn, Vc) is the same as that used in the map retrieving in step S336.

In step S3314, a transmission speed-change ratio tRcvt of the continuously variable transmission 304 is calculated by map retrieving of Maptrcvt (VSP, tPn, Vc) from the vehicle speed VSP[km/h] and the required power tPn[kW]0. Here, the Maptrcvt (VSP, tPn, Vc) is the same as that used in the map retrieving in step S337.

With the above operation, according to the eleventh embodiment, in addition to the working effect of the tenth embodiment, by comparing the threshold value and the physical quantity per effective power calculated while taking the energy conversion efficiency of the battery which is varied in accordance with the charging state detection value and charging amount, energy conversion efficiency of the engine and the motor and the transmission efficiency of the transmission into account, it is possible to determine the operating modes of the engine, the battery and the motor as well as operating points of the engine, the motor and the transmission which are more suitable for actual running state as compared with related art.

Figure 76:
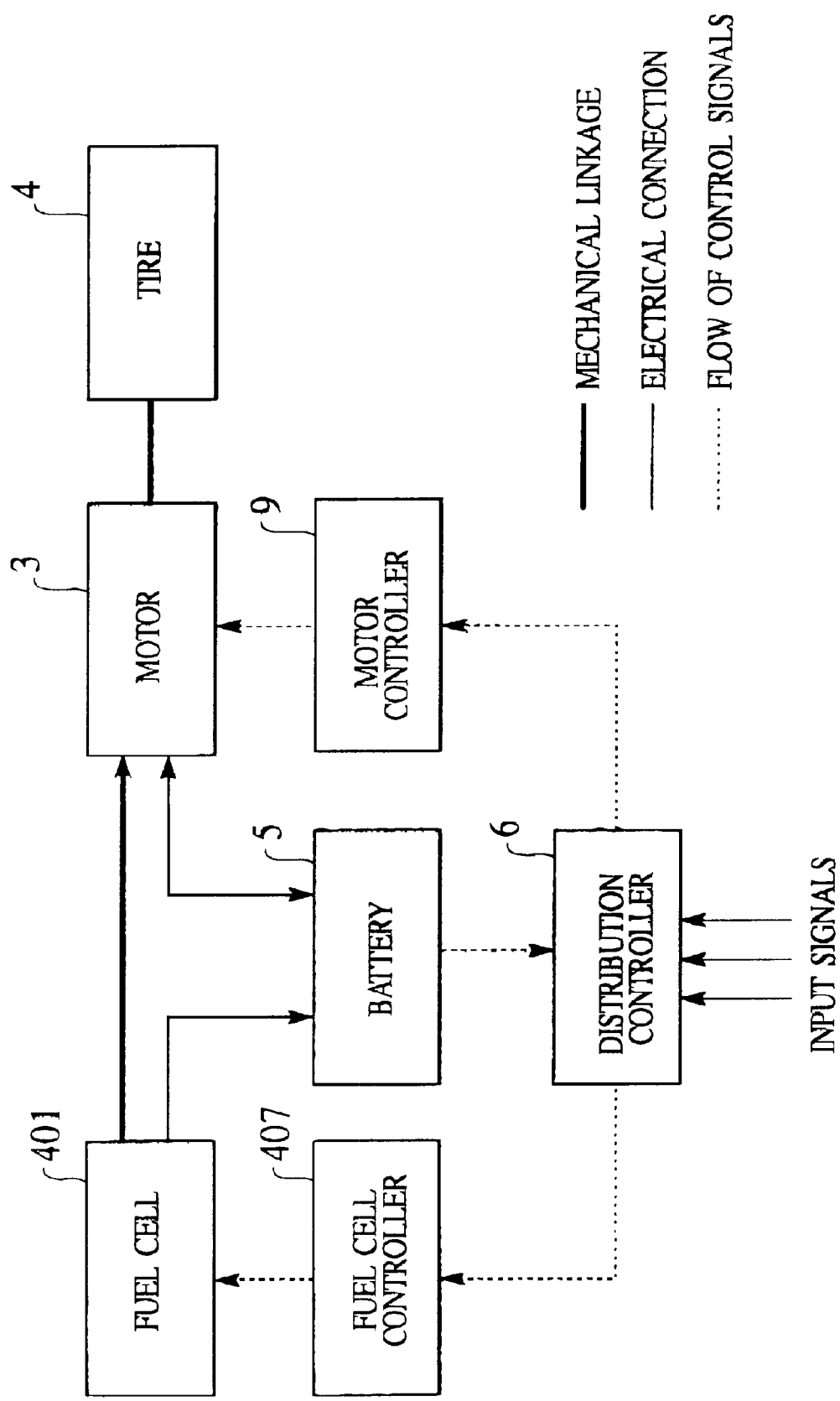
FIG. 76 is a block diagram showing a system structure of a control system for a hybrid vehicle according to a thirteenth embodiment of the present invention.

FIG. 76 shows a thirteenth embodiment of the invention, in which a fuel cell 401 is employed to generate electric power in place of the combination of engine 1 and generator 2 in the first embodiment, and a fuel cell controller 407 is employed to control the fuel cell 401, in place of the combination of internal combustion engine controller 7 and generator controller 8 in the first embodiment.

Electric power generated by the fuel cell 401 drives a motor 3, a driving force of which is transmitted to a road surface through tires 4, thereby allowing a vehicle to run. When the electric power generated by the fuel cell 401 is greater than electric power consumed by the motor 3, electric power is stored in a battery 5 as surplus electric power. When the electric power generated by the fuel cell 401 is smaller than that consumed by the motor 3, insufficient electric power is discharged from the battery 5 and supplied to the motor 3.

An electric power distribution controller 6 establishes the method of setting the driving states of the fuel cell 401 and the motor 3, and generates command values for the fuel cell 401 and the motor 3 so as to achieve that state and satisfy a driver's requirements.

A fuel cell controller 407 controls the fuel cell 401 to achieve the command value (e.g., required output) from the electric power distribution controller 6. A motor controller 9 controls the motor 3 to achieve the command value (e.g., the required driving force) from the electric power distribution controller 6.

In order to achieve the before-mentioned objects, the present invention can take on a number of forms.

For example, a first aspect of the present invention is a control system for a hybrid vehicle for controlling the hybrid vehicle, comprising a motor for allowing the vehicle to run, an electric power generating apparatus, and a battery storing electric power generated by the electric power generating apparatus and stores regenerative electric power generated by the motor at the time of deceleration of the vehicle, the battery discharges if necessary, the control system comprises: a consumed electric power calculator for calculating current electric power consumption of the vehicle, a battery state calculator for calculating battery state, a physical quantity per effective power calculator for calculating a predetermined physical quantity concerning the electric power generating apparatus per unit amount for a sum ("effective electric power") of the electric power consumption and electric power which can be consumed when surplus electric power charged into the battery is discharged in future when electric power equal to or greater than the electric power consumption is generated based on the battery state for various electric power consumption and various electric power generation, a threshold value calculator for obtaining a threshold value having the same unit as that of the physical quantity per effective power using predetermined calculation to select operating modes of the electric power generating apparatus and the battery, an operating mode selecting means for selecting the operating modes of the electric power generating apparatus and the battery based on comparison between the threshold value and the physical quantity per effective power corresponding to the electric power consumption, and a target electric power generation calculator for calculating a target electric power generation amount for the electric power generating apparatus from the threshold value and the physical quantity per effective power.

A second aspect of the present invention is a variation on the first aspect, wherein the electric power generating apparatus comprises an engine and a generator.

A third aspect of the present invention is also a variation on the first aspect, wherein the electric power generating apparatus comprises a fuel cell.

According to the first to third aspects of the present invention, the current electric power consumed by running and by auxiliary equipment, and the battery state calculator calculates the energy conversion efficiency during charging and discharging of the battery and the corresponding battery state. Based on this battery state, A fourth aspect of the present invention is a variation on any of the first to the third aspects, wherein the physical quantity per effective power is a fuel consumption amount per effective electric power of the engine or the fuel cell.

According to the fourth aspect of the present invention, the amount of fuel consumed per effective electric power by the engine or the fuel cell is used as the physical quantity per effective power, thereby enabling a reduction in the amount of fuel consumed with respect to the electric energy.

A fifth aspect of the present invention is a control system for a hybrid vehicle according to any one of the first to third aspects, wherein the physical quantity per effective power is an exhaust gas amount per effective electric power of the engine or the fuel cell.

According to the fifth aspect of the present invention, the amount of exhaust gas per effective electric power by the engine or the fuel cell is used as the physical quantity per effective power, thereby enabling a reduction in the amount of exhaust gas with respect to the electric energy.

A sixth aspect of the present invention is variation on a control system for a hybrid vehicle according to any one of the first to fifth aspects, wherein the operating mode selecting means selects (1) a first operating mode for supplying electric power which is equal to the electric power consumption from the battery when the electric power consumption is smaller than electric power which can be generated at maximum electric power generating efficiency point of the electric power generating apparatus, and the physical quantity per effective power rate corresponding to the electric power consumption is not preferable as compared with the threshold value, (2) a second operating mode, in which electric power electric power which becomes the physical quantity per effective power rate equal to the threshold value is generated by the electric power generating apparatus and surplus electric power with respect to the electric power consumption is stored in the battery when the physical quantity per effective power rate corresponding to the electric power consumption, is more preferable than the threshold value, (3) a third operating mode, in which maximum electric power which is equal to or less than the threshold value is generated by the electric power generating apparatus and insufficient electric power with respect to the electric power consumption is supplied from the battery when the electric power consumption is equal to or greater than electric power which can be generated at maximum electric power generating efficiency point of the electric power generating apparatus and the physical quantity per effective power rate corresponding to the electric power consumption, is less preferable than the threshold value, and (4) a fourth operating mode, in which the electric power generating apparatus generates electric power which is equal to the electric power consumption when the physical quantity per effective power rate corresponding to the electric power consumption and the threshold value coincide each other.

According to the sixth aspect of the present invention, in a case in which the consumed electric power is smaller than the electric power generatable at the maximum generating efficiency of the electrical power generating apparatus and further in which the physical quantity per effective electric power corresponding to the electric power is less preferable than the threshold value, a first operating mode is selected, in which an electric power of the same amount as the consumed electric power is supplied to the battery, a case in which the physical quantity per effective electric power corresponding to the consumed electric power is less favorable than the threshold value, the second operating mode is selected, in which the electrical power generating apparatus generates an amount of electric power that is the physical quantity per effective electric power equal to the threshold value, and in which surplus electric power beyond the consumed electric power is stored in the battery, in a case in which the consumed electric power is greater than the amount of electric power generatable at the maximum electric generating point of the electrical power generating apparatus and further in which the physical quantity per effective electric power corresponding to the consumed electric power is less favorable than the threshold value, a third operating mode is selected, in which maximum electric power, which is equal to or less than the threshold value is generated by the electrical power generating apparatus and in which insufficient electric power with respect to the consumed electric power is supplied from the battery, and in a case in which the physical quantity per effective electric power corresponding to the consumed electric power coincides with the threshold value, a fourth operating mode is selected, in which the electrical power generating apparatus generates an amount of electric power that is the same as the consumed electric power. The result of the above-described mode selections is the achievement of a high overall system fuel economy.

A seventh aspect of the present invention is a variation on a control system for a hybrid vehicle according to the sixth aspect, wherein the target electric power generation calculator (1) sets the target electric power generation to 0 when the first operating mode is selected by the operating mode selecting means, (2) retrieves the generated electric power which becomes the physical quantity per effective power rate which is equal to the threshold value in the physical quantity per effective power rate calculator, and the retrieved value is defined as the target generated electric power when the second operating mode is selected by the operating mode selecting means, (3) retrieves maximum electric power which becomes the physical quantity per effective power rate which is smaller than the threshold value in the physical quantity per effective power rate calculator, and the retrieved value is defined as the target generated electric power when the third operating mode is selected by the operating mode selecting means, and (4) defines electric power which is equal to the electric power consumption as the target generated electric power when the fourth operating mode is selected by the operating mode selecting means.

According to the seventh aspect of the present invention, the effect of the above-noted actions (1) to (4) is that the target electric power is generated with an improved overall system fuel economy.

An eight aspect of the present invention is a variation on a control system for a hybrid vehicle according to any one of the first to seventh aspects, wherein the threshold value calculator calculates a threshold value concerning a physical quantity which is subject in association with a battery state, the association relation is a relation in which a physical quantity at the time of electric power generation becomes more excellent as the battery state approaches a condition of utilizable range of the battery, and in which electric power is generated even if the physical quantity is not as good as the battery state approaches a lower limit of the utilizable range of the battery.

According to the eighth aspect as described above, it is possible to perform discharging and consumption of electric power stored in the battery and, as the condition of the battery approaches the usable range, if the physical quantity is not good, by performing charging at the minimum required amount, it is possible to prevent damage to the battery.

A ninth aspect of the present invention is a variation on a control system for a hybrid vehicle according to any one of the first to seventh aspects, wherein the threshold value calculator calculates a threshold value concerning a physical quantity which is subject in association with a battery state, in the association relation, a threshold value at a minimum value within utilizable range of the battery is a value equal to optimal value of a physical quantity when surplus electric power is generated when the electric power consumption is minimum, a threshold value at a maximum value within the utilizable range of the battery is a value equal to optimal value among physical quantity corresponding to all possible combination of electric power consumption and generated electric power amount.

According to the ninth aspect of the present invention, the range of change of the threshold value and the charging of the battery are considered in setting up a relationship with respect to the ranges of change of each optimum value of consumed electric power, thereby avoiding insufficient charging under efficient running conditions, avoiding unnecessary charging under low-efficiency running conditions, and achieving a further improvement in fuel economy.

A tenth aspect of the present invention is a variation on a control system for a hybrid vehicle according to any one of the first to seventh aspects, wherein the threshold value calculator calculates a threshold value concerning a physical quantity which is subject in association with a battery state, in the association relation, a threshold value which is greater than a minimum value within utilizable range of the battery by a first predetermined value is a value equal to optimal value of a physical quantity when surplus electric power is generated when the electric power consumption is minimum, a threshold value which is smaller than a maximum value within the utilizable range of the battery by a second predetermined value is a value equal to optimal value among physical quantity corresponding to all possible combination of electric power consumption and generated electric power amount.

According to the tenth aspect of the present invention as described above, it is possible to avoid a situation in which it is not possible to retrieve energy by regenerative braking because the charging condition of the battery has reached an upper limit, and it is further possible to avoid the problem of generating electric power under extremely inefficient conditions.

An eleventh aspect of the present invention is a variation on a control system for a hybrid vehicle according to any one of the eight to tenth aspects, wherein the threshold value calculator differentiates an association relation between the battery state and the threshold value used when electric power is charged into the battery and an association relation between the battery state and the threshold value used when electric power is discharged from the battery.

According to the eleventh aspect of the present invention as described above, by differentiating the relationship of associations as described, it is possible to avoid the problem of repeated charging at a given threshold value, which results in a change in the operating point of the electrical power generating apparatus. As a result, it is possible to avoid imparting a feeling of unease to the driver, and further possible to prevent an accelerated deterioration of the battery.

A twelfth aspect of the present invention is a variation on a control system for a hybrid vehicle according to any one of the eighth to eleventh aspects, further comprising future required electric power estimating means for estimating electric power which will be required in future, and threshold value correcting means for correcting the threshold value in accordance with estimated future required electric power.

A thirteenth aspect of the present invention is a variation on a control system for a hybrid vehicle according to the twelfth aspect, wherein the future required electric power estimating means estimates electric power which will be required in future based on a vehicle driving state, an auxiliary equipment driving state or a road state.

According to the twelfth and thirteenth aspects of the present invention as described above, by predicting the future demand for electric power based on the operating condition of the vehicle, including the vehicle running condition, the auxiliary equipment operating condition, and the road condition, and compensating the threshold value in accordance with this predicted future demand, it is possible to make proper selection of an operating mode, thereby reducing loss of electric power when charging. Additionally, it is possible to avoid the problem of not being able to effectively discharge stored electric power.

A fourteenth aspect of the present invention is a variation on a control system for a hybrid vehicle according to any one of the eighth to eleventh aspects, further comprising battery temperature detecting means for detecting a temperature state of the battery, and threshold value correcting means for correcting the threshold value in accordance with detected temperature state of the battery.

A fifteenth aspect of the present invention is a variation on a control system for a hybrid vehicle according to the fourteenth aspect, wherein the threshold value correcting means corrects an operating mode switching threshold value such that electric power is less prone to be generated when the temperature of the battery is higher than a predetermined first temperature or lower than a predetermined second temperature.

According to the fourteenth and fifteenth aspects of the present invention as described above, by compensating the threshold value in response to the temperature condition of the battery, a reduction is possible in the amount of discharged electric power in a case in which the battery temperature is in a range in which the charging efficiency is low, and further possible to increase the amount of charging in a case in which the battery temperature is in a range in which the charging efficiency is high, enabling proper selection of an operating mode and a reduction in electric power loss when charging.

A sixteenth aspect of the present invention is a variation on a control system for a hybrid vehicle according to any one of the eighth to the fifteenth aspects, wherein the battery state detecting means detects a charging state (SOC) of the battery.

According to the sixteenth aspect as described above, by having the battery state detection means detect the SOC of the battery as the state of the battery, it is possible to perform precise judgment as to the condition of the battery and control of the condition thereof.

A seventeenth aspect of the present invention is a variation on a control system for a hybrid vehicle according to any one of the eighth to fifteen aspects, wherein the battery state detecting means detects a voltage between terminals of the battery.

According to the seventeenth aspect as described above, by having the battery state detection means detect the terminal-to-terminal voltage of the battery as the battery condition, it is possible to judge and control the battery condition using a simple configuration.

An eighteenth aspect of the present invention is a variation on a control system for a hybrid vehicle according to any one of the eight to the fifteenth aspects, wherein the battery state detecting means detects an internal resistance of the battery.

According to the eighteenth aspect as described above, by having the battery state detection means detect the internal resistance of the battery as the battery condition, it is possible to judge and control the battery condition using a simple configuration.

A nineteenth aspect of the present invention is a variation on a control system for a hybrid vehicle comprising an engine, a motor, a battery and a transmission, in which power of at least one of the engine and the motor is transmitted to an output shaft through the transmission, the control system comprising means for detecting a vehicle speed, means for detecting an accelerator pedal actuation amount, an output shaft power calculator for calculating power ("output shaft power", hereinafter) in an output shaft based on the vehicle speed detection value and the accelerator pedal depressing amount detection value, a battery state calculator for calculating energy efficiency or a battery state corresponding thereto at the time of charging and discharging of the battery, a transmission transmitting efficiency calculator for calculating the transmitting efficiency from transmitting efficiency characteristic with respect to transmission speed-change ratio, physical quantity per effective power in the occurrence of the required power calculator in which fuel consumption rate characteristic of the engine and transmitting efficiency of the transmission are taken into account, and when power required for realizing the output shaft power ("required power", hereinafter) is generated in the engine, a predetermined physical quantity concerning the engine per unit amount of the output shaft power ("physical quantity per effective power in the occurrence of the required power", hereinafter) is calculated, a threshold value for setting a threshold value having the same unit as that of the physical quantity per effective power in the occurrence of the required power for selecting operating modes for the engine and the motor, means for determining a state, which determines whether or not the physical quantity per effective power in the occurrence of the required power is in a preferable state with respect to the threshold value, means for comparing the required power and power ("minimum fuel consumption power", hereinafter) at an operating point of the engine in which a predetermined physical quantity concerning the engine per unit power with each other in size, an operating mode selecting means for selecting operating modes for the engine and the motor based on the state decision result and the power comparison result, a physical quantity calculator for calculating a predetermined physical quantity ("physical quantity per effective power rate", hereinafter) concerning the engine per unit amount of a sum of the output shaft power when power which is equal to or greater than the required power is occurred in the engine and power used for generating electric power which can be utilized when power charged in the battery from surplus power with respect to various required power and various power of the engine, and a target unit operating point calculator for calculating, based on the operating mode, (1) torque and rpm speed of the motor and transmission speed-change ratio of the transmission for realizing the output shaft power while taking transmitting efficiency of the transmission when the vehicle runs by the motor, and (2) power of the engine which becomes physical quantity per effective power rate equal to the threshold value based on the physical quantity per effective power rate calculator, and torque and rpm speed of the engine, torque and rpm speed of the motor and transmission speed-change ratio of the transmission which satisfy both the output shaft power and power of the engine when the vehicle runs by the engine, or the engine and the motor.

According to the nineteenth aspect as described above, by performing a comparison between a threshold value and a prescribed physical quantity of the engine per effective power rate with respect to the sum of a power rate at the output shaft calculated by considering the energy conversion efficiency of the engine, the motor, and the auxiliary equipment and the power rate of the engine used in generating electric power consumable by first charging the battery with generated electric power, considering the energy conversion efficiency of the engine, the motor, and the auxiliary equipment and then discharging, and determining the operating mode of the engine and motor during running and the operating points of the engine, the motor, and the transmission, it is possible to achieve a favorable prescribed physical quantity with regard to the engine, in comparison with the related art.

A twentieth aspect of the present invention is a variation on a control system for a hybrid vehicle according to the nineteenth aspect, wherein the physical quantity per effective power rate is a fuel consumption amount per effective power in the engine.

According to the twentieth aspect as described above, by using the amount of fuel consumed per power with regard to the engine as the physical quantity per effective power rate, it is possible to achieve a reduction in the amount of fuel consumed, in comparison with the past.

A twenty-first aspect of the present invention is a variation on a control system for a hybrid vehicle according to the nineteenth aspect, wherein the physical quantity per effective power rate is an exhaust gas amount per effective electric power of the engine.

According to the twenty-first aspect as described above, by using an exhaust gas component that is to be limited per power rate in the engine as the physical quantity per power rate, it is possible to reduce the exhaust gas component in comparison with the past.

A twenty-second aspect of the present invention is a variation on a control system for a hybrid vehicle according to any one of the nineteenth to the twenty-first aspects, wherein the operating mode selecting means selects (1) a first operating mode for generating power in the motor which satisfies the output shaft power when it is decided in the state decision means that the physical quantity per effective power in the occurrence of the required power is less preferable than the threshold value and when it is decided in the power comparing means that the required power is smaller than the minimum fuel consumption power, (2) a second operating mode for generating power which is equal to or greater than the required power in the engine, thereby generating electric power by surplus power to charge the battery, when it is decided in the state decision means that the physical quantity per effective power in the occurrence of the required power is more preferable than the threshold value, (3) a third operating mode for generating, in the engine, the maximum required power which is equal to or lower than the threshold value when it is decided in the state decision means that the physical quantity per effective power in the occurrence of the required power is less preferable than the threshold value and it is decided in the power comparing means that the required power is greater than the minimum fuel consumption power, and (4) a fourth operating mode for generating the required power in the engine when it is decided in the power comparing means that the physical quantity per effective power in the occurrence of the required power coincides with the threshold value.

According to the twenty-second aspect described above, by comparing a physical quantity per effective power rate with respect to the required power rate with a threshold value, it is possible to select an operating mode that is either equivalent to or more preferable than the threshold value.

More specifically, in the first operating mode, because the output shaft power rate is generated by the motor, operation is not done so that the efficiency with respect to the threshold value in the engine is lowered, the physical quantity per effective power rate under this condition being more favorable than the threshold value. In the second operating mode, operation is performed at an efficiency that is equal to or better than the efficiency with respect to the threshold value in the engine, the engine power rate generated being higher than the required power rate, and the surplus power rate of the engine being used to charge the battery. The result of this is that operation is not done at a lower efficiency with respect to the engine threshold value, such as in the first and third operating modes, this second operating mode enabling the use of electric power charged with high efficiency to run using the motor. In the third operating mode, the engine power rate is generated with high efficiency, so as to achieve the maximum required power rate below the threshold value of the engine and, because the power rate insufficiency for the required power rate is generated by the electrical power generating apparatus, the physical quantity per effective power rate under this condition is equivalent to the threshold value. Additionally, compared to the case in which all of the required power rate is generated by the motor under a relatively high load, it is possible to limit a rise in temperature and performance deterioration in the battery, without having a large discharge from the battery all at one time, and further possible to reduce the bulk thereof. In the fourth mode, the required power rate is generated by engine, and it is possible to run with an efficiency equivalent to the threshold value.

A twenty-third aspect of the present invention is a variation on a control system for a hybrid vehicle according to any one of the nineteenth to twenty-second aspects, wherein the target electric power generation calculator; (1) calculates torque and rpm speed of the motor and transmission speed-change ratio of the transmission from energy conversion efficiency of the motor and transmitting efficiency of the transmission when the first operating mode is selected by the operating mode selecting means, (2) calculates corresponding torque and rpm speed of the engine, torque and rpm speed of the motor and transmission speed-change ratio of the transmission from power of the engine which is physical quantity per effective power in the occurrence of the required power which is equal to the threshold value based on the required power and the threshold value using the calculator for physical quantity per effective power in the occurrence of the required power, when the second operating mode is selected by the operating mode selecting means, (3) calculates torque and rpm speed of the engine which correspond to maximum the required power which is equal to or less than the threshold value, and transmission speed-change ratio of the transmission and torque and rpm speed of the motor when insufficient power with respect to the required power is occurred in the motor from the threshold value using the calculator for the physical quantity per effective power in the occurrence of the required power when the third operating mode is selected by the operating mode selecting means, and (4) calculates power of the engine which becomes the physical quantity per effective power in the occurrence of the required power which is equal to the threshold value from the required power and the threshold value, using the calculator for physical quantity per effective power in the occurrence of the required power, and calculates corresponding torque and rpm speed of the engine, torque and rpm speed of the motor and transmission speed-change ratio of the transmission, when the fourth operating mode is selected.

According to the twenty-third aspect described above, it is possible to calculate the engine torque and rpm speed, the motor torque and rpm speed, and the transmission gear ratio at which the physical quantity per effective power rate is equivalent to or better than the threshold value, based on the operating mode selected from among the first to fourth operating modes.

A twenty-fourth aspect of the present invention is a variation on a control system for a hybrid vehicle according to any one of the nineteenth to twenty-third aspects, wherein the calculator for physical quantity per effective power in the occurrence of the required power takes, into account, fuel consumption rate characteristic of the engine, energy conversion efficiency of the motor and transmitting efficiency of the transmission, and uses torque and rpm speed of the engine, torque and rpm speed of the motor and transmission speed-change ratio of the transmission which are calculated such that a predetermined physical quantity concerning the engine becomes minimum.

According to the twenty-fourth aspect as described above, because the engine, motor, and transmission operating points used in calculating the physical quantity per effective power rate are calculated for various required power rates and for various engine power rates so as to minimize the engine power rate and a prescribed physical quantity with regard to the engine in order to satisfy a driver's demand for drive power, it is possible to obtain an operating point that is the best within a range that can be actually achieved by the transmission. Additionally, it is possible, to calculate an operating mode based on the physical quantity per effective power rate, and to achieve operating points for the engine, the motor, and the transmission that provides a better prescribed physical quantity with regard to the engine.

A twenty-fifth aspect of the present invention is a control system for a hybrid vehicle comprising an electric power generating apparatus comprising a prime motor, a generator or a fuel cell, a battery for storing electric power generated by the electric power generating apparatus and regenerative electric power of the motor, the control system controlling the hybrid vehicle to run by a driving force of at least one of the prime motor and the motor, the control system comprising a required power calculator for calculating required power which is required for running based on power of the electric power generating apparatus required for realizing driving power in accordance with a driving force required by a driver and based on auxiliary equipment power required for operating auxiliary equipment, a physical quantity per unit power calculator for calculating a predetermined physical quantity (that is, "physical quantity per unit power") per unit power concerning the prime motor or the fuel cell in the occurrence of the required power in the electric power generating apparatus, a threshold value calculator for calculating a threshold value having the same unit as that of the physical quantity per effective power rate which becomes a comparison criterion value for selecting operating modes for the electric power generating apparatus, the battery and the motor, an operating mode selecting means for comparing the threshold value and the physical quantity per unit power to select operating modes of the electric power generating apparatus, the battery and the motor in accordance with a result of the comparison, and an operating point calculator for calculating an operating point of the electric power generating apparatus which becomes equal to or less than the threshold value, wherein the operating point calculator comprises means for detecting a charging state of the battery, a charging efficiency calculator for calculating charging efficiency corresponding to charging state and charging amount of the battery based on charging state detection value by the charging state detecting means, and a physical quantity per effective power rate calculator for calculating a predetermined physical quantity ("physical quantity per effective power rate", hereinafter) concerning the electric power generating apparatus per unit power of a sum ("effective power", hereinafter) of the driving power and auxiliary equipment power when power which is equal to or greater than the required power is occurred in the electric power generating apparatus, and power charged into the battery using surplus power for each charging state concerning various the required power, various power of the prime motor or the fuel cell based on energy conversion efficiency and charging efficiency of the electric power generating apparatus.

According to the twenty-fifth aspect as described above, in a hybrid vehicle having an electrical power generating apparatus formed by a prime motor, a generator, or a fuel cell, a battery for storing electric power generated by the electrical power generating apparatus and regenerative electric power of the motor occurring when the vehicle is decelerating, and a running motor, in which the hybrid vehicle is run by at least one of the prime motor and the motor, by performing a comparison with respect to a threshold value of a physical quantity per effective power rate calculated considering the battery energy conversion efficiency, which varies in response to the detected charging state and the amount of charging, and the battery and motor energy conversion efficiencies, it is possible to establish operating modes and operating points for the electrical power generating apparatus, the battery, and the motor more favorably than in the past, in response to actual running conditions.

A twenty-sixth aspect of the present invention is a control system for a hybrid vehicle for controlling the hybrid vehicle comprising an engine, a motor for allowing the vehicle to run, a battery for storing electric power and regenerative electric power generated by the motor, and transmission, in which power of at least one of the engine and the motor is transmitted to an output shaft through the transmission, the control system comprising a required power calculator for calculating required power required for allowing the vehicle to run, based on power of the engine required for realizing driving power in accordance with driving force required by a driver and based on auxiliary equipment power required for operating auxiliary equipment, a physical quantity per effective power rate calculator for calculating a predetermined physical quantity ("physical quantity per effective power rate", hereinafter) per unit power concerning the engine in the occurrence of the required power in the engine, a threshold value calculator for calculating a threshold value having the same unit as that of the physical quantity per effective power rate which becomes a comparison criterion value for selecting operating modes of the engine, the battery and the motor, and an operating point calculator for calculating an operating point of the engine which is equal to or less than the threshold value, wherein the operating point calculator comprises a means for detecting a charging state of the battery, a charging efficiency calculator for calculating charging efficiency corresponding to charging state and charging amount of the battery based on charging state detection value by the charging state detecting means, a charging efficiency calculator for calculating charging efficiency corresponding to charging state and charging amount of the battery based on charging state detection value by the charging state detecting means, and a physical quantity per effective power rate calculator for calculating a predetermined physical quantity ("physical quantity per effective power rate", hereinafter) concerning the electric power generating apparatus per unit power of a sum ("effective power", hereinafter) of the driving power and auxiliary equipment power when power which is equal to or greater than the required power is occurred in the electric power generating apparatus, and power charged into the battery using surplus power for each charging state concerning various the required power, various power of the prime motor or the fuel cell based on energy conversion efficiency and charging efficiency of the electric power generating apparatus.

According to the twenty-sixth aspect as described above, in a hybrid vehicle having an engine, electrical power generating apparatus, a running motor, a battery for storing electric power generated by the electrical power generating apparatus and regenerative electric power of the motor occurring when the vehicle is decelerating, in which the hybrid vehicle is run by at least one of the engine and the motor, by performing a comparison with respect to a threshold value of a physical quantity per effective power rate calculated considering the battery energy conversion efficiency, which varies in response to the detected charging state and the amount of charging, and the engine and motor energy conversion efficiencies, it is possible to establish operating modes and operating points for the engine, the battery, and the motor more favorably than in the past, in response to actual running conditions.

A twenty-seventh aspect of the present invention is a variation on a control system for a hybrid vehicle according to the twenty-fifth or the twenty-sixth aspect, wherein the threshold value calculator calculates a threshold value having the same unit as that of the physical quantity per effective power rate for selecting operating mode for the electric power generating apparatus or engine in association with the charging state detection value, in this association, the threshold value is varied such that the physical quantity per effective power rate at the time of electric power generation improves as the charging state detection value approaches an upper limit of utilizable range of the battery, and electric power can be generated even if the physical quantity per effective power rate is not excellent as the charging state detection value approaches a lower limit of the utilizable range of the battery.

According to the twenty-seventh aspect as described above, by adopting a configuration in which the threshold value is selected so as to obtain a prescribed physical quantity with regard to the prime motor during electric generation near an upper limit of a usable charge condition, not only is a maximum amount of charging done in a region near the best efficiency, but also the maximum discharging is done of the sufficiently charged energy, the result being a solution to the problem of insufficient charging during highly efficient running. In the region of a lower limit to the usable charging condition, by adopting a configuration in which selects the threshold value so that even in the condition in which the prescribed physical quantity with regard to the prime motor is not good, it is possible to perform the minimum required charging, it is possible to prevent unnecessary charging under poor operating conditions.

A twenty-eighth aspect of the present invention is a variation on a control system for a hybrid vehicle according to the twenty-seventh aspect, wherein the threshold value calculator comprises an operating mode switching detecting means for detecting that the operating mode is switched within a predetermined time, hysteresis setting means for providing threshold value output when the switching of the operating mode is detected with hysteresis.

According to the twenty-eighth aspect as described above, by imparting hysteresis to the threshold value, it is possible to suppress a deterioration of operating performance caused by frequency switching between operating modes of the electrical power generating apparatus.

A twenty-ninth aspect of the present invention is a variation on a control system for a hybrid vehicle according to any one of the twenty-fifth to twenty-eighth aspects, wherein the physical quantity per effective power rate is an amount of fuel consumed per unit power of the prime motor or fuel cell, or the engine.

According to the twenty-ninth aspect as described above, by using the amount of fuel consumed per power rate in the prime motor or the fuel cell as the physical quantity per unit work rate, it is possible to achieve a reduction in the amount of fuel consumed in comparison with the past. A thirtieth aspect of the present invention is a variation on a control system for a hybrid vehicle according to any one of the twenty-fifth to the twenty-eighth aspects, wherein the physical quantity per effective power rate is an exhaust gas component amount which is to be limited per unit power of the prime motor or fuel cell, or the engine.

According to the thirtieth aspect as described above, by using the amount of an exhaust gas component to be limited per power rate in the prime motor or the fuel cell as the physical quantity per unit work rate, it is possible to achieve a reduction in the amount of the exhaust gas component that it to be limited, in comparison with the past.

A thirty-first aspect of the present invention is a control system for a hybrid vehicle comprising a motor for allowing the vehicle to run, an electric power generating apparatus for generating electric power using fuel, and a battery for storing electric power generated by the electric power generating apparatus and regenerative electric power generated by the motor at the time of deceleration of the vehicle, the control system comprising a consumed electric power calculator for calculating current electric power consumption of the vehicle, a threshold value calculator for calculating a threshold value for selecting operating modes for the electric power generating apparatus and the battery based on charging state of the battery, operating mode selecting means for selecting operating mode for the electric power generating apparatus and the battery based on effective fuel consumption rate curve at the time of direct distribution indicative of fuel consumption rate per unit effective electric power when electric power equal to electric power consumption is generated by the electric power generating apparatus, and the threshold value, and the current electric power consumption obtained by the consumed electric power calculator, and a target generated electric power calculator for calculating target generated electric power of the electric power generating apparatus based on an effective fuel consumption rate curve at the time of charging of surplus electric power indicative of fuel consumption rate per unit effective electric power when electric power greater than electric power consumption is generated by the electric power generating apparatus, effective fuel consumption rate curve at the time of the direct distribution, the threshold value, the current electric power consumption obtained by the consumed electric power calculator, and an operating mode selected by the operating mode selecting means.

According to the thirty-first aspect as described above, a threshold value for selecting an operating mode for the electrical power generating apparatus and the battery is calculated based on the charging state of the battery, and the operating mode selecting means selects an operating mode for the electric power generating apparatus and battery based on an effective fuel consumption rate curve at the time of direct distribution indicative of a fuel consumption rate per unit effective electric power when an electric power equal to consumed electric power is generated by the electrical power generating apparatus. The target generated electric power is calculated as described above, and the operating modes of the electrical power generating apparatus and the battery during supply of electric power to the running motor and target electric power generation amount of the electrical power generating apparatus are established, enabling an increase or a reduction in the prescribed physical quantity with regard to the electrical power generating apparatus in comparison with the past.

Yet another aspect of the present invention is one having a power apparatus consuming fuel and generating power, a battery storing electrical power, and a motor converting electrical power to mechanical power transmitted to a drive wheel of the vehicle, the control system including a detector detecting a running condition of the vehicle. This controller is programmed to: calculate a required power indicating power required to drive the drive wheel of the vehicle, based on an operating condition of the vehicle; calculate a first parameter indicating a ratio of a fuel consumption rate with respect to the power required for running the power apparatus under operating conditions in which power is generated equal to the required power to drive the vehicle; set a threshold value with respect to the first parameter, based on the charging state of the battery; run the power apparatus so as to generate a power larger than the required power when the first parameter is smaller than the threshold value, and of the generated power transmit the required power to the drive wheel, and store the remaining power in the battery; and run the power apparatus so as to generate a power smaller than the required power when the first parameter is larger than the threshold value, transmit all of the generated power to the drive wheel, and transmit the power insufficient amount from the battery to the drive wheel.

The contents of Japanese Patent Application No. 2000-289355 and Japanese Patent Application No 2000-387832 are incorporated herein by reference.

While preferred embodiments of he present invention have been described using specific terms, such description is for illustrative purposes, and it is to be understood that changes and variations may be made without departing from the spirit or scope of the following claims.

What is claimed is:

1. A control system for a hybrid vehicle for controlling the hybrid vehicle comprising a power apparatus consuming fuel and generating power, a battery storing electrical power, and a motor converting electrical power to mechanical power transmitted to a drive wheel of the vehicle, the control system including a detector detecting an operating condition of the vehicle, and programmed to:

calculate a required power indicating a power required to drive the vehicle, based on the operating condition of the vehicle;

calculate a first parameter indicating a ratio between a fuel consumption rate and the required power for running the power apparatus so as to generate a power equal to the required power;

set a threshold value with respect to the first parameter, based on a charging state of the battery;

run the power apparatus so as to generate a power larger than the required power when the first parameter is smaller than the threshold value, and transmit part of the power generated to the drive wheel, and store a remainder of the power generated in the battery; and run the power apparatus so as to generate a power smaller than the required power when the first parameter is larger than the threshold value, and transmit all of the power generated to the drive wheel, and transmit part of a power stored in the battery to the drive wheel.

2. A control system for a hybrid vehicle according to claim 1, further programmed to:

run the power apparatus at an operating condition under which a second parameter coincides with the threshold value when the first parameter is smaller than the threshold value, the second parameter indicating a ratio between a fuel consumption rate and an effective power for running the power apparatus so as to generate a power larger than the required power, the effective power indicating a sum of the required power and an usable power indicating part of the remainder of the power generated.

3. A control system for a hybrid vehicle according to claim 2, further programmed to;

calculate a charging efficiency and discharging efficiency of the battery, based on the charging state of the battery; and calculate the usable power by multiplying the remainder of the power generated by the charging efficiency and the discharging efficiency.

4. A control system for a hybrid vehicle according to claim 1, further programmed to;

run the power apparatus at an operating condition under which a third parameter coincides with the threshold value when the first parameter is larger than the threshold value when the first parameter is larger than the threshold value, the third parameter indicating a ratio between a fuel consumption rate and the power generated.

5. A control system for a hybrid vehicle according to claim 1, further programmed to:

stop the running of the power apparatus when the first parameter is larger than the threshold value.

6. A control system for a hybrid vehicle according to claim 1, further programmed to:

run the power apparatus so as to generate a power equal to the required power when the first parameter is equal to the threshold value, and transmit all of the power generated to the drive wheel.

7. A control system for a hybrid vehicle according to claim 1, further programmed to:

gradually reduce the threshold value when actual charging state of the battery is greater than the target charging state, and gradually increase the threshold value when the actual charging state of the battery is less than the target charging state.

8. A control system for a hybrid vehicle according to claim 1, further programmed to:

reduce the threshold value more, the greater is the actual charging state of the battery.

9. A control system for a hybrid vehicle according to claim 1, further programmed to:

compensate the threshold value with respect to a temperature of the battery.

10. A control system for a hybrid vehicle according to claim 1, wherein the power apparatus comprises an engine consuming fuel and generating mechanical power, and a generator converting mechanical power generated by the engine to electric power.

11. A control system for a hybrid vehicle according to claim 1, wherein the power apparatus comprises an engine consuming fuel and generating mechanical power, and wherein the hybrid vehicle further comprises a transmission transmitting mechanical power generated by the engine to a drive wheel of the vehicle.

12. A control system for a hybrid vehicle according to claim 1, wherein the power apparatus comprises an engine consuming fuel and generating mechanical power, and a generator converting mechanical power generated by the engine to electric power, and wherein the hybrid vehicle further comprises a transmission transmitting mechanical power generated by the engine to a drive wheel of the vehicle.

13. A control system for a hybrid vehicle according to claim 1, wherein the power apparatus is a fuel cell consuming fuel and generating electric power.

\* \* \* \* \*